(12) United States Patent
Benisty et al.

(10) Patent No.: US 10,866,910 B2
(45) Date of Patent: Dec. 15, 2020

(54) SYSTEMS, METHODS, AND COMPUTER-READABLE MEDIA FOR MANAGING INSTRUCTION FETCH IN VIRTUAL COMPUTING ENVIRONMENTS

(71) Applicant: SanDisk Technologies LLC, Plano, TX (US)

(72) Inventors: Shay Benisty, Beer Sheva (IL); Rajesh Koul, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 192 days.

(21) Appl. No.: 15/936,364

(22) Filed: Mar. 26, 2018

(65) Prior Publication Data

US 2018/0217951 A1 Aug. 2, 2018

Related U.S. Application Data

(63) Continuation-in-part of application No. 14/868,373, filed on Sep. 28, 2015, now Pat. No. 9,927,983.

(51) Int. Cl.
*G06F 13/16* (2006.01)

(52) U.S. Cl.
CPC ...... *G06F 13/1642* (2013.01); *G06F 2213/16* (2013.01); *G06F 2213/24* (2013.01)

(58) Field of Classification Search
CPC .... G06F 12/00; G06F 13/1642; G06F 3/0679; G06F 2213/36
USPC .................................. 711/100, 103, 154, 200
See application file for complete search history.

(56) References Cited

U.S. PATENT DOCUMENTS

| 5,948,081 | A | 9/1999 | Foster |
| 2002/0062414 | A1 | 5/2002 | Hofman et al. |
| 2013/0086311 | A1 | 4/2013 | Huang et al. |
| 2014/0129749 | A1 | 5/2014 | Bass et al. |
| 2016/0147687 | A1* | 5/2016 | Check ................. G06F 13/372 710/117 |
| 2016/0203027 | A1* | 7/2016 | Challa ................ G06F 9/45558 718/1 |

OTHER PUBLICATIONS

NVM Express, Specification Revision 1.2, http://nvmexpress.org/wp-content/uploads/NVM_Express_1_2_Gold_20141209.pdf, pp. 1-205 (Nov. 3, 2014).

(Continued)

*Primary Examiner* — Tuan V Thai
(74) *Attorney, Agent, or Firm* — Kunzler Bean & Adamson, PC

(57) ABSTRACT

Methods, systems, and computer readable media for intelligent fetching of storage device commands from submission queues are disclosed. The controller may implement a hierarchical scheme comprising first-level arbitration(s) between submission queues of each of a plurality of input/output virtualization (IOV) functions, and a second-level arbitration between the respective IOV functions. Alternatively, or in addition, the controller may implement a flat arbitration scheme, which may comprise selecting submission queue(s) from one or more groups, each group comprising submission queues of each of the plurality of IOV functions. In some embodiments, the controller implements a credit-based arbitration scheme. The arbitration scheme(s) may be modified in accordance with command statistics and/or current resource availability.

18 Claims, 37 Drawing Sheets

(56) References Cited

OTHER PUBLICATIONS

Benisty, et al., Notice of Allowance dated Nov. 2, 2017 for U.S. Appl. No. 14/868,373.
Benisty, et al., Office Action dated Mar. 9, 2017 for U.S. Appl. No. 14/868,373.
Benisty, et al., Supplemental Notice of Allowance dated Nov. 8, 2017 for U.S. Appl. No. 14/868,373.

* cited by examiner

| SQ NUMBER | # PENDING COMMANDS | # FETCHED COMMANDS | # FETCHED READ COMMANDS | READ-WRITE RATIO | AVERAGE SIZE | SMALLEST SIZE | BIGGEST SIZE |
|---|---|---|---|---|---|---|---|
| 0 | | | | | | | |
| 1 | | | | | | | |
| N | | | | | | | |

FIG. 5

| BIT | DESCRIPTION |
|---|---|
| 31:16 | COMMAND IDENTIFIER (CID): THIS FIELD SPECIFIES A UNIQUE IDENTIFIER FOR THE COMMAND WHEN COMBINED WITH A SUBMISSION QUEUE IDENTIFIER |
| 15:14 | PRP OR SGL DATA TRANSFER (PSDT): THIS FIELD SPECIFIES WHETHER PRPs OR SGLs ARE USED FOR ANY DATA TRANSFER ASSOCIATED WITH THE COMMAND. PRPs SHALL BE USED FOR ALL ADMIN COMMANDS. THE DEFINITION IS DESCRIBED IN THE TABLE BELOW.<br><br>| VALUE | DEFINITION |<br>|---|---|<br>| 00b | PRPs ARE USED FOR THIS TRANSFER |<br>| 01b | SGLs ARE USED FOR THIS TRANSFER |<br>| 10b | SGLs ARE USED FOR THIS TRANSFER |<br>| 11b | RESERVED |<br><br>IF THERE IS METADATA THAT IS NOT INTERLEAVED WITH THE LOGICAL BLOCK DATA, AS SPECIFIED IN THE FORMAT NVM COMMAND, THEN THE METADATA POINTER (MPTR) FIELD IS USED TO POINT TO THE METADATA. THE DEFINITION OF THE METADATA POINTER FIELD IS DEPENDENT ON THE SETTING IN THIS FIELD. |
| 13:10 | RESERVED |
| 09:08 | FUSED OPERATION (FUSE): IN A FUSED OPERATION, A COMPLEX COMMAND IS CREATED BY "FUSING" TOGETHER TWO SIMPLER COMMANDS. REFER TO SECTION 6.1. THIS FIELD SPECIFIES WHETHER THIS COMMAND IS PART OF A FUSED OPERATION AND IF SO, WHICH COMMAND IT IS IN THE SEQUENCE.<br><br>| VALUE | DEFINITION |<br>|---|---|<br>| 00b | PRPs ARE USED FOR THIS TRANSFER |<br>| 01b | SGLs ARE USED FOR THIS TRANSFER |<br>| 10b | SGLs ARE USED FOR THIS TRANSFER |<br>| 11b | RESERVED | |
| 07:00 | OPCODE (OPC): THIS FIELD SPECIFIES THE OPCODE OF THE COMMAND TO BE EXECUTED. |

FIG. 6

SYSTEMS, METHODS, AND COMPUTER-READABLE MEDIA FOR MANAGING INSTRUCTION FETCH IN VIRTUAL COMPUTING ENVIRONMENTS

CROSS REFERENCE TO RELATED APPLICATIONS

The Application Data Sheet (ADS) filed herewith is incorporated by reference. Any applications claimed on the ADS for priority under 35 U.S.C. § 119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent with this disclosure. This application claims the benefit of U.S. patent application Ser. No. 14/868,373, which was filed on Sep. 28, 2015, and which is incorporated by reference, to the extent such subject matter is not inconsistent herewith.

TECHNICAL FIELD

The subject matter disclosed herein relates to storage devices, such as nonvolatile memory devices. More particularly, the subject matter described herein relates to intelligent fetching of data storage device commands from host-side submission queues by a nonvolatile storage device in various computing environments, including virtualized computing environments.

BACKGROUND

In the nonvolatile memory express (NVMe) system, a host device writes data storage device commands, such as read commands, write commands, and administrative commands, in submission queues, which are implemented in host memory. The nonvolatile storage device fetches the commands from the submission queues, executes the commands, and places entries in completion queues, which are also implemented in host memory, to notify the host of completion of the commands. There are typically multiple submission queues allocated by the host. Accordingly, the device controller must select from which submission queue to select the next command to be processed.

The NVMe standard, the current version of which is NVM Express Revision 1.3, May 1, 2017, specifies mechanisms by which a controller that complies with the standard (an NVMe controller) may select commands from submission queues. One mechanism is a round robin mechanism, in which the device controller selects commands from the submission queues in round robin order. Another mechanism is a weighted round robin mechanism where the submission queues are assigned static priorities or weights, and commands are selected from submission queues in round robin order using weights to determine the selection order in each round.

In either case, the next command to be fetched from a submission queue is based on static arbitration logic that either implements no priorities, as in the round robin case, or implements only static, host-defined priorities, as in the weighted round robin case. Such static arbitration logic may be sufficient if the storage device has sufficient resources to handle all host I/O requests. However, because storage device resources may be limited and host demands on those resources may exceed the device's ability to promptly process host commands, it may be desirable to select commands to improve utilization of storage device resources.

A storage device may be used in various different computing environments and/or platforms. In some virtual computing environments, a storage device may be shared by multiple hosts, including physical hosts and/or virtual hosts (virtual machines). Access to the storage device may be controlled by a virtualization manager, such as a hypervisor, virtual machine monitor (VMM), and/or the like, which may provide a separate "virtualized" storage device to each host process. The virtualization manager may, however, become a limiting factor in I/O performance (e.g., may become an I/O bottleneck). The storage device may address these issues by, inter alia, implementing one or more virtualization standards, such as the virtualization enhancements defined in NVM Express Revision 1.3. The storage device may support a plurality of virtualized controllers, including a primary controller and one or more secondary controllers. Each controller may be directly accessed by a respective physical or virtual host through a respective function (a respective virtualized input/output (IOV) function), such that certain I/O commands may bypass the virtualization manager (e.g., hypervisor). As used herein, an IOV function refers to an function implemented and/or supported by a nonvolatile storage device (e.g., by use of a corresponding IOV controller), and may comprise and/or correspond to a function of an interface of the nonvolatile storage device (e.g., a physical or virtual function of a Peripheral Component Interconnect Express (PCIe) interconnect operably coupled to the nonvolatile storage device). Each IOV function may comprise and/or correspond to a respective set of host-based submission queues configured to receive commands directed to the IOV function (and/or corresponding IOV controller).

Supporting virtualization functionality may introduce new challenges pertaining to, inter alia, submission queue arbitration. Instead of arbitrating between a single set of submission queues, the storage device may be required to arbitrate between submission queues of a plurality of VF, each VF comprising a respective set of submission queues. Current standards do not adequately address virtualization and/or consider the impact of virtualization on performance and/or Quality of Service (QoS). Accordingly, there exists a need for methods, systems, and computer readable media for managing command fetching in virtualized computing environments to manage command arbitration in virtualized computing environments.

SUMMARY

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

Methods, systems, and computer readable media for intelligent fetching of storage device commands from submission queues are disclosed. One method is implemented in a data storage device including a controller and a memory. The method includes collecting submission queue command statistics and monitoring the resource state of the data storage device. The method further includes using the submission queue command statistics and the resource state to select a submission queue from which a next data storage device command should be fetched. The method further includes fetching the command from the selected submission queue. The method further includes providing the command to command processing logic.

In some embodiments, the disclosed method for command arbitration comprises: assigning a same weight to each virtual function of a plurality of virtual functions, each virtual function corresponding to respective submission queues of a plurality of submission queues maintained within memory resources of a host of a nonvolatile storage device; selecting a submission queue from the plurality of submission queues, the selecting comprising arbitrating between a group of the submission queues, the group comprising submission queues of each of the plurality of virtual functions; and/or fetching one or more commands from the selected submission queue to the nonvolatile storage device. In some embodiments, selecting the submission queue comprises arbitrating between the group of the submission queues in accordance with one of a round robin arbitration scheme and a weighted round robin arbitration scheme. Selecting the submission queue may comprise performing a first arbitration within a first group of the submission queues, the first group comprising a submission queue of each virtualization function, each submission queue of the first group assigned a first priority; performing a second arbitration within a second group of the submission queues, the second group comprising a submission queue of each virtualization function, each submission queue of the second group assigned a respective priority lower than the first priority; selecting the submission queue from a result of the first arbitration responsive to one or more of the submission queues of the first group comprising one or more queued commands; and selecting the submission queue from a result of the second arbitration responsive to each submission queue of the first group being empty.

The first priority may comprise an admin priority, and each submission queue included in the second group may be assigned one of a high priority, a medium priority, and a low priority. Selecting the submission queue may further comprise performing a third arbitration within a third group of the submission queues, wherein each submission queue of the third group is assigned an urgent priority classification; and selecting the submission queue from a result of the third arbitration responsive to each submission queue of the first group being empty. The submission queue may be selected from the result of the second arbitration responsive to each submission queue of the first group being empty and each submission queue of the third group being empty.

Embodiments of the disclosed method may further comprise monitoring the commands fetched from the selected submission queue; and determining whether to interrupt the fetching based on the monitoring, wherein interrupting the fetching comprises selecting a next submission queue from the plurality of submission queues. The method may comprise interrupting fetching in response to determining that more than a threshold number of commands have been fetched from the selected submission queue. Alternatively, or in addition, the determination of whether to interrupt fetching may be based on an estimate of an amount of data to be transferred during execution of commands fetched from the selected submission queue. In some embodiments, the method comprises interrupting fetching after a threshold amount of time.

In one embodiment, the disclosed method for command arbitration comprises allocating credits to each of a plurality of virtual functions associated with a nonvolatile storage device, such that each of the plurality of virtual functions comprises a respective number of credits; and fetching commands from submission queues of selected virtual functions, of the plurality of virtual functions. Fetching a command from a submission queue of a selected virtual function may comprise reducing the number of credits allocated to the selected virtual function. In some embodiments, selecting the virtual function comprises arbitrating between the plurality of virtual functions based on the number of credits allocated to each of the respective virtual functions. Alternatively, or in addition, arbitrating between the plurality of virtual functions may comprise assigning a respective weight to each of the virtual functions, wherein the weight assigned to a virtual function corresponds to the number of credits allocated to the virtual function. Selecting the virtual function may comprise selecting from a subset of the plurality of virtual functions, the subset including virtual functions comprising at least a threshold number of credits and excluding virtual functions comprising fewer than the threshold number of credits. In some embodiments, fetching the command from the submission queue of the selected virtual function further comprises determining an amount of credits consumed by the command; and reducing the number of credits allocated to the selected virtual function by the determined amount. The amount of credits consumed by the command may be based on one or more of: a type of the command; an opcode of the command; an estimated data transfer size; an attribute of the command; a namespace of the command; a stream identifier associated with the command; an address of the command; a host buffer method used by the command; a buffer location for data pertaining to the command; and/or the like.

Disclosed herein are embodiments of a nonvolatile storage device for fetching commands in a virtual computing environment. Embodiments of the disclosed nonvolatile storage device may comprise a device controller configured to implement a plurality of virtualization functions, including a primary virtual function and one or more secondary virtual functions, each virtual function corresponding to a respective set of submission queues maintained within a host memory; arbitration logic, comprising: a plurality of queue-level arbiters, each queue-level arbiter configured to arbitrate between a plurality of submission queues of a respective one of the virtual functions; and a function-level arbiter configured to arbitrate between the plurality of virtualization functions, the function-level arbiter configured to designate a submission queue selected by one of the queue-level arbiters as a currently-selected submission queue; and fetch logic configured to fetch commands from the currently-selected submission queue. In some embodiments, the disclosed nonvolatile storage device further includes an arbitration monitor configured to cause the arbitration logic to select a next submission queue to replace the currently-selected submission queue in response to one or more of: determining that a threshold number of commands have been fetched from the currently-selected submission queue; and determining that an estimated amount of data to be transferred for commands fetched from the currently-selected submission queue exceeds a data threshold. Each of the queue-level arbiters may be configured to implement a weighted round robin arbitration scheme. The function-level arbiter may be configured to arbitrate between the plurality of virtualization functions in accordance with weights assigned to the respective arbitration functions. In some embodiments, a first one of the queue-level arbiters is configured to arbitrate between the plurality of submission queues of the primary virtual function; and the function-level arbiter is configured to designate the submission queue selected by the first queue-level arbiter as the currently-selected queue while any of the plurality of submission queues of the primary virtual function comprises a queued command. The function-level arbiter may be configured to designate a submission queue selected by a queue-level arbiter other than the first queue-level arbiter responsive to all of the plurality of submission queues of the primary virtual function being empty.

BRIEF DESCRIPTION OF THE DRAWINGS

The subject matter described herein will now be explained with reference to the accompanying drawings of which:

FIG. 5 is a table illustrating exemplary statistics that may be collected and used for intelligent submission queue command fetching according to an embodiment of the subject matter described herein;

FIG. 6 is a diagram illustrating an exemplary structure for an NVMe command;

DETAILED DESCRIPTION

Figure 1:
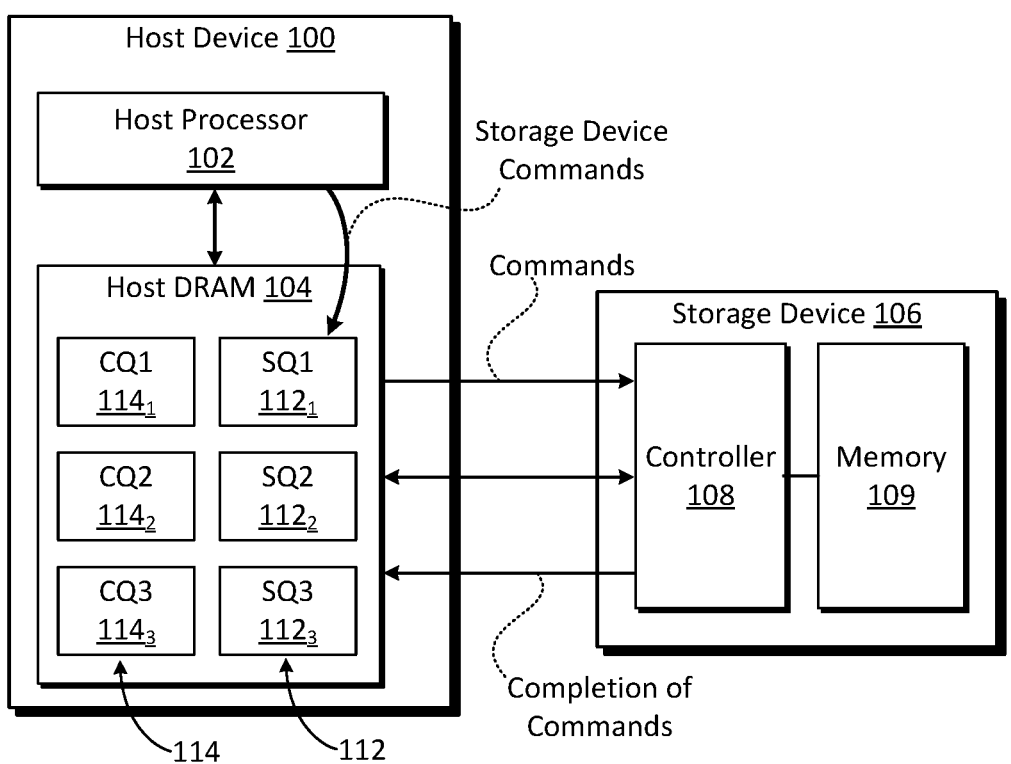
FIG. 1 is a block diagram illustrating a host device and a nonvolatile storage device according to the NVMe architecture.

As stated above, according to the NVMe standard, a host device communicates memory device commands, such as read commands, write commands, and admin commands, to a nonvolatile storage device using submission queues. FIG. 1 illustrates the NVMe architecture in which the subject matter described herein for intelligent submission queue command fetching may be implemented. In FIG. 1, host device 100 may comprise any suitable computing platform that is capable of accessing memory on a storage device (e.g., capable of interfacing with the nonvolatile storage device 106 disclosed herein). For example, host device 100 may comprise one or more of a computing device, server computing device, personal computing device, desktop personal computer, a laptop computer, a tablet computer, a mobile telephone, or a front end to a storage array. The host device 100 may comprise a processor 102 and memory 104, which in the illustrated example is Random Access Memory (RAM), such as Dynamic RAM (DRAM). The host device 100 may be operably coupled to the nonvolatile storage device 106 (via a bus, interconnect, and/or the like). The host device 100 may be configured to submit commands to the nonvolatile storage device 106 in order to perform one or more operations (e.g., operations to store data within the storage device 106, retrieve data from the nonvolatile storage device 106, configure the nonvolatile storage device 106, and/or the like). The nonvolatile storage device 106 may comprise any suitable means for providing nonvolatile and/or non-transitory storage services. The nonvolatile storage device 106 may comprise a removable storage device, such as a solid state drive (SSD) that is removably connectable to host device 100. Alternatively, or in addition, the nonvolatile storage device 106 may be non-removable or integrated within the host device 100.

The nonvolatile storage device 106 may comprise a device controller 108 and nonvolatile memory 109. Device controller 108 controls access to nonvolatile memory 109. In one embodiment, device controller 108 may be a nonvolatile memory controller that implements or supports the NVMe protocol, and nonvolatile memory 109 may be two-dimensional (2D) or three-dimensional (3D) NAND flash memory. The device controller 108 may be configured to support one or more standards, such as the NVMe standard. The device controller 108 may, therefore, comprise an NVMe controller.

In order for the host device 100 to read data from, or write data to, the nonvolatile storage device 106, the host processor 102 creates and writes commands in submission queues 112 (e.g., submission queues $112_1$, $112_2$, and $112_3$). Three submission queues are shown for illustrative purposes. It is understood that there may be more or fewer than three submission queues 112 at any given time depending on NVMe device usage by the host device 100. Device controller 108 fetches the commands from submission queues $112_1$, $112_2$, and $112_3$ and executes the commands. Upon completion of the commands, device controller 108 writes completion entries to corresponding completion queues 114 (e.g., completion queues $114_1$, $114_2$, and $114_3$).

Figure 2:
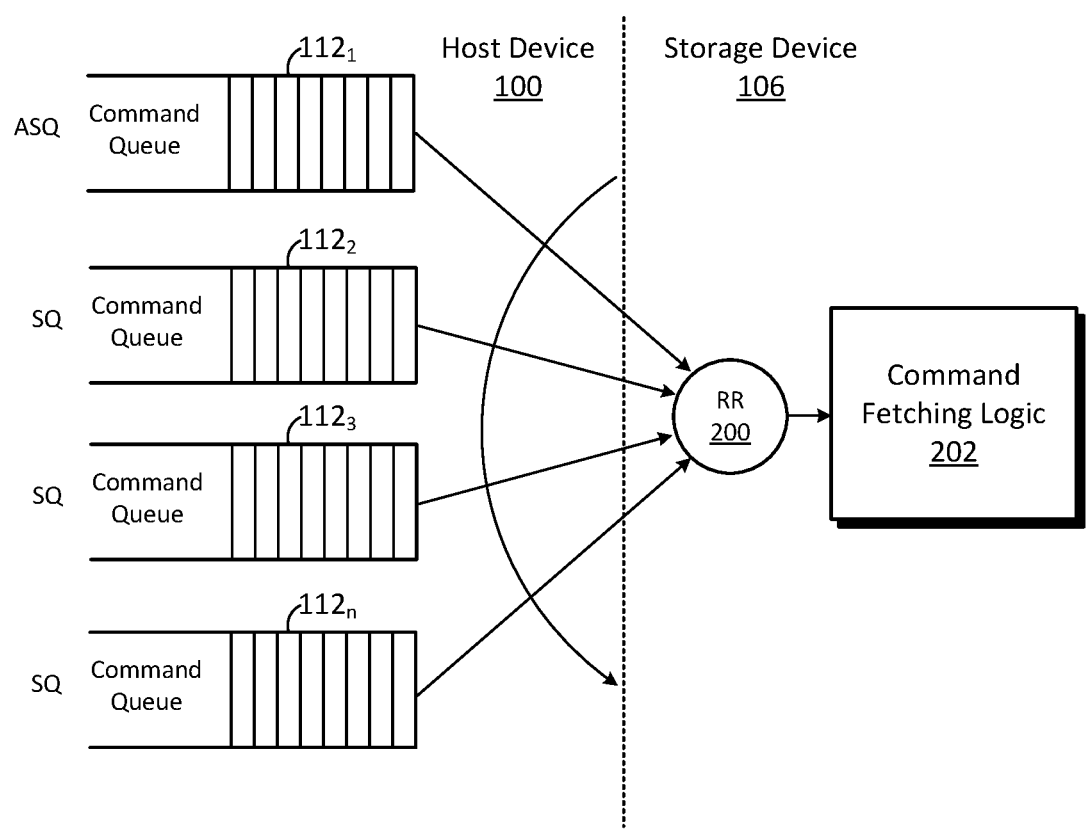
FIG. 2 is a block diagram illustrating round robin command fetching according to the NVMe standard.

As set forth above, one mechanism by which device controller 108 may select or fetch commands from submission queues from $112_1$, $112_2$, and $112_3$ is round robin selection. This mechanism is illustrated in FIG. 2. In FIG. 2, a round robin arbiter 200 statically selects a command from one of submission queues $112_1$ through $112_n$ based on a round robin selection algorithm regardless of device state, the status of the corresponding completion queues, or any other information. Round robin selection involves selecting from each queues $112_1$ through $112_n$ in order from 1 to n and continually repeating the selection in the same order. Round robin arbiter 200 instructs command fetch logic 202 to select each command. Command fetch logic 202 provides the command to command processing logic (not shown in FIG. 2), which processes the command. While round robin selection can ensure equal serving of submission queues, storage device resources may not be optimally utilized, especially when commands from the submission queues are fetched but cannot be processed due to storage device resource constraints. For example, if a write command is fetched from a submission queue and the nonvolatile storage device is unable to process the write command, then the storage device may wait until resources are available to process the write command. If the storage device processing resources for processing a read command were available but not used during the wait period, then such resources are not being efficiently utilized.

Figure 3:
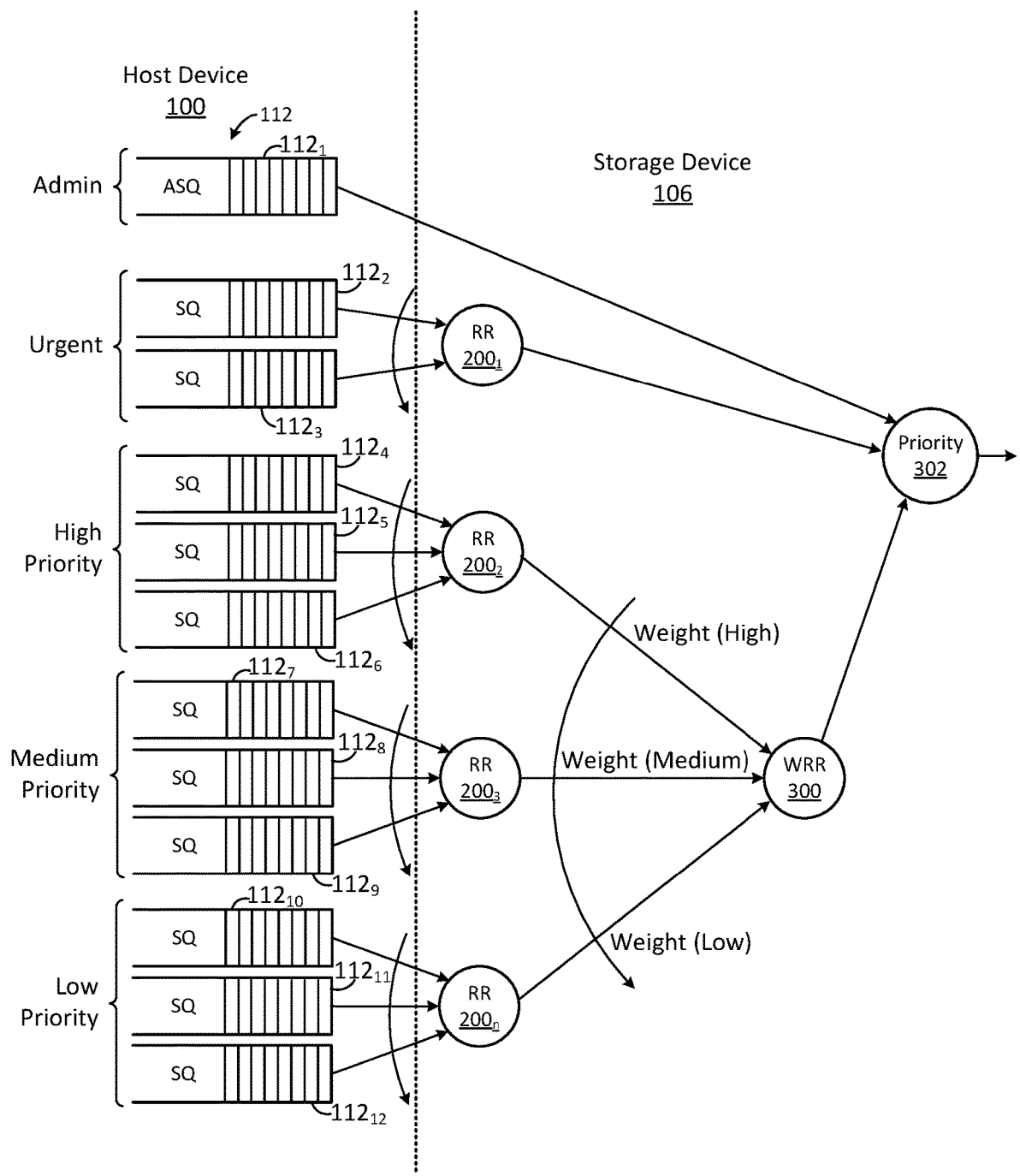
FIG. 3 is a block diagram illustrating weighted round robin command scheduling according to the NVMe standard.

Another mechanism for statically selecting commands from submission queues is illustrated in FIG. 3. In FIG. 3, weighted round robin selection is illustrated. Submission queues $112_1$ through $112_n$ are grouped according to priorities. Round robin arbiters $200_1$ through $200_n$ each implement round robin selection for their respective queues and pass the selected queue to the next level in the hierarchy. A weighted round robin arbiter 300 selects commands from the candidates selected by round robin arbiters $200_2$, $200_3$, and $200_n$ at the previous level using assigned weights to order the candidates in each round of round robin selection. Weighted round robin arbiter 300 passes its selected queue as a selection candidate to the next level in the hierarchy, which is the highest level. A priority arbiter 302 at the highest level in the hierarchy selects from the output of arbiter 300, the admin queue 112, and the output of arbiter 200, using host assigned priorities. While the mechanism illustrated in FIG. 3 allows for prioritization of commands, the priorities are statically set by the host and do not consider submission queue command statistics or nonvolatile storage device resource state. As a result, commands that cannot be immediately processed may be fetched while other commands that could be immediately processed remain enqueued in the submission queues.

Figure 4:
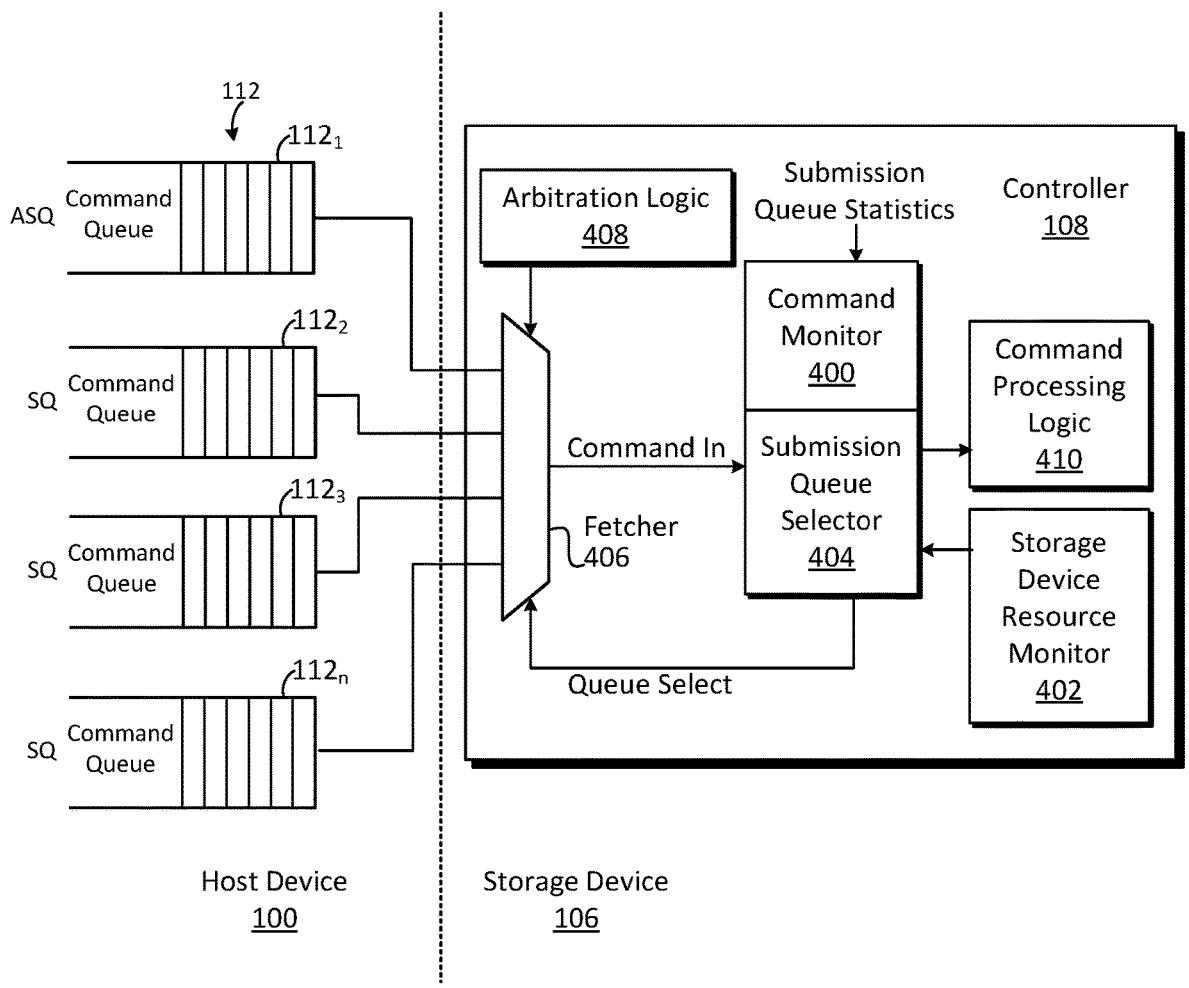
FIG. 4 is a block diagram illustrating a system for intelligent submission queue command fetching according to an embodiment of the subject matter described herein.

FIG. 4 is a block diagram illustrating intelligent fetching of commands from submission queues according to an embodiment of the subject matter described herein. In FIG. 4, device controller 108 includes a command monitor 400 that collects submission queue statistics and a storage device resource monitor 402 that monitors storage device resource state. Examples of submission queue statistics that may be collected are illustrated in FIG. 5. In FIG. 5, the submission queue statistics include, for each submission queue, the number of pending commands, the number of commands fetched from the queue, the number of read commands fetched from the queue, the ratio of read commands to write commands fetched from the queue, the average command size, the smallest command size, and the largest command size.

Statistics such as those illustrated in FIG. 5 may be used to determine the type of commands that are likely to come from a particular submission queue, given statistics on commands that have historically been fetched from the submission queue. For example, it may be determined that a particular submission queue historically contains read commands 90% of the time or write commands 90% of the time and thus the submission queue is likely to contain read or write commands in the future. In another example, the statistics may be used to determine that a particular queue historically contains a majority of random I/O commands or a majority of sequential I/O commands and thus is likely to contain a majority of random or sequential I/O commands in the future. In yet another example, the statistics may indicate commands of a particular size are historically present in a given queue, where the size of the commands refers to the amount of data written or read by a particular command. This command size information may be used by device controller 108 to predict that the next command from a particular submission queue is likely to be of a certain size or within a certain size range.

Information about the commands can be learned by device controller 108 as commands are fetched from the submission queues by reading the values of predetermined fields in the command structure. FIG. 6 illustrates an exemplary structure for an NVMe command. In FIG. 6, the opcode field specifies the type of command to be executed, i.e., read, write or admin. In the NVMe standard, a read command has opcode h1 and a write command has opcode h2. Other information that may be useful to device controller 108 in intelligent command fetching includes the size of the command, which is specified by the number of logical blocks (NLB) field in the opcode of the command. Thus, device controller 108 may read the NLB value in commands that it fetches to determine command size.

Information such as that illustrated in FIG. 5 can be used in combination with storage device resource state information to intelligently fetch commands. Returning to FIG. 4, submission queue selector 404 receives input from command monitor 400 regarding submission queue statistics and input from storage device resource monitor 402 regarding storage device resource state. Examples of storage device resource state information include the status of a read or write pipeline in the storage device, i.e., whether the pipeline is currently available to receive additional read or write commands. The terms "read pipeline" and "write pipeline" refer to components of nonvolatile storage device 106 respectively associated with reading data from and writing data to nonvolatile memory 109. Such components may include queues and circuitry internal to device controller 108, external to device controller 108, internal to nonvolatile memory 109, and/or external to nonvolatile memory 109. Submission queue selector 404 may utilize the submission queue statistics and the storage device resource state to identify one of submission queues $112_1$-$112_n$ from which the next command to be processed is selected and provide input to fetcher 406 that identifies the selected queue. Fetcher 406 receives the selection input from submission queue selector 404 and may also receive input from queue arbitration logic 408. Queue arbitration logic 408 may implement round robin, weighted round robin, or other selection algorithm as described above. In one example, the intelligent selection from submission queue selector 404 may override round robin or weighted round robin selection provided by queue arbitration logic 408. In another example, the selection input from command submission queue selector 404 may mask a particular queue from the current round of round robin or weighted round robin selection so that the queue is not included or passed over in the current round of round robin or weighted round robin selection.

One specific example of intelligent command fetching may be that the command monitor 400 determines that submission queue $112_1$ has historically contained mostly read commands and submission queue $112_2$ has historically contained mostly write commands. Storage device resource monitor 402 may determine that the storage device is currently incapable of processing write commands because the internal write pipeline is full, but the read pipeline is capable of processing read commands. In such a case, submission queue selector 404 will select submission queue $112_1$ as the submission queue from which the next command will be selected, which, based on the statistics, is likely to be a read command. A similar selection may be performed from submission queue $112_2$ if it is determined that the read pipeline is full but the write pipeline is available.

In another example, it may be desirable to select a number of random writes to fill a page of storage device memory with random writes. In such an example, command monitor 400 may determine that one of submission queues $112_1$ through $112_n$ has historically contained mostly random writes of small size, such as 4 kilobytes. Submission queue selector 404 may then fetch enough random writes from the identified queue to fill a page and may select a number of random writes from that queue to fill the page.

Figure 7A:
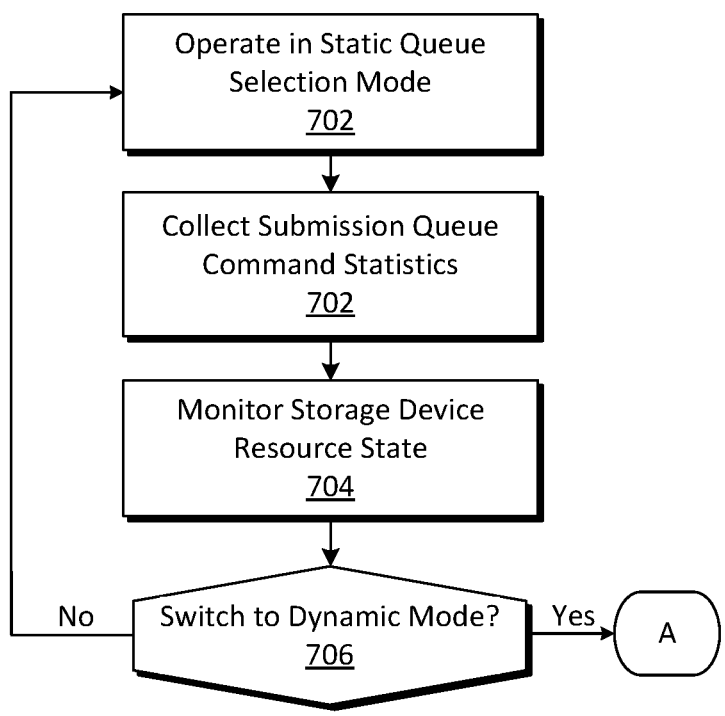
FIGS. 7A and 7B are flow charts illustrating a process for intelligent submission queue command fetching according to an embodiment of the subject matter described herein.
Figure 7B:
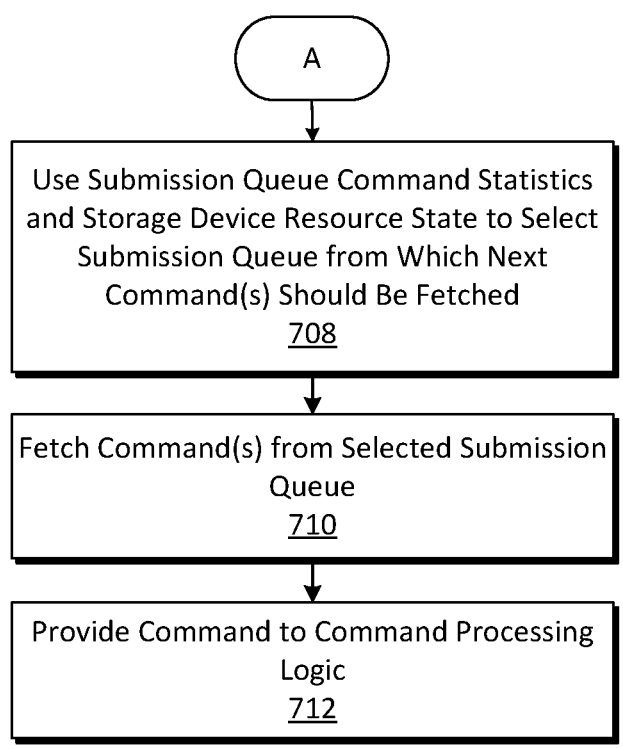

FIGS. 7A and 7B illustrate one embodiment of a method 700 for intelligent submission queue command fetching according to embodiment(s) of the subject matter described herein. One or more of the steps and/or operations of the method 700, and the other method(s) disclosed herein, may be implemented by the use of one or more: hardware components, instructions stored within a non-transitory medium, firmware, configuration data, programmable logic, and/or the like. Portions of the steps and/or operations may be implemented at and/or by one or more of the nonvolatile storage device 106, device controller 108, host device 100 (e.g., by a driver operating on the host device 100, the driver comprising computer-readable instructions stored within non-transitory storage accessible to the host device 100), and/or the like. Embodiments of the method(s) disclosed herein may be embodied as one or more circuits, programmable circuits, logic circuits, programmable logic circuits, control circuitry, device control circuitry, device controller circuitry, the device controller 108, microcode, firmware, configuration data (e.g., a Field Programmable Gate Array (FPGA) bitstream), a circuit design (e.g., a Very Large Scale Integrated (VLSI) circuit design), and/or the like.

Referring to FIG. 7A, in step 702, the storage device may initially operate in a static submission queue selection mode. Static submission queue selection mode may be round robin, weighted round robin or any other mode specified by the NVMe or other protocol where commands are fetched from submission queues in a static order. In steps 702 and 704, the device collects submission queue command statistics and monitors storage device resource state. Steps 702 and 704 may be performed continually, whether static command fetching, dynamic command fetching, or a combination of static and dynamic command fetching is being implemented. In step 706, it is determined whether to switch to dynamic mode. Switching to dynamic mode may be implemented, for example, when storage device resource state information indicates that one or more storage device resources are overor under-utilized. In another example, dynamic mode may be implemented continually and step 706 may be omitted.

Referring to FIG. 7B, once the storage device is in dynamic submission queue selection mode, control proceeds to step 708 where the storage device uses submission queue command statistics and storage device resource state to select the submission queue from which the next command or commands should be fetched. This step may be performed by device controller 108 using the statistics collected by command monitor 400 and the storage device resource state information collected by storage device resource monitor 402. In step 710, the command is fetched from the selected submission queue. For example, submission queue selector 404 may provide a selection input to fetcher 406 which fetches the command from the identified submission queue. In step 712, the command is provided to command processing logic 410. For example, submission queue selector 404 may provide the command to command processing logic 410. Command processing logic 410 may process the command, which may be a memory read, a memory write, or an admin command, and perform the selected operation on the nonvolatile memory device 106. Command processing logic 410 or a separate process may write an entry to a completion queue indicating completion of the command and an indication of whether the command was completed with or without error.

Device controller 108 may operate in dynamic submission queue selection mode as long as there is a constraint or limitation on available storage device resources. If the constraint or limitation is removed, device controller 108 may switch back into static submission queue selection mode. Thus, device controller 108 may control the switching of storage device 106 between static and dynamic submission queue selection modes depending on device resource state.

The device controller 108 disclosed herein may be configured for operation in various different types of computing environments, including virtual computing environments. In some embodiments, the device controller 108 is configured to support virtualization of the services provided thereby. As used herein, "virtualization" refers to representing and/or managing a computing resource as one or more virtualized resources. The device controller 108 may be configured to support one or more virtualization mechanisms and/or virtualization standards. The device controller 108 may, for example, comprise and/or support a plurality of input/output virtualization (IOV) functions. Each IOV may comprise a respective set of host-based submission queues. Host-based processes may directly submit commands to respective IOV, bypassing the hypervisor (or other virtualization layers).

Figure 8A:
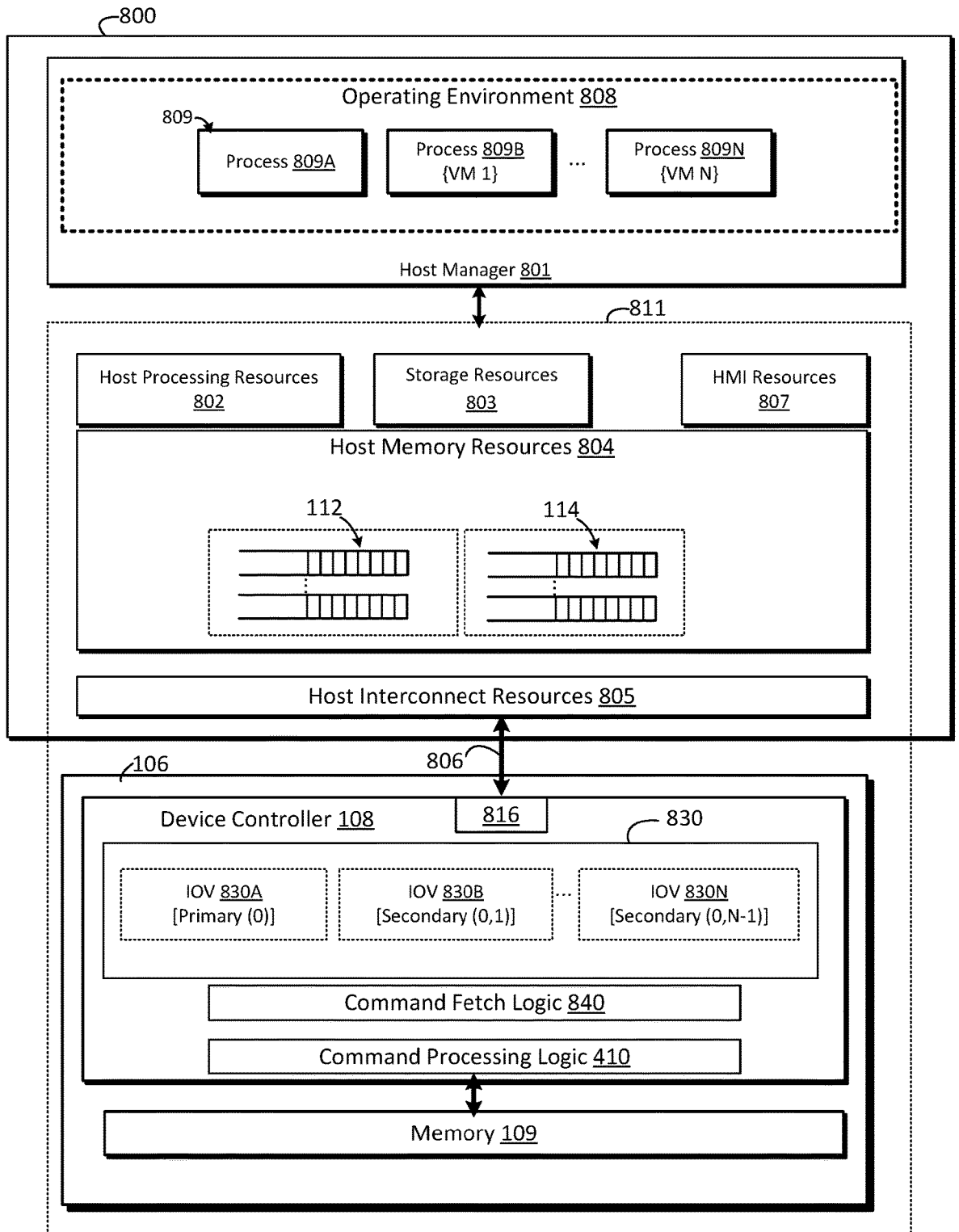
FIG. 8A is a schematic block diagram of one embodiment of a nonvolatile storage device configured to arbitrate between submission queues in a virtual computing environment.

FIG. 8A is a schematic block diagram of one embodiment of a system comprising a device controller 108 configured to manage instruction fetching in a virtualized computing environment. In the FIG. 8A embodiment, the device controller 108 is configured to interface with a host platform 800. The host platform 800 may comprise any suitable means for implementing a computing environment, which may include, but are not limited to: a computing device, a computing system, a server computing device, a host device (e.g., the host device 100, as disclosed above), a host system, a mobile computing device, a mobile communication device (e.g., smartphone), an embedded computing device, a stand-alone computing device, a plurality of computing devices, a highly available computing system, a cluster of computing devices, and/or the like. The host platform 800 may comprise a host manager 801, which may be configured to, inter alia, host one or more processes 809 within an operating environment 808 of the host platform 800 (e.g., processes 809A-N), manage computing resources 811 of the host platform 800, and so on. In the FIG. 8A embodiment, the process 809B may comprise virtual machine VM_1, and the process 809N may comprise virtual machine VM_N. The host manager 801 may comprise, but is not limited to: an operating system, a host operating system, a bare-metal operating system, a hypervisor, a Virtual Machine Monitor (VMM), a Hardware Abstraction Layer (HAL), and/or the like. The processes 809 may comprise any suitable means for implementing computing services, operations, and/or tasks, including, but not limited to: a computing process, a kernel-level process, a user-level process, a thread, an application, an emulator, a virtual machine, a virtual operating system, and/or the like.

The host platform 800 may comprise any suitable computing resources 811, including, but not limited to, one or more of: host processing resources 802, storage resources 803, host memory resources 804, host interconnect resources 805 (including interconnect 806), Human-Machine Interface (HMI) resources 807, and/or the like. The host processing resources 802 may include, but are not limited to: a central processing unit (CPU), a general-purpose CPU, an application-specific CPU, an integrated circuit, an application-specific integrated circuit (ASIC), programmable logic, a programmable logic array (PLG), a Field Programmable Gate Array (FPGA), a virtual processing resource, a virtual processing unit, a virtual CPU, and/or the like. The storage resources 803 may comprise any suitable means for storing electronic data including, but not limited to, one or more: memory devices, storage devices, non-transitory storage devices, persistent storage devices, nonvolatile storage devices, magnetic storage devices (hard drive storage devices), optical storage devices, nonvolatile random access memory (RAM), Electrically Erasable Programmable Read-Only Memory (EEPROM), the nonvolatile storage device 106, and/or the like. The host memory resources 804 may comprise system memory, cache memory, virtual memory, RAM, volatile RAM, DRAM, static RAM (SRAM), and/or the like. The host memory resources 804 may comprise memory components that are tightly coupled to the host processing resources 802, such as on-CPU cache memory, CPU registers, and/or the like. The host memory resources 804 may further comprise memory management resources, such as a memory controller, a virtual memory manager, a cache manager, and/or the like. The host interconnect resources 805 may comprise any suitable means for interconnecting the computing resources 811 of the host platform 800. The host interconnect resources 805 may comprise means for operatively coupling the nonvolatile storage device 106 to the host platform 800. The HMI resources 807 may comprise any suitable means for interfacing with user(s) of the host platform 800, which may include, but are not limited to: input devices, user input devices, keyboards, pointer devices, touch devices, audio capture devices, image capture devices, video capture devices, output devices, user output devices, display devices, audio output devices, haptic feedback devices, and/or the like. Although FIG. 8A depicts one embodiment of an exemplary host platform 800, the disclosure is not limited in this regard, and could be adapted for use within any suitable host platform 800 comprising any suitable computing resources 811 deployed in any suitable configuration and/or arrangement (e.g., a cluster of host computing systems, one or more highly available computing systems, one or more primary and/or backup computing systems, and/or the like). The HMI resources 807 may comprise any suitable means for interfacing with user(s) of the host platform 800, which may include, but are not limited to: input devices, user input devices, keyboards, pointer devices, touch devices, audio capture devices, image capture devices, video capture devices, output devices, user output devices, display devices, audio output devices, haptic feedback devices, and/or the like.

In the FIG. 8A embodiment, the device controller 108 is operatively coupled to the host interconnect resources 805 through the interconnect 806. The interconnect 806 may comprise any suitable means for operatively coupling the nonvolatile storage device 106 to the host platform 800, including, but not limited to, one or more of: a bus, a bus controller, an I/O bus, an I/O bus controller, a Small Computer System Interface (SCSI) bus and/or controller, a Fibre Channel bus and/or controller, a Remote Data Memory Access (RDMA) bus and/or controller, a peripheral component interconnect (PCI) bus and/or controller, a PCI express (PCIe) bus and/or controller, a Serial Advanced Technology Attachment (serial ATA) bus and/or controller, a Universal Serial Bus (USB) and/or controller, an Institute of Electrical and Electronics Engineers (IEEE) 1394 bus and/or controller, a network interface, an Internet Protocol (IP) network interface, an Ethernet network interface, an Infiniband interface and/or controller, and/or the like. Although FIG. 8A depicts one embodiment of an exemplary host platform 800, the disclosure is not limited in this regard, and could be adapted for use within any suitable host platform 800 and/or computing environment comprising any suitable computing resources 811 deployed in any suitable configuration and/or arrangement (e.g., a cluster of host computing systems, one or more highly available computing systems, one or more primary and/or backup computing systems, and/or the like).

Host processes, such as the host manager 801 and/or processes 809, may access storage services of the nonvolatile storage device 106 by, inter alia, submitting commands to one or more submission queues 112, and retrieving completion entries from corresponding completion queues 114. The submission queues 112 and/or completion queues 114 may be maintained within the host memory resources 804 of the host platform 800, as disclosed herein. As illustrated in FIG. 8A, the host memory resources 804 may comprise a set of submission queues 112 associated with the nonvolatile storage device 106. In some embodiments, the processes 809A-N (e.g., virtual machines VM_1 and VM_N) may access the nonvolatile memory device 106 through, inter alia, the host manager 801. The processes 809A-N may submit commands to the host manager 801, which may process the commands (e.g., translate the commands from a namespace managed by the host manager 801 to a shared namespace associated with the device controller 108), and submit the processed commands to the one or more submission queues 112. The host manager 801 may, however, become a limiting factor in I/O performance within the host platform 800 (e.g., may become an I/O bottleneck).

In some embodiments, the device controller 108 may be configured to support virtualization of the nonvolatile storage device 106, which may enable multiple System Images (SIs), such as virtual machines VM_1 and/or VM_N running within the operating environment 808, to access the nonvolatile storage device 106 directly, thereby eliminating the host manager 801 from certain I/O operations. The device controller 108 may support one or more virtualization standards and/or specifications, such as the PCI-SIG Single Root I/O Virtualization and Sharing Specification (SR-IOV). The disclosure is not limited in this regard, however, and may be adapted for use with other virtualization standards and/or specifications including, but not limited to: Multi-Root I/O Virtualization (MR-IOV), vendor-specific virtualization specifications, and/or the like.

In the FIG. 8A embodiment, the device controller 108 is configured to provide access to the nonvolatile storage device 106 through, inter alia, a plurality of VFs 830, including a primary VF 830A and one or more secondary VFs 830B-N. The VFs 830 may comprise and/or correspond to respective PCIe functions (e.g., Virtual Functions, Physical Functions, and/or the like). The primary VF 830A may comprise and/or correspond to an interface function that supports SR-IOV functionality. The primary IOV function 830A may comprise and/or correspond to a Primary or Physical PCIe function, and the secondary VF 830B-N may comprise and/or correspond to respective PCIe Virtual Functions (in accordance with the PCI-SIG SR-IOV specification). Alternatively, or in addition, the primary IOV function 830A may comprise and/or correspond to a primary or physical function in accordance with another virtualization standard and/or specification. Each VF 830 may correspond to a respective controller (a virtualized controller). The controller of the primary IOV function 830A may comprise and/or correspond to a primary or physical controller, and the secondary IOV functions 830B-N may comprise and/or correspond to respective secondary controllers. Each controller may provide storage services in accordance with one or more standards and/or specification (e.g., each controller may comprise a respective NVMe controller, as disclosed herein).

In some embodiments, each IOV function 830 may comprise and/or correspond to a respective submission queues 112 and completion queues 114 maintained within the host platform 800 (e.g., within the host memory resources 804). Each submission queue 112 may comprise and/or be associated with submission queue metadata, which may comprise any suitable information pertaining to a submission queue 112 including, but not limited to, one or more of: a submission queue identifier (SQID) (e.g., a unique identifier of the submission queue 112 within the host platform 800), an IOV identifier (e.g., an identifier of the IOV function 830 to which the submission queue 112 corresponds), a priority classification, and/or the like. The priority of a submission queue 112 may indicate one or more of the type and/or priority classification of commands to be queued within the submission queue 112 (e.g., may indicate that the submission queue 112 is configured to queue one or more of: admin, urgent, high priority, medium priority, low priority, and/or other types of commands). A submission queue 112 may be associated with a respective IOV function 830 (e.g., by use of an identifier, such as an IOV function identifier, controller identifier, namespace identifier) and/or the like. In some embodiments, each submission queue 112 is associated with one of the IOV functions 830A-N. Each submission queue 112 may correspond to a respective completion queue 114. As disclosed herein, the submission queues 112 and/or completion queues 114 may be maintained within the host memory resources 804 by one or more of the host manager 801, the device controller 108, a driver of the nonvolatile storage device 106 and/or device controller 108 (not shown in FIG. 8A to avoid obscuring details of the illustrated embodiments), and/or the like.

Virtualized environments, such as the host platform 800, may use the IOV functions 830A-N to, inter alia, provide each host process and/or System Image (SI) thereof with direct I/O access to the nonvolatile memory device 106. In some embodiments, each host process or SI that requires access to the nonvolatile storage device 106 may be allocated a respective IOV function 830. In the FIG. 8A embodiment, the primary IOV function 830A may be allocated to the host manager 801, and the secondary IOV functions 830B-N may be allocated to virtual machines VM_1-N, respectively. The host manager 801 may be configured to submit commands to the submission queues 112 associated with the primary IOV function 830A, including commands to create, destroy, and/or configure the secondary IOV function(s) 830B-N respective virtual machines VM_1-N. Each of the virtual machines VM_1-N of the processes 809B-N may be configured to issue commands directly to the submission queues 112 associated with the secondary IOV function(s) 830B-N provisioned thereto, bypassing the host manager 801 (e.g., virtual machine VM_1 may be configured to submit commands directly to the submission queue(s) 112 of the secondary IOV function 830B, and so on, with VM_N being configured to submit commands directly to the submission queue(s) 112 associated with the secondary IOV function 830N).

The device controller 108 may comprise interface logic 816 configured to, inter alia, operatively couple the nonvolatile storage device 106 to the interconnect 806 (and/or other host interconnect resources 805 of the host platform 800). The interface logic 816 may be configured to transfer commands, data, and/or other information between the nonvolatile memory device 106 and the host platform 800 (e.g., the host memory resources 804). The interface logic 816 may comprise one or more of an interconnect interface, a bus interface, an interconnect controller, a bus controller, a DMA interface, a DMA controller, and/or the like.

The device controller 108 may further comprise command fetch logic 840 and command processing logic 410. The command fetch logic 840 may be configured to fetch commands for execution from respective submission queues 112, which may comprise arbitrating between the plurality of submission queues 112 associated with the nonvolatile storage device 106 in accordance with one or more arbitration schemes. In the FIG. 8A embodiment, the command fetch logic 840 may be configured to arbitrate the submission queues 112 associated with the different respective IOV functions 830, which may comprise implementing one or more arbitration schemes based on, inter alia, the IOV function(s) 830 associated with the respective submission queues 112, priorities of the respective submission queues 112, QoS policies associated with the respective IOV function(s) 830, and/or the like.

Figure 8B:
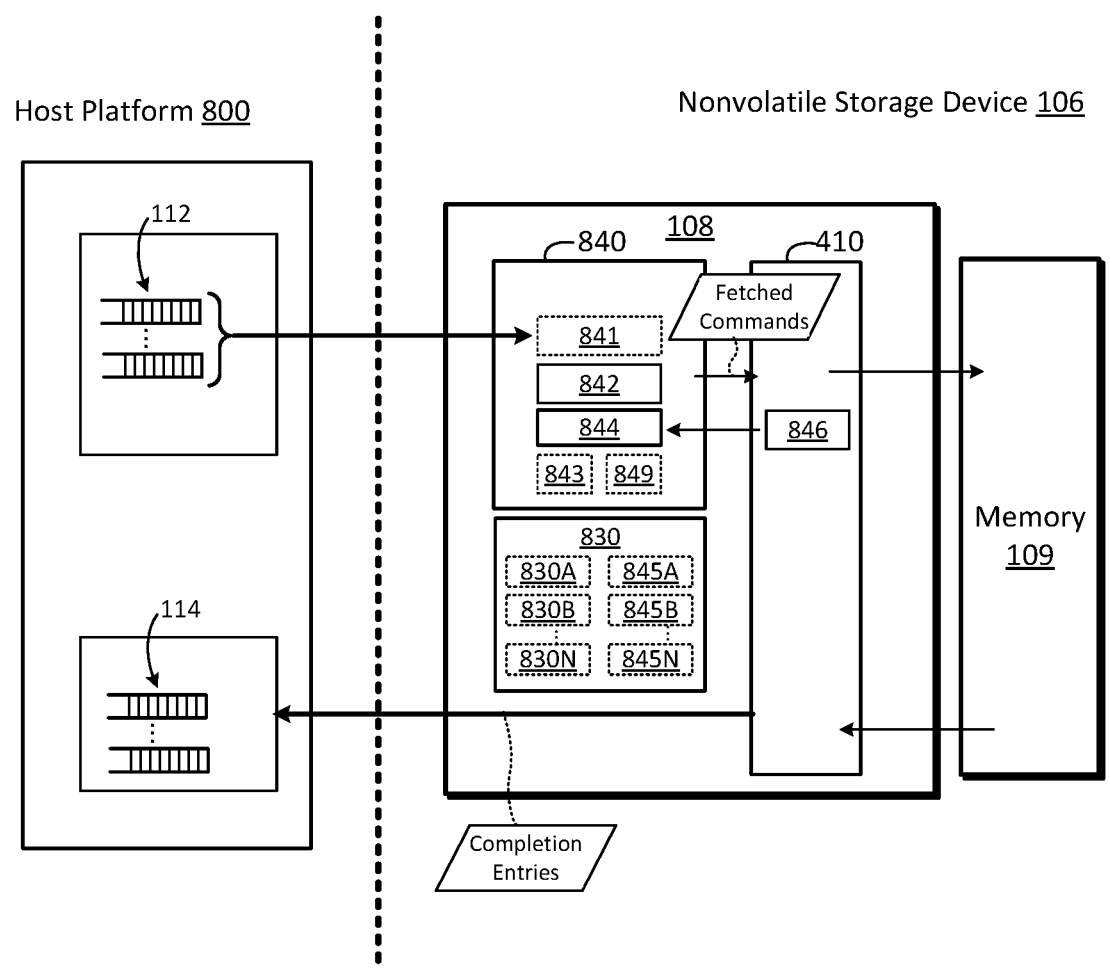
FIG. 8B is a schematic block diagram of further embodiments of a nonvolatile storage device configured to arbitrate between submission queues in a virtual computing environment.

FIG. 8B is a schematic block diagram illustrating further embodiments of a nonvolatile storage device 106 configured to arbitrate command fetching between a plurality of IOV functions 830, as disclosed herein. The command fetch logic 840 of the device controller 108 may be configured to fetch commands for execution by the command processing logic 410. The command processing logic 410 may execute the fetched commands by use of, inter alia, the memory 109. Commands may be transferred from the host memory resources 804 to the device controller 108 through the interconnect 806 (e.g., by use of interface logic 816 of the device controller 108). Each submission queue 112 may correspond to a respective IOV function 830A-N implemented by the device controller 108 and/or may have a respective priority, which may, inter alia, determine the type(s) and/or priority classification(s) of the commands to be queued therein.

The command fetch logic 840 may comprise arbitration logic 842, which may be configured to select the submission queue(s) 112 from which the command fetch logic 840 is to fetch one or more command(s) for execution at the nonvolatile storage device 106 (e.g., select a currently-selected submission queue 841). As disclosed in further detail herein, the arbitration logic 842 may be configured to implement selection and/or arbitration operations. As used herein, a "selection operation" refers to an operation to select a submission queue 112 from a plurality of submission queues 112. A selection operation may comprise selecting a submission queue 112 from a plurality of submission queues 112, each submission queue 112 corresponding to one of a plurality of IOV functions 830A-N and having a respective type and/or priority classification. A selection operation may further comprise fetching one or more commands from a selected submission queue 112. A selection operation may comprise selecting one of a plurality of IOV functions 830A-N and/or selecting a submission queue 112 from the submission queues 112 from one of the IOV functions 830 (e.g., selecting a submission queue 112 from a subset of the plurality of submission queues 112 that includes submission queues 112 of a particular IOV function 830 and excludes submission queues 112 of other IOV functions 830). As used herein, an "arbitration operation" refers to arbitrating between a plurality of submission queues 112 in accordance with one or more arbitration schemes. An arbitration operation may comprise arbitrating between a plurality of submission queues 112, each submission queue 112 corresponding to one of a plurality of different IOV functions 830A-N and having a respective type and/or priority classification. An arbitration operation may further comprise designating a currently-selected submission queue 841 and/or fetching one or more commands from the currently-selected submission queue 841. An arbitration operation may comprise fetching commands from the currently-selected submission queue 841 until interrupted (e.g., fetching command(s) until one or more arbitration criteria are satisfied). An arbitration operation may comprise arbitrating between IOV functions 830, which may comprise selecting one of a plurality of IOV functions 830A-N, the IOV function 830 remaining selected until one or more arbitration criteria are satisfied. An arbitration operation may further comprise arbitrating between the submission queues 112 of a selected IOV function 830 (e.g., arbitrating between a subset of the plurality of submission queues 112 that includes submission queues 112 of the selected IOV function 830 and excludes submission queues 112 of other IOV functions 830).

The arbitration logic 842 may be configured to implement selection and/or arbitration operations, which may comprise designating the currently-selected submission queue 841 of the command fetch logic 840. In response, the command fetch logic 840 may be configured to fetch command(s) from the currently-selected submission queue 841. The command fetching logic 840 may fetch commands from the currently-selected submission queue 841 until interrupted.

In some embodiments, the command fetch logic 840 may further comprise an arbitration manager 844. The arbitration manager 844 may be configured to, inter alia, control selection and/or arbitration operations of the arbitration logic 842 (e.g., configure the arbitration logic 842 to implement arbitration and/or selection operations to designate and/or replace the currently-selected submission queue 841 of the command fetch logic 840). The arbitration manager 844 may be configured to, inter alia, interrupt command fetching. Interrupting command fetching may comprise configuring the command fetch logic 840 to stop, pause, and/or otherwise interrupt the transfer of commands from the currently-selected submission queue 841 to the nonvolatile storage device 106. Interrupting command fetching may comprise configuring the arbitration logic 842 to perform an arbitration operation to, inter alia, select a next submission queue 112 to replace the currently-selected submission queue 841 (if any) and/or replace the currently-selected submission queue 841 with a result of the arbitration operation. The arbitration manager 844 may be configured to interrupt command fetching in response to determining that the currently-selected submission queue 841 is empty and/or any other suitable criteria (e.g., arbitration criteria 849, as disclosed in further detail herein). The arbitration manager 844 may be configured to monitor commands fetched from the currently-selected submission queue 841 and initiate operations to replace the currently-selected submission queue 841 in response to the monitoring. The arbitration manager 844 may configure the arbitration logic 842 to implement arbitration operations, which may include, but are not limited to: queue-level arbitration operations, IOV-level arbitration operations, and/or the like. As used herein, a "queue-level arbitration operation" refers to arbitration between a respective set, group, and/or collection of submission queues 112 (e.g., an operation to select a submission queue 112 from the submission queues 112 of a particular IOV function 830 of a plurality of IOV functions 830A-N). As used herein, an "IOV-level arbitration operation," refers to arbitration between IOV functions 830 (e.g., an operation to select an IOV function 830 of a plurality of IOV functions 830A-N). A queue-level arbitration operation may comprise selecting a next submission queue 112 of a currently-selected IOV function 830, without arbitrating between the IOV functions 830A-N (e.g., while retaining the currently-selected IOV function 830). An IOV-level arbitration may comprise replacing the currently-selected IOV function 830 with a next IOV function 830A-N (and/or arbitrating between the submission queues 112 of the next IOV function 830A-N).

Commands fetched from the currently-selected submission queue 841 may be executed by, inter alia, the command processing logic 410. The command processing logic 410 may comprise a command monitor 846, which may be configured to monitor commands fetched from respective submission queues 112 and/or IOV functions 830. The command monitor 846 may be configured to parse portions of the fetched commands and/or provide information pertaining to the fetched commands to the arbitration manager 844. The command monitor 846 may comprise and/or be communicatively coupled to a command parser and/or command parse logic (not shown in FIG. 8B to avoid obscuring details of the illustrated embodiments). The command monitor 846 may be further configured to determine and/or record command statistics pertaining to commands fetched from respective submission queues 112 and/or IOV functions 830.

The arbitration manager 844 may be configured to control interruption of command fetching (and/or trigger arbitration and/or selection operations of the arbitration logic 842) based on one or more arbitration criteria 849. The arbitration criteria 849 may comprise any suitable criteria for interrupting command fetching from a particular submission queue 112 (and/or submission queue(s) 112 of a particular IOV function 830) and/or triggering an arbitration operation. The arbitration criteria 849 may comprise queue-level arbitration criteria, IOV-level arbitration criteria, and/or the like. Queue-level arbitration criteria may be configured to manage queue-level arbitration operations (e.g., initiate arbitration between one or more submission queues 112, such as the submission queues 112 of a currently-selected IOV function 830). IOV-level arbitration criteria may be configured to manage IOV-level arbitration operations, which may comprise arbitrating between a plurality of IOV functions 830A-N (and may be followed by a queue-level arbitration operation between the submission queues 112 of the IOV function 830 selected in the IOV-level arbitration).

The arbitration criteria 849 may include, but are not limited to, one or more of: interrupt criteria, queue criteria, burst criteria, command threshold criteria, time-based criteria, command count criteria, data criteria, credit-based criteria, and/or the like. Interrupt criteria may be configured to control interruption of command fetching in response to specified interrupt events. Interrupt criteria may specify interrupt events that should be ignored for specified submission queues 112 and/or IOV functions 830. For example, the interrupt criteria for a selected submission queue 112 may specify that interruption events pertaining to lower-priority queues should be ignored (e.g., interrupt events pertaining to submission of new commands to one or more lower-priority submission queues 112). Interrupt criteria may further specify events to trigger arbitration operations, such as determining that one or more commands have been queued within one or more higher-priority submission queues 112 (e.g., admin and/or urgent priority submission queue(s) 112). Queue criteria may pertain particular submission queue(s) 112 (e.g., the currently-selected submission queue 841. submission queues 112 of a currently-selected IOV function 830, a group of submission queues 112, and/or the like). Queue criteria may be configured to initiate arbitration operation(s) in response to: determining that the currently-selected submission queue 841 is empty (and/or comprises fewer than a threshold number of queued commands); submission queues 112 of a currently-selected IOV function 830 are empty (and/or comprise fewer than a threshold number of queued commands); submission queue 112 of a group of submission queues 112 are empty (and/or comprise fewer than a threshold number of queued commands); and/or the like.

The arbitration manager 844 may be configured to evaluate arbitration criteria 849 based on, inter alia, information pertaining to commands fetched from the currently-selected submission queue 841 and/or submission queue(s) of a currently-selected IOV function 830. The arbitration manager 844 may be configured to capture arbitration monitoring data 843 by use of the command monitor 846. The arbitration monitoring data 843 may pertain to commands fetched from the currently-selected submission queue 841 designated by the arbitration logic 842 and/or submission queue(s) 112 of a currently-selected IOV function 830. The arbitration manager 844 may evaluate the arbitration monitoring data 844 in order to, inter alia, determine whether one or more of the arbitration criteria 849 are satisfied (e.g., trigger interruption of command fetching). The arbitration monitoring data 843 may comprise queue-level arbitration metadata pertaining to commands fetched from the currently-selected submission queue 841 and/or IOV-level arbitration metadata pertaining to commands fetched from submission queue(s) 112 of a currently-selected IOV function 830.

The arbitration criteria 849 may specify a number of commands to fetch from specified submission queue(s) 112 and/or submission queue(s) of respective IOV function(s) 830 (e.g., burst criteria). The arbitration manager 844 may implement arbitration burst criteria for the currently-selected submission queue 841 by, inter alia, monitoring a number of commands fetched from the currently-selected submission queue 841 (by use of the command monitor 846), preventing selection of a next submission queue 112 (and/or interruption of command fetching from the currently-selected submission queue 841) until a threshold number of commands have been fetched therefrom, and/or enabling selection of a next submission queue 112 by the arbitration logic 842 in response to determining that the threshold number of commands have been fetched (and/or the selected submission queue 112 is empty). The arbitration manager 844 may implement an arbitration burst criteria for a currently-selected IOV function 830 by, inter alia, monitoring a number of commands fetched from submission queue(s) 112 of the currently-selected IOV function (by use of the command monitor 846), preventing selection of a next IOV function 830 (and/or interruption of command fetching from the submission queue(s) 112 of the currently-selected IOV function 830) until a threshold number of commands have been fetched therefrom, and/or enabling selection of a next IOV function 830 by the arbitration logic 842 in response to determining that the threshold number of commands have been fetched (and/or the selected submission queue 112 is empty).

The arbitration criteria 849 may define one or more command thresholds (command threshold criteria), such as a minimum threshold, a maximum threshold, and/or the like. The arbitration manager 844 may implement a command threshold criteria for a currently-selected submission queue 841 (e.g., queue-level arbitration criteria) by, inter alia, monitoring a number of commands fetched therefrom (by use of the command monitor 846), preventing interruption of command fetching until a minimum threshold is reached, enabling interruption in response to determining that the minimum threshold has been satisfied, and/or interrupting fetching in response to reaching a maximum threshold. The arbitration manager 844 may implement a command threshold criteria for a currently-selected IOV function (IOV-level arbitration criteria) by, inter alia, monitoring a number of commands fetched from submission queue(s) 112 thereof (by use of the command monitor 846), preventing selection of a next IOV function 830 until a minimum threshold is reached, enabling interruption in response to determining that the minimum threshold has been satisfied (enabling selection of a next IOV function 830 by the arbitration logic 842), and/or interrupting fetching from submission queue(s) 112 of the currently-selected IOV function 830 in response to reaching a maximum threshold.

The arbitration criteria 849 may comprise time-based criteria, which may designate the time for which the command fetch logic 840 is to fetch commands from specified submission queue(s) 112 and/or submission queues 112 of specified IOV functions 830 (e.g., the time for which the specified submission queue(s) 112 and/or IOV function(s) 830 are to remain selected). The arbitration manager 844 may implement a time-based criteria for a currently-selected submission queue 841 (queue-level arbitration criteria) by, inter alia, monitoring the time for which the currently-selected submission queue 841 has remained selected (e.g., the time for which the command fetch logic 840 has been fetching commands therefrom), preventing interruption until a minimum time threshold has been reached, enabling interruption after the minimum time threshold has been satisfied, and/or interrupting fetching in response to exceeding a maximum time threshold. The arbitration manager 844 may be configured to record a timestamp when a submission queue 112 is selected by the arbitration logic 842 (e.g., designated as the currently-selected submission queue 841), and may determine the time for which the submission queue 112 has remained selected by comparing a current time to the recorded timestamp. The arbitration manager 844 may implement a time-based criteria for a currently-selected IOV function 830 (IOV-level arbitration criteria) by, inter alia, monitoring the time for which the currently-selected IOV function 830 has been selected (e.g., the time for which the command fetch logic 840 has been fetching commands from submission queue(s) 112 of the currently-selected IOV function 830), preventing interruption until a minimum time threshold has been reached (e.g., preventing selection of a next IOV function 830), enabling interruption after the minimum time threshold has been satisfied, and/or interrupting fetching in response to exceeding a maximum time threshold (e.g., triggering selection of a next IOV function 830). The arbitration manager 844 may be configured to record a timestamp when an IOV function 830 is selected by the arbitration logic 842, and may determine the time for which the IOV function has remained selected by comparing a current time to the recorded timestamp.

The arbitration criteria 849 may define data size and/or bandwidth threshold(s) pertaining to the specified submission queues 112 (data and/or bandwidth criteria). The arbitration manager 844 may implement a data criteria for a currently-selected submission queue 841 (queue-level criteria) by, inter alia, monitoring command(s) fetched from the currently-selected submission queue 841 (by use of the command monitor 846), estimating an amount of data and/or bandwidth to be consumed during execution of the monitored commands (e.g., estimating an amount of data to be transferred to/from the nonvolatile storage device 106 via the interconnect 806 during execution of the monitored commands), preventing interruption until an estimated amount of data and/or bandwidth satisfies a minimum data size and/or bandwidth threshold, enabling interruption in response to determining that the minimum threshold has been satisfied, and/or interrupting command fetching in response to exceeding a maximum data size and/or bandwidth threshold. The arbitration manager 844 may implement a data criteria for a currently-selected IOV function 830 (IOV-level arbitration criteria) by, inter alia, monitoring command(s) fetched from submission queue(s) 112 of the currently-selected IOV function 830 (by use of the command monitor 846), estimating an amount of data and/or bandwidth to be consumed during execution of the monitored commands, preventing interruption until the estimated amount of data and/or bandwidth satisfies a minimum data size and/or bandwidth threshold (e.g., preventing selection of a next IOV function 830), enabling interruption in response to determining that the minimum threshold has been satisfied, and/or interrupting command fetching in response to exceeding a maximum data size and/or bandwidth threshold.

The arbitration criteria 849 may be configured to selectively interrupt command fetching from specified submission queues 112 based on, inter alia, an amount of remaining fetch credits allocated to the specified submission queues 112 (credit-based criteria). As disclosed in further detail herein, in some embodiments, the command fetch logic 840 may be configured to implement a credit-based arbitration scheme in which each IOV function 830 is allocated a determined amount of command fetch credits (referred to as "credits" or "arbitration credits" herein). Fetching commands from submission queues 112 of respective IOV functions 830 may consume a portion of the credits allocated thereto. The amount of credits consumed by a fetched command may be based on, inter alia, determined credit characteristics of the command. The arbitration manager 844 may be configured to implement a credit-based criteria for a selected submission queue 112 by, inter alia, monitoring command(s) fetched from the selected submission queue 112, determining an amount of credits consumed by the fetched commands, determining a remaining amount of credits allocated to the IOV function 830 corresponding to the selected submission queue 112 (e.g., by subtracting the amount of credits consumed by the fetched commands from the remaining credits allocated to the IOV function 830), and/or interrupting command fetching from the selected submission queue 112 in response to consuming a determined amount of credits of the IOV function 830 and/or the remaining amount of credits of the IOV function 830 falling below one or more thresholds.

The arbitration criteria 849 disclosed herein may be used to trigger any suitable arbitration operation including queue-level arbitration operations, IOV-level arbitration operations, and/or the like. As disclosed above, a queue-level arbitration operation may comprise arbitrating between a set, group, and/or collection of submission queues 112 (e.g., the submission queues 112 of a particular IOV function 830A-N), and an IOV arbitration operation may comprise arbitrating between a plurality of IOV functions 830A-N. A group-level arbitration operation may comprise arbitrating between the submission queues 112 of a particular IOV function 830 (without arbitrating between the submission queues 112 of other IOV function(s) 830). An IOV-level arbitration operation may comprise selecting one of a plurality of IOV functions 830 and, in response to the selection, implementing a queue-level arbitration operation between the submission queues 112 of the selected IOV function 830. The arbitration manager 844 may be configured to trigger queue- and/or IOV-level arbitration operations based on, inter alia, the arbitration monitoring data 843 and/or arbitration criteria 849 disclosed herein.

The arbitration criteria 849 pertaining to respective IOV function(s) 830 and/or submission queues 112 thereof, including the configuration, parameters, and/or settings pertaining thereto, may be defined by and/or maintained within arbitration metadata 845. The arbitration metadata 845 may comprise any suitable information pertaining to an IOV function 830 (and/or the submission queues 112 of the IOV function 830) including, but not limited to: parameters pertaining to respective arbitration criteria implemented by the arbitration manager 844, weights and/or priorities assigned to the IOV function 830 and/or respective submission queues 112 thereof, parameters pertaining to the submission queues 112 (e.g., submission queue size), QoS parameters, credits allocated to the IOV function 830, and/or the like. The arbitration metadata 845 of an IOV function 830 may be maintained within one or more of the host memory resources 804, the device controller 108 (e.g., in configuration storage of the device controller 108, such as an EEPROM, register(s), buffers, RAM, and/or the like), the nonvolatile storage device 106, the memory 109, and/or the like. In some embodiments, each IOV function 830 may comprise and/or correspond to a respective arbitration metadata 845 (e.g., arbitration metadata 845A-N corresponding to the IOV functions 830A-N). The arbitration metadata 845 of an IOV function 830 may be managed by, inter alia, the primary IOV function 830A (e.g., by issuing commands to the primary IOV function 830A). The arbitration manager 844 may apply different respective arbitration criteria (and/or different arbitration parameters) to respective IOV function(s) 830 and/or submission queue(s) 112, in accordance with the arbitration metadata 845 thereof. Although particular examples of arbitration criteria for interrupting command fetching from currently-selected submission queue(s) 112 (and/or triggering selection of the next submission queue(s) 112) are described herein, the disclosure is not limited in this regard and could be adapted to use any suitable arbitration criteria, condition(s), and/or event(s) to control command fetching.

Commands fetched from the host memory resources 804 (from the selected submission queues 112) may be executed at the nonvolatile storage device 106 (by use of the command processing logic 410 and/or memory 109, as disclosed herein). The device controller 108 may be configured to generate completion entries corresponding to the executed commands, which may be written to the one or more host-based completion queues 814, as disclosed herein. The completion entries may be transferred to the host memory resources 804 via, inter alia, the interconnect 806. In some embodiments, each submission queue 112 may correspond to a respective completion queue 114. Completion entries for commands fetched from the respective submission queues 112 may be written to a corresponding completion queues 114.

As disclosed above, the arbitration logic 842 may be configured to implement queue selection and/or arbitration operations, which may comprise selecting submission queue(s) 112 from which to fetch command(s) from the plurality of submission queues 112 in accordance with one or more arbitration and/or queue selection schemes. The arbitration logic 842 may be configured to arbitrate between the submission queue(s) 112 based on, inter alia, the IOV function(s) 830 associated with the submission queues 112, a status of the submission queues 112, priorities of the submission queues 112, and/or the like. The result of an arbitration operation of the arbitration logic 842 may comprise selection of a submission queue 112 (and/or IOV function 830). The result may be designated as the currently-selected submission queue 841 from which the command fetch logic 840 fetches commands. The command fetch logic 840 may fetch commands from the currently-selected submission queue 841 until interrupted by the arbitration manager 844, as disclosed herein.

Figure 8C:
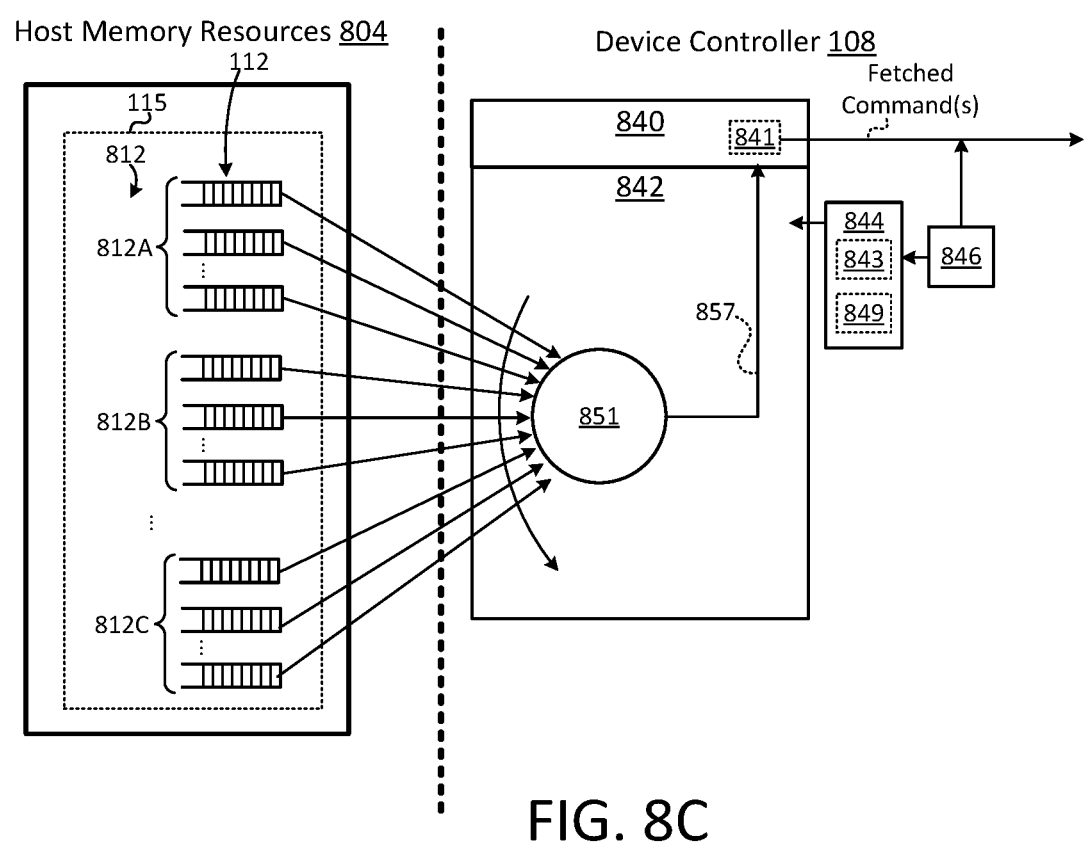
FIG. 8C is a schematic block diagram of one embodiment of a flat arbitration scheme implemented by the disclosed nonvolatile storage device.

FIG. 8C is a schematic block diagram illustrating further embodiments of the device controller 108 disclosed herein. In the FIG. 8C embodiment, the arbitration logic 842 may be configured to implement a "flat" arbitration scheme in which the IOV functions 830A-N, and the submission queues 112 thereof, are assigned substantially a same weight and/or priority. Each IOV function 830A-N may comprise and/or correspond to a plurality of submission queues 112 (e.g., a respective set 812 of submission queues 112); the set 812A may comprise submission queues 112 of IOV function 830A, the set 812B may comprise submission queues 112 of IOV function 830B, and so on, with set 812N comprising submission queues 112 of IOV function 830N. The arbitration logic 842 may comprise a flat arbiter 851, which may be configured to arbitrate between the submission queues 112 of the plurality of IOV functions 830A-N. The flat arbiter 851 may be configured to implement a flat arbitration scheme in which each submission queue 112 of each IOV function 830A-N is assigned substantially a same weight and/or priority. The flat arbiter 851 may be configured to arbitrate between the submission queues 112 in accordance with a selected arbitration scheme, such as a round robin arbitration scheme. Each arbitration operation of the flat arbiter 851 may comprise selecting a submission queue 112 from a group 115 of submission queues 112, the group 115 comprising the submission queues 112 of each IOV function 830A-N (e.g., substantially all of the submission queues 112 associated with the nonvolatile storage device 106). Each arbitration operation implemented by the arbitration logic 842 may comprise the flat arbiter 851 arbitrating between the submission queues 112 of each IOV function 830A-N (e.g., group 115), and designating the submission queue 112 selected by the flat arbiter 851 as the result 857 of the arbitration operation. The result 857 may be designated as the currently-selected submission queue 841, from which the command fetch logic 840 may fetch one or more command(s).

The command fetch logic 840 may fetch command(s) from the currently-selected submission queue 841 until interrupted by, inter alia, the arbitration manager 844. As disclosed above, the arbitration manager 844 configure the arbitration logic 842 to perform arbitration operations in response to, inter alia, command(s) fetched from the currently-selected submission queue 841. The arbitration manager 84 may be configured to determine whether to initiate a next arbitration operation based on, inter alia, arbitration monitoring data 843 pertaining to the currently-selected submission queue 841. The arbitration manager 844 may be configured to maintain arbitration monitoring data 843 pertaining to commands fetched from the currently-selected submission queue 841 (and/or submission queue(s) 112 of a currently-selected IOV function 830) by use of the command monitor 846, as disclosed above. The arbitration manager 844 may determine whether to interrupt command fetching (and/or initiate an arbitration operation) by, inter alia, evaluating the arbitration criteria 849, based on the determined arbitration monitoring data 843. The arbitration criteria 849 (and/or the configuration, parameters, and/or settings thereof) may be defined in arbitration metadata 845 associated with the currently-selected submission queue 841 (and/or corresponding IOV function 830).

Figure 8D:
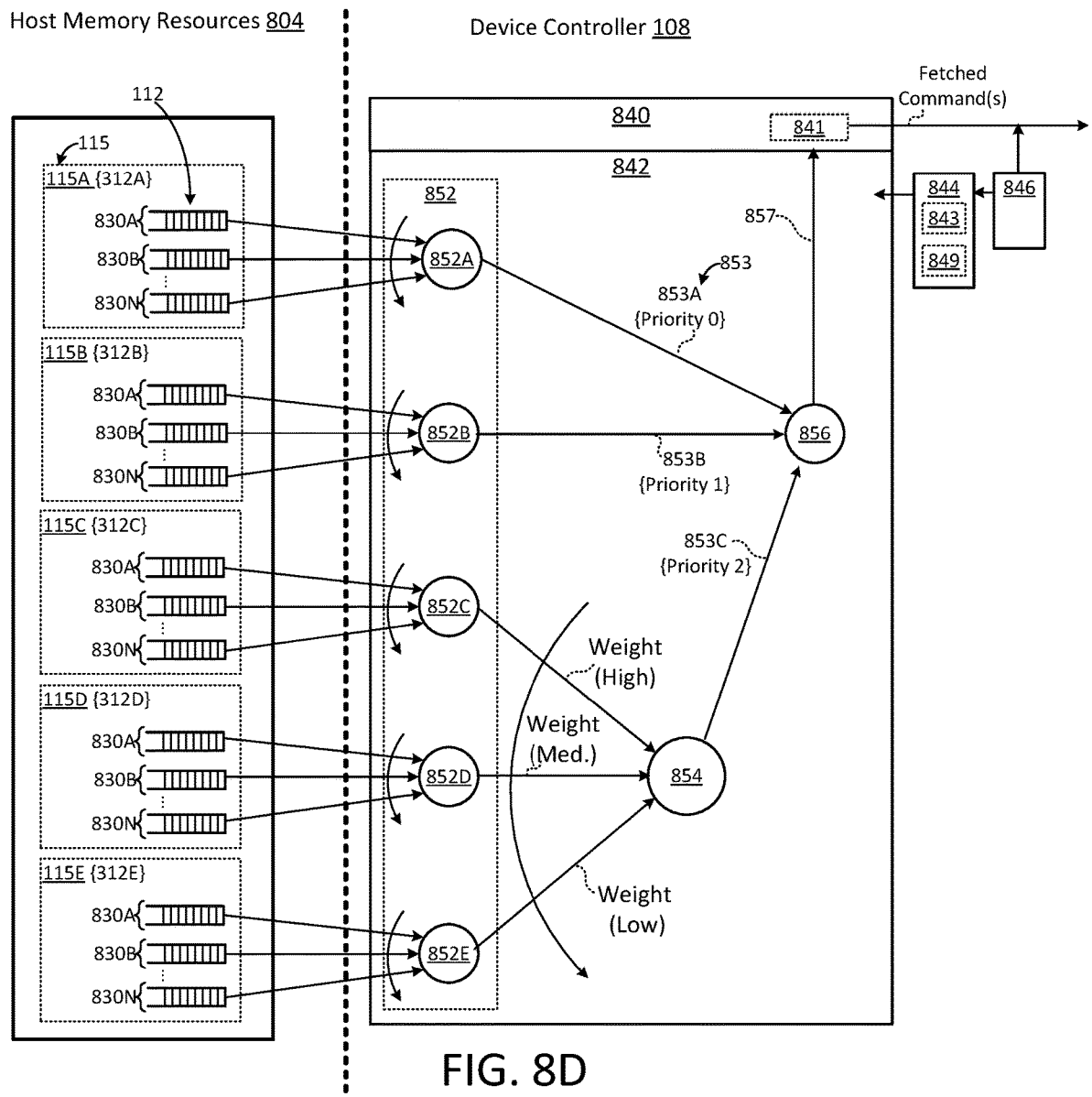
FIG. 8D is a schematic block diagram of one embodiment of a flat, group-based arbitration scheme implemented by the disclosed nonvolatile storage device.

FIG. 8D is a schematic block diagram illustrating further embodiments of the device controller 108 disclosed herein. In the FIG. 8D embodiment, the arbitration logic 842 may be configured to implement an arbitration scheme in which each IOV function 830A-N is assigned substantially a same weight and/or priority, whereas the submission queues 112 thereof may be assigned different weights and/or priorities. The arbitration logic 842 may be configured to implement a "flat" round robin arbitration scheme between respective IOV functions 830A-N, and implement a weighted and/or prioritized arbitration scheme between respective submission queues 112 of the IOV functions 830A-N (e.g., a weighted round robin arbitration scheme with urgent priority).

The arbitration logic 842 may comprise a plurality of group arbiters 852, each group arbiter 852 configured to arbitrate between submission queues 112 of a respective group 115. Each group 115 may comprise one or more submission queues 112 of each IOV function 830A-N. The submission queues 112 of each group 115 may comprise and/or be assigned a same priority 312. The priority 312 of a submission queue 112 may indicate the type and/or priority classification of commands to be queued therein. The priority 312 of a submission queue 112 may indicate the relative priority of the submission queue 112 compared to other submission queues 112 (e.g., may determine a relative weight and/or prioritization of submission queues 112 when arbitrating between the submission queues 112). The submission queues 112 may comprise and/or be assigned any suitable priority 312, including, but not limited to, one or more of: admin priority 312A, urgent priority 312B, high priority 312C, medium priority 312D, low priority 312E, and/or the like. Although various examples of submission queues 112 are described herein, the disclosure is not limited in this regard and could be adapted to manage, maintain, and/or access submission queues 112 having suitable format, arrangement, and/or configuration.

As disclosed above, the arbitration logic 842 may be configured to arbitrate between the respective groups 115 of the submission queues 112 (by use of a plurality of group arbiters 852). The submission queues 112 included in each group 115 may have the same priority 312 (and may span multiple IOV functions 830A-N, such that each group 115 comprises submission queues 112 of each IOV function 830A-N). In the FIG. 8D embodiment, the groups 115 may comprise, but are not limited to, one or more of: an admin group 115A comprising an admin priority 312A submission queue(s) 112 of each IOV function 830A-N, an urgent group 115B comprising an urgent priority 312B submission queue(s) 112 of each IOV function 830A-N, and so on, including a low priority group 115E comprising a low priority 312E submission queue(s) 112 of each IOV function(s) 830A-N.

Each group arbiter 852 may be configured to perform arbitration and/or selection operations within a respective group 115. The group arbiter 852A may be configured to arbitrate between the submission queue(s) 112 of the admin group 115A (e.g., select between admin submission queues 112 of each IOV function 830A-N). The group arbiter 852A may be configured to assign each submission queue 112 of the admin group 115A substantially the same weight and/or priority, which may prevent admin commands of one or more IOV functions 830A-N from monopolizing the group arbiter 852A (and/or admin resources of the nonvolatile storage device 106). In some embodiments, the group arbiter 852A may arbitrate between the submission queues 112 of the admin group 115A in accordance with a round robin arbitration scheme.

The group arbiter 852B may be configured to assign each submission queue 112 of the urgent group 115B substantially the same weight and/or priority, which may prevent urgent commands of any of the IOV functions 830A-N from monopolizing the group arbiter 852B (and/or corresponding resources of the nonvolatile storage device 106). In some embodiments, the group arbiter 852B may arbitrate between the submission queues 112 of the urgent group 115B in accordance with a round robin arbitration scheme.

Each of the group arbiters 852C-E may be configured to arbitrate between the submission queues 112 of a respective group 115C-E. The group arbiters 852C-E may include a high priority arbiter 852C configured to arbitrate between the high priority submission queues 112 of group 115C, a medium priority arbiter 852D configured to arbitrate between the medium priority submission queues 112 of group 115D, and a low priority arbiter 852E configured to arbitrate between the low priority submission queues 112 of group 115E. Each of the group arbiters 852C-E may be configured to assign a same weight and/or priority to each submission queue 112 in the respective groups 115C-E, as disclosed above (e.g., may implement a round robin selection scheme).

The arbitration logic 842 may further comprise a weighted arbiter 854, which may be configured to arbitrate between the submission queue(s) 112 selected by each group arbiter 852C-E. The weighted arbiter 854 may be configured to assign respective weights and/or priorities to the winner selected by each group arbiter 852C-E. The weighted arbiter 854 may assign a high priority to submission queues 112 selected from the high priority group 115C (by group arbiter 852C), assign a medium priority to submission queues 112 selected from the medium priority group 115D (by group arbiter 852D), and assign a low priority to submission queues 112 selected from the low priority group 115E (by group arbiter 852E). The weighted arbiter 854 may implement a weighted and/or prioritized arbitration scheme, such as a weighted round robin (WRR) arbitration scheme and/or the like.

The arbitration logic 842 may further comprise a priority arbiter 856, which may be configured to select a submission queue 112 from which to fetch one or more command(s). The submission queue 112 selected by the priority arbiter 856 may comprise the result 857 of the arbitration operation, and may be used as the currently-selected submission queue 841 of the command fetching logic 840.

The priority arbiter 856 may arbitrate between results 853A-C; result 853A may comprise the submission queue 112 selected by the group arbiter 852A (from the admin group 115A); result 853B may comprise the submission queue 112 selected by the group arbiter 852B (from the urgent group 115B), and the result 853C may comprise the submission queue 112 selected by the weighted arbiter 854 (from groups 115C-E). The priority arbiter 856 may be configured to assign priorities to the respective results 853A-C: result 853A may be assigned a highest priority (e.g., priority 0), result 853B may be assigned a next highest priority (e.g., priority 1), and result 853C may be assigned a lowest priority (e.g., priority 2). The priority arbiter 856 may implement a strict priority arbitration scheme in which the result 853 with the highest priority is selected before results 853 having lower priorities. Accordingly, the priority arbiter 856 may be configured to select the result 853A if any of the submission queues 112 of the admin group 115A comprise queued commands, and may continue selecting the result 853A until each of the submission queues 112 of the admin group 115A is empty (e.g., none of the submission queues 112 of the admin group 115A comprise any queued commands). The priority arbiter 856 may be further configured to select the result 853B in response to determining that the result 853A is empty (each of the submission queues 112 of the admin group 115A is empty), and may continue selecting the result 853B while command(s) remain in any of the submission queues 112 of the urgent group 115B (and the submission queues 112 of the admin group 115A remain empty). The priority arbiter 856 may be further configured to select the result 853C in response to determining that both of the admin result 853A and the urgent result 853B are empty (the submission queues 112 of the admin group 115A and the urgent group 115B are empty). The priority arbiter 856 may continue selection of the result 853C while the admin and/or urgent groups 115A and 115B remain empty.

The submission queue 112 selected by the priority arbiter 856 (from results 853A-C) may comprise the result 857 of the arbitration operation, which may be used as the currently-selected submission queue 841 by the command fetch logic 840. The command fetch logic 840 may fetch commands from the currently-selected submission queue 841, and forward the fetched commands to the command processing logic 410 for execution, as disclosed herein. The command fetch logic 840 may continue fetching commands from the currently-selected submission queue 841 until interrupted by, inter alia, the arbitration manager 844. As disclosed above, the arbitration manager 844 may control interruption of command fetching (and/or selection of a next submission queue 112 and/or IOV function 830 by the arbitration logic 842) based on, inter alia, commands fetched from the currently-selected submission queue 841 (e.g., arbitration monitoring data 843) and/or one or more arbitration criteria 849. The arbitration manager 844 may be configured to maintain arbitration monitoring data 843 pertaining to commands fetched from the currently-selected submission queue 841 (and/or submission queue(s) 112 of a currently-selected IOV function 830) by use of the command monitor 846, and evaluate one or more arbitration criteria 849, as disclosed above (e.g., evaluate one or more burst criteria, command threshold criteria, time-based criteria, command count criteria, data criteria, credit-based criteria, interrupt criteria, and/or the like). The arbitration criteria 849 (and/or configuration, parameters, and/or settings thereof) may be defined in arbitration metadata 845 associated with the currently-selected submission queue 841 (and/or corresponding IOV function 830). The arbitration manager 844 may interrupt command fetching from a currently-selected submission queue 841 and/or currently-selected IOV function 830. Interrupting command fetching from the currently-selected IOV function 830 may comprise configuring the arbitration logic 842 to select a next IOV function 830. Interrupting command fetching from the currently-selected IOV function 830 (without interrupting fetching from the currently-selected IOV function 830), may comprise configuring the arbitration logic 842 to select a next submission queue 112 of the currently-selected IOV function 830. Alternatively, and as described in further detail below, interrupting command fetching may comprise selecting a next submission queue 112 within one or more groups 115, each group 115 comprising submission queues 112 of a plurality of different IOV functions 830.

Figure 8E:
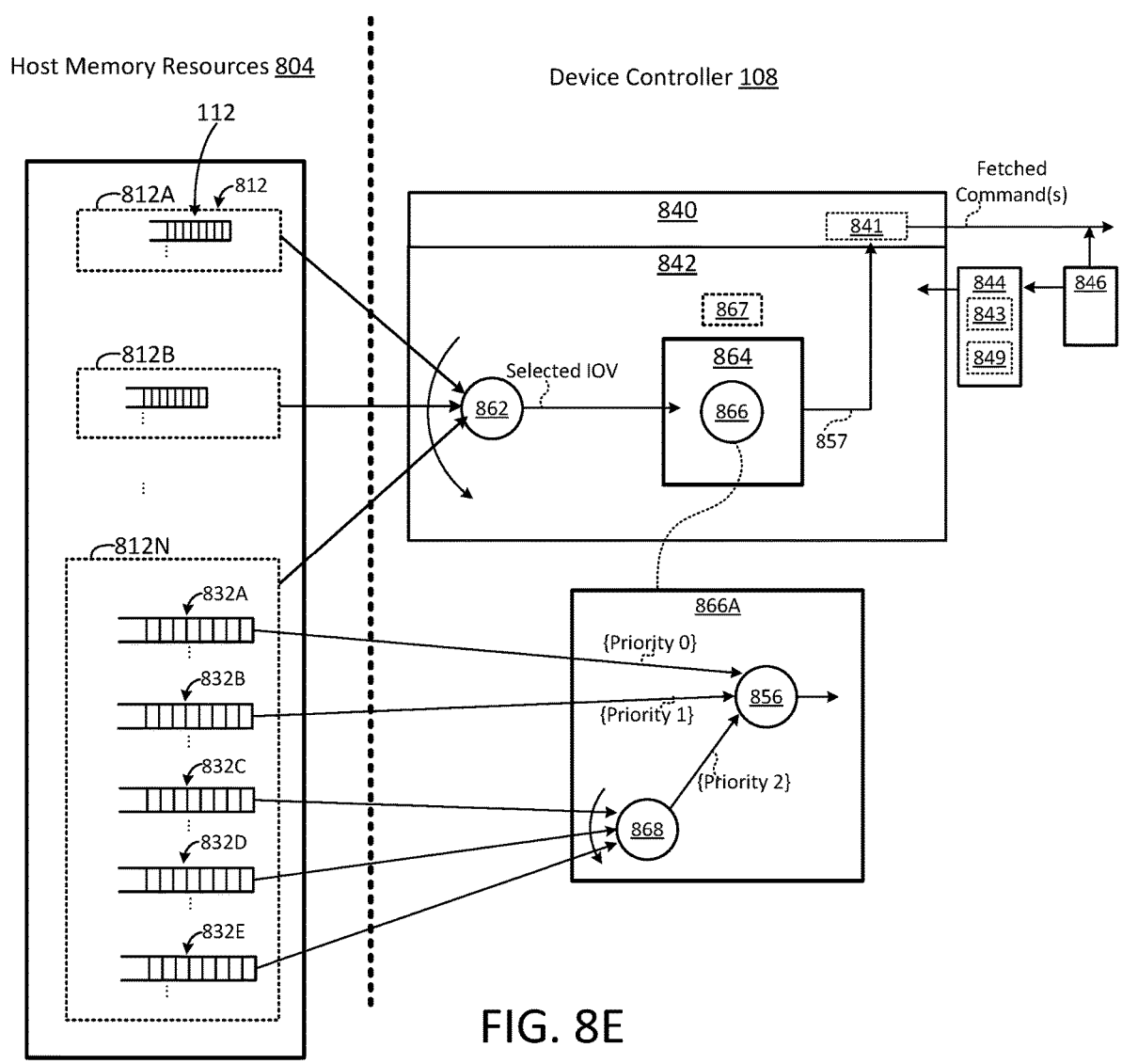
FIG. 8E is a schematic block diagram of one embodiment of a weighted arbitration scheme implemented by the disclosed nonvolatile storage device.

FIG. 8E illustrates further embodiments of the device controller 108 configured to arbitrate between the submission queues 112 of a plurality of IOV functions 830, as disclosed herein. In the FIG. 8E embodiment, the arbitration logic 842 may be configured to implement a weighted IOV arbitration scheme, which may be configured to ensure "fairness" among the IOV functions 830A-N (in accordance with the respective weights and/or priorities assigned thereto). In the FIG. 8E embodiment, the arbitration logic 842 may be configured to implement a hierarchical arbitration scheme and may comprise an IOV arbiter 862 and an IOV queue arbiter 864. The IOV arbiter 862 may be configured to arbitrate between a plurality of IOV functions 830 associated with the nonvolatile storage device 106 (e.g., select between the IOV functions 830A-N). The IOV queue arbiter 864 may be configured to arbitrate between the submission queues 112 of a selected IOV function 830.

In the FIG. 8E embodiment, the submission queues 112 of each IOV function 830A-N illustrated as being arranged into respective sets 812 (e.g., sets 812A-N, each comprising the submission queues 112 of a respective IOV function 830A-N). Although not fully depicted in FIG. 8E to avoid obscuring details of the illustrated embodiments, each set of host-based submission queues 812A-N may comprise a plurality of submission queues 112, including submission queue(s) 112 of a plurality of different types and/or priority classifications (e.g., admin, urgent, high, medium, low, and/or the like). In some embodiments, each IOV function 830 may comprise one or more submission queue(s) 112 of each priority 312A-N, as disclosed above. As shown in FIG. 8E, the host-based submission queues 112 of IOV function 830N may include, but are not limited to: one or more admin queues 832A (submission queues 112 configured to queue admin commands), one or more urgent queues 832B, one or more high-priority queues 832C, one or more medium-priority queues 832D, one or more low-priority queues 832E, and so on. Although various examples of submission queues 112 are described herein (e.g., sets 812 comprising submission queues 112 of respective IOV functions 830), the disclosure is not limited in this regard and could be adapted to manage, maintain, and/or access submission queues 112 having any suitable format, arrangement, structure, and/or configuration (e.g., different arrangements, organizations, structures, and/or the like).

The IOV arbiter 862 may be configured to arbitrate between the IOV functions 830 associated with the non-volatile storage device 106 in accordance with one or more arbitration schemes. In some embodiments, the IOV arbiter 862 is configured to implement a weighted and/or prioritized arbitration scheme. Each IOV function 830A-N may be assigned a respective weight and/or priority, and the IOV arbiter 862 may be configured to arbitrate between the IOV functions 830A-N in accordance with the weights and/or priorities assigned thereto. The weights and/or priorities of the IOV functions 830 may be maintained within the arbitration metadata 845, as disclosed herein. The weights and/or priorities of the IOV functions 830 may be managed by and/or through the primary IOV function 830A (e.g., may be set in response to commands submitted to the primary IOV function 830A). The IOV arbiter 862 may select one of the plurality of IOV functions 830A-N (and/or one of the plurality of sets 812A-N of submission queues 112 associated with a designated IOV function 830).

The IOV queue arbiter 864 may be configured to arbitrate between the submission queues 112 of the IOV function 830 output by the IOV arbiter 862. The IOV queue arbiter 864 may implement any suitable scheme for arbitrating between the submission queues 112 of an IOV function 830 including, but not limited to: a static submission queue selection scheme (e.g., round robin, weighted round robin, weighted round robin with urgent priority class, and/or the like), a dynamic submission queue selection scheme (in accordance with command queue statistics and/or resource state), and/or the like. Alternatively, or in addition, the IOV queue arbiter 864 may be configured to implement one of a plurality of different arbitration schemes 866 in accordance with the configuration and/or settings of the selected IOV function 830 (and/or the configuration and/or settings of the corresponding based submission queues 112 of the selected IOV function 830). As such, in some embodiments, each IOV function 830 may correspond to a respective IOV queue arbitration scheme having a respective state and/or parameters. The arbitration logic 842 may be configured to maintain arbitration state metadata 867, which may comprise, inter alia, information pertaining to arbitration between the submission queues 112 of each IOV function 830 (e.g., information pertaining to each arbitration scheme 866 used to arbitrate between the submission queues 112 of the respective IOV functions 830). The arbitration state metadata 867 may indicate, for example, the arbitration scheme 866 used for each IOV function 830, a last winner of the arbitration scheme 866 of each IOV function 830, and so on.

In the FIG. 8E embodiment, the winner of the IOV arbiter 862 may be IOV function 830N, and the IOV queue arbiter 864 may be configured to implement a submission queue arbitration scheme 866A to arbitrate between the submission queues 112 of IOV function 830N (e.g., submission queues 112 of set 812N). The submission queue arbitration scheme 866A may comprise a weighted round robin with urgent priority class arbitration scheme, as disclosed herein. In one example, and as illustrated in FIG. 8E, the winner from the IOV arbiter 862 may be IOV function 830N, which may comprise and/or correspond to a set 812N of submission queues 112. The IOV function 830N (and/or the submission queues 112 thereof) may correspond to a particular queue arbitration scheme (queue arbitration scheme 866A). The queue arbitration scheme 866A may be configured to implement a weighted round robin with urgent priority class arbitration scheme. The queue arbitration scheme 866A may comprise a first arbiter 868 configured to implement a weighted and/or prioritized arbitration between the submission queues 832C-E of IOV function 830N (e.g., arbitrate between the high-priority queue(s) 832C, medium-priority queue(s) 832D, and low-priority queue(s) 832E of the set 812N of submission queues 112). The winner from the first arbiter 868 may flow to the priority arbiter 856, which may arbitrate between the admin queue(s) 832A, the urgent queue(s) 832B, and the output of first arbiter 868. The priority arbiter 856 may be configured to implement a strict priority arbitration scheme, as disclosed herein (e.g., select the admin queue(s) 832A if available, select from the urgent queues 832B if the admin queue(s) 832A are empty, and select from the output of the first arbiter 868 if both the admin and urgent queues 832A and 832B are empty). The submission queue 112 selected by the priority arbiter 856 may comprise the result 857 of the arbitration logic 842, which may be designated as the currently-selected submission queue 841, as disclosed herein. The IOV queue arbiter 864 may use other arbitration schemes 866 to arbitrate between the submission queues 112 of other IOV functions 830 (e.g., other sets 812 of submission queues 112), such as round robin, weighted round robin, weighted round robin with urgent priority class, and/or the like.

The command fetch logic 840 may fetch commands from the currently-selected submission queue 841 (e.g., the result 857 produced by the arbitration logic 842). The arbitration manager 844 may be configured to monitor the commands fetched from the currently-selected submission queue 841 in order to, inter alia, interrupt command fetching and/or trigger selection of a next submission queue 112, as disclosed herein. As disclosed above, arbitration manager 844 may be configured to interrupt command fetching in response to one more interrupt events. In the FIG. 8D embodiment, the arbitration manager 844 may interrupt command fetching from a lower priority queue (e.g., submission queue 112 of group 115C-E) in response to determining that one or more commands are available to fetch from one or more higher priority submission queues 112 (e.g., submission queues 112 of one or more of the admin and/or urgent groups 115A and/or 115B).

In the FIG. 8E embodiment, the arbitration manager 844 may configure the arbitration logic 842 to implement queue-level and/or IOV-level arbitration operations. As disclosed above, a queue-level arbitration operation may comprise arbitrating between the submission queues 112 of a currently-selected IOV function 830A-N (e.g., without arbitrating between the IOV functions 830). In the non-limiting example above, a queue-level arbitration operation may comprise arbitrating between the submission queues 112 of IOV function 830N (e.g., submission queues 832A-N of set 812N). In the FIG. 8E embodiment, a queue-level arbitration operation may not involve arbitration between IOV functions 830A-N (e.g., may not involve the use of the adaptive IOV arbiter 962). An IOV-level arbitration operation may comprise arbitrating between the IOV functions 830A-N (by use of the IOV arbiter 862) to select an IOV function 830, and may further comprise a queue-level arbitration operation to arbitrate between the submission queues 112 of the selected IOV function 830. The arbitration manager 844 may initiate queue- and/or IOV-level arbitration operations in accordance with the arbitration criteria 849 (and/or arbitration monitoring data 843), as disclosed herein.

Figure 8F:
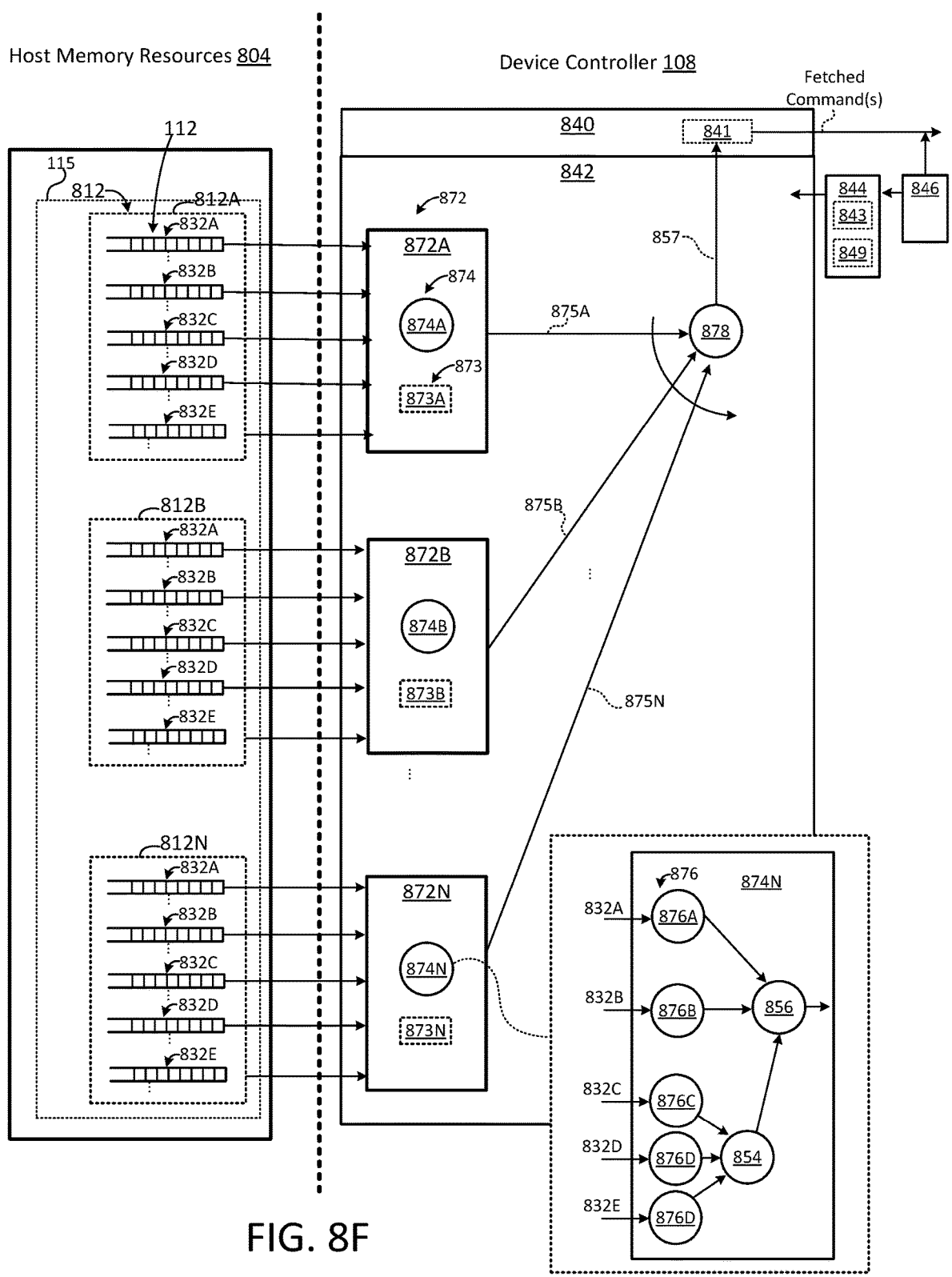
FIG. 8F is a schematic block diagram illustrating further embodiments of weighted arbitration schemes implemented by the disclosed nonvolatile storage device.

FIG. 8F illustrates further embodiments of the device controller 108 configured to arbitrate between the submission queues 112 of a plurality of IOV functions 830, as disclosed herein. In the FIG. 8F embodiment, the arbitration logic 842 of the device controller 108 may be configured to implement another embodiment of a weighted IOV arbitration scheme. As illustrated in FIG. 8F, each IOV function 830 may comprise and/or correspond to a respective set 812 of submission queues 112. Each set 812A-N may comprise submission queues 112 of a respective IOV function 830A-N. Accordingly, each set 812A-N may comprise a respective subset of the group 115 of submission queues 112 associated with the nonvolatile storage device 106. Each IOV function 830A-N may comprise different type(s) of submission queues 112 (e.g., submission queues 112 assigned different priority classification(s)). As illustrated in FIG. 8F, each IOV function 830A-N may comprise one or more: admin queues 832A, urgent queues 832B, high priority queues 832C, medium priority queues 832D, low priority queues 832E, and/or the like. The disclosure is not limited in this regard, any may be adapted to use with IOV function(s) 830 comprising any suitable type and/or arrangement of submission queues 112.

The arbitration logic 842 may be configured to implement a hierarchical selection scheme comprising a plurality of first- or queue-level arbiters 872 and a second- or IOV-level arbiter 878 (a function-level arbiter). Each queue-level arbiter 872 may be configured to arbitrate between the submission queues 112 of a respective IOV function 830. Each queue-level arbiter 872A-N may be configured to arbitrate between the submission queues 112 of a respective IOV function 830A-N (e.g., arbitrate between the submission queues 112 of respective sets 812A-N). Each queue-level arbiter 872 may be configured to implement a respective arbitration scheme 874 and/or maintain respective arbitration state metadata 873 (the arbitration state metadata 873A-N may indicate a current state of the arbitration scheme 874A-N implemented thereby, such as a last submission queue 112 selected, weight(s) assigned to respective submission queues 112, and/or the like). The queue-level arbiters 872 may be configured to implement any suitable arbitration scheme 874 including, but not limited to: round robin, weighted round robin, weighted round robin with urgent priority class, and/or the like.

The second- or IOV-level arbiter 878 may be configured to arbitrate between the plurality of IOV functions 830A-N (e.g., arbitrate between results 875A-N produced by the queue-level arbiters 872A-N of the IOV functions 830A-N). The IOV-level arbiter 878 may assign respective weights and/or priorities to each IOV function 830A-N (in accordance with weights and/or priorities assigned by the primary IOV function 830A and/or defined in the arbitration metadata 845 of the IOV functions 830). Alternatively, or in addition, the IOV-level arbiter 878 may be configured to assign substantially the same priority to each result 875A-N (e.g., may implement a round robin arbitration scheme between IOV functions 830). The winner from the IOV-level arbiter 878 may determine the result 857 of the arbitration logic 842. The winner selected by the IOV-level arbiter 878 may comprise the submission queue(s) 112 selected by one of the queue-level arbiters 872A-N (e.g., the queue-level arbiter 827A-N configured to arbitrate between the set 812A-N of submission queues 112 of the selected IOV function 830A-N). IOV-level arbiter 878 may be configured to couple the result 857 of the arbitration logic 842 to a selected one of the queue-level arbiters 872, such that the result 857 (and/or currently-selected submission queue 841) is determined the result(s) 875 produced by the selected queue-level arbiter 872. The IOV-level arbiter 878 may, therefore, comprise setting the currently-selected submission queue 841 to a submission queue 112 selected from a subset of the submission queues 112 (e.g., a set 812 of submission queues 112 of the selected IOV function 830A-N). The IOV-level arbiter 878 may be configured to couple the queue-level arbiter 872A-N of a selected IOV function 830A-N to the result 857 (and/or currently-selected submission queue 841 of the command fetch logic 840). The arbitration logic 842 may implement queue-level arbitration operations by, inter alia, arbitrating between the submission queues 112 of the selected IOV function 830A-N (without arbitrating between the IOV functions 830A-N). A queue-level arbitration operation may, therefore, comprise selecting a next submission queue 112 from the set 812A-N of submission queues 112 of the selected IOV function 830 (e.g., by use of the queue-level arbiter 872A-N of the selected IOV function 830A-N). A queue-level arbitration operation may, therefore, comprise retaining the coupling between the queue-level arbiter 872A-N of the selected IOV function 830A-N and result 857, such that the currently-selected submission queue 841 is designated by, inter alia, results 875A-N produced by the queue-level arbiter 872A-N.

The queue-level arbiters 872A-N may be configured to select submission queues 112 from each IOV function 830A-N concurrently and/or in parallel, which may enable fast and efficient switching between IOV functions 830A-N. As illustrated in FIG. 8F, the winner(s) of the queue-level arbitration(s) between the submission queues 112 of each IOV function 830A-N (e.g., between sets 812A-N) may be generated substantially concurrently (e.g., produced in parallel by respective queue-level arbiters 872A-N), such that the submission queue 112 of a next IOV function 830A-N selected by the IOV-level arbiter 878 may be available as soon as the next IOV function 830A-N is selected, as opposed to being determined in a queue-level arbitration performed after selection of the next IOV function 830A-N (e.g., after selection of the IOV function 830A-N by the IOV arbiter 862 as in the FIG. 8E embodiment).

As illustrated in FIG. 8F, the queue-level arbiter 824N may be configured to arbitrate between the submission queues 112 of IOV function 830N in accordance with an arbitration scheme 874N. The arbitration scheme 874N may be configured to implement a weighted round robin with urgent priority class arbitration scheme by use of one or more queue arbiter(s) 876, a weighted arbiter 879, and prioritized arbiter 856. Each queue arbiter 876 may be configured to arbitrate between a particular type and/or classification of submission queues 112 of the IOV function 830N. The queue arbiter 876A may be configured to arbitrate between admin submission queues 832A of the IOV function 830N, the queue arbiter 876B may be configured to arbitrate between one or more urgent submission queues 832B of the IOV function 830N, the queue arbiter 876C may be configured to arbitrate between one or more high priority submission queues 832C of the IOV function 830N, the queue arbiter 876D may be configured to arbitrate between one or more medium priority submission queues 832D of the IOV function 830N, and the queue arbiter 876E may be configured to arbitrate between one or more low-priority submission queues 832E of the IOV function 830N. The queue arbiters 876 may implement any suitable arbitration scheme (e.g., round robin arbitration). One or more of the queue arbiters 876 may be omitted in embodiments where the IOV function 830N comprises only a single submission queue of a particular type and/or classification (e.g., the queue arbiter 876A may be omitted in embodiments where the IOV function 830N comprises only one admin submission queue 832A, in which case, the admin submission queue 832A may flow to the IOV-level arbiter 878).

The submission queues 112 selected by respective queue arbiters 876C-D may flow to the weighted arbiter 854, which may arbitrate between high, medium, and low priority submission queues 112 of the IOV function 830N in accordance with a weighted arbitration scheme, as disclosed herein. The prioritized arbiter 856 may be configured to arbitrate between admin, urgent, and lower priority submission queues 112 in accordance with a weighted and/or prioritized arbitration scheme, as disclosed herein. The output of the prioritized arbiter 856 may comprise the result 875N queue-arbiter 872N (the winner selected from submission queue(s) 832C-E by the queue-arbiter 872N).

In some embodiments, the IOV-level arbiter 878 may be configured to implement a prioritized arbitration scheme in which results 875A selected from the submission queues 112 of the primary IOV function 830A are assigned a highest priority (e.g., priority 0) and results 875B-N of respective secondary IOV function(s) 830B-N are assigned lower priorities (e.g., priority 1). The IOV-level arbiter 878 may be configured to implement a strict priority arbitration scheme in which the submission queues 112 having the highest priority are selected before the submission queues 112 having lower priority. As such, submission queues 112 of IOV function 830A (e.g., result 875A) may be selected before submission queues 112 of other, lower priority IOV functions 830B-N (e.g., results 875B-N). The result 875A may remain selected until the submission queue(s) 112 of the IOV function 830A are empty. The IOV-level arbiter 878 may arbitrate between submission queues 112 of lower priority IOV functions 830B-N (e.g., results 875B-N) while the submission queues 112 of the IOV function 830A are empty (e.g., while result 875A is empty). The IOV-level arbiter 878 may continue arbitrating between results 875B-N until determining that one or more commands are queued within a submission queue 112 of the primary IOV function 830A.

The command fetch logic 840 may fetch commands from the currently-selected submission queue 841, as disclosed herein. The arbitration manager 844 may be configured to monitor the commands fetched from the currently-selected submission queue 841 in order to, inter alia, initiate one or more queue-level and/or IOV-level arbitration operations. As disclosed herein, a queue-level arbitration operation may comprise arbitrating between the submission queues 112 of a selected IOV function 830A-N (e.g., arbitrating between a set 812A-N of submission queues 112 of the selected IOV function 830A-N), without arbitrating between the IOV functions 830A-N (e.g., while retaining the currently-selected IOV function 830A-N). A queue-level arbitration operation may comprise the queue-level arbiter 872A-N of the selected IOV function 830A-N selecting a next submission queue 112 from the set 812A-N of submission queues 112 of the selected IOV function 830A-N. An IOV-level arbitration may comprise selecting a next IOV function 830A-N, which may comprise designating result(s) 875A-N generated by the queue-level arbiter 872A-N of the next IOV function 830A-N as the result 875 of the arbitration logic 742 (e.g., such that result(s) 875A-N of the queue-level arbiter 872A-N of the next IOV function 830A-N determine the currently-selected submission queue 841 of the command fetch logic 840). An IOV-level arbitration may be initiated by comparing the arbitration monitoring data 843 determined from commands fetched from submission queue(s) 112 of the currently-selected IOV function 830A-N to one or more arbitration criteria 849, as disclosed herein.

In some embodiments, the arbitration logic 842 may be further configured to implement a credit-based arbitration scheme in which each IOV function 830 is allocated a determined number of credits (e.g., by the primary IOV function 830A). Fetching a command from a submission queue 112 of an IOV function 830 may consume a determined amount of the credits. The amount of credits consumed by a command may be determined based on one or more determined credit characteristics of the command, which may include, but are not limited to: an opcode of the command, the command type (e.g., read, write, admin), the command priority classification, estimated amount of data to be transferred to/from the nonvolatile storage device 106 during execution of the command, estimated amount of bandwidth to be consumed during execution of the command, command attributes (e.g., cache enabled, fused operation, metadata parameters, data set management, etc.), a namespace associated with the command, a stream identifier associated with the command, an address range of the command (e.g., a logical address range, physical address range, and/or the like), a host buffer method used by the command, a buffer location for data pertaining to the command, and/or the like.

Figure 8G:
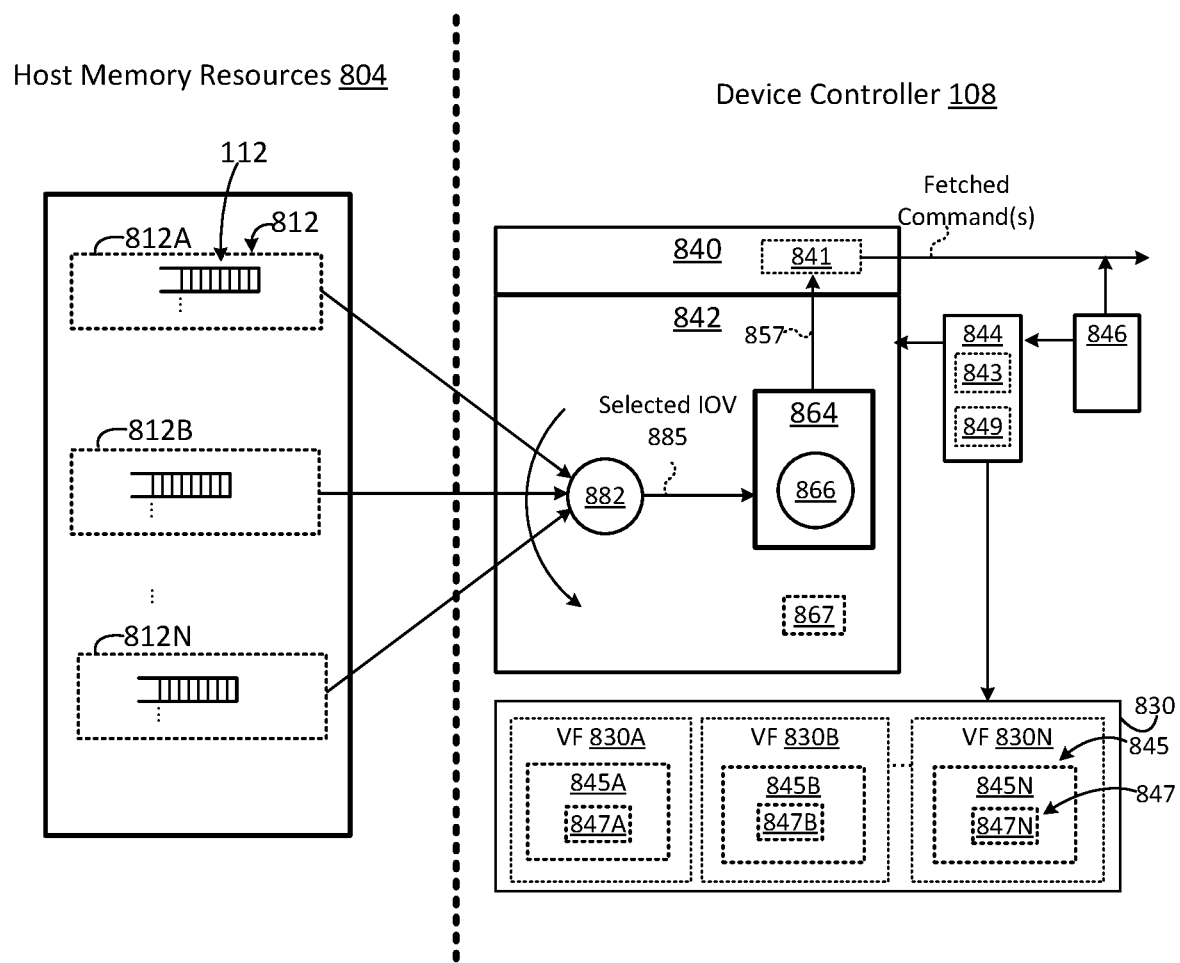
FIG. 8G is a schematic block diagram of one embodiment of a credit-based arbitration scheme implemented by the disclosed nonvolatile storage device.

FIG. 8G is a schematic block diagram depicting further embodiments of the device controller 108 configured to arbitrate between the submission queues 112 of a plurality of IOV functions 830, as disclosed herein. In the FIG. 8G embodiment, the arbitration logic 842 is configured to implement a credit-based arbitration scheme. As illustrated, each IOV function 830A-N may be provisioned a determined amount of credits 847. The credits 847 allocated to each IOV function 830 may be maintained within the arbitration metadata 845 of the IOV function 830 (and/or in another memory or storage location). The credits 847 may be allocated to respective IOV functions 830A-N by the primary IOV function 830A and/or in accordance with QoS and/or arbitration policy settings of the respective IOV functions 830A-N (as defined in the arbitration metadata 845A-N). Credits 847 may be periodically provisioned to the IOV functions 830A-N (e.g., in accordance with a time-based refresh scheme, when an average number of credits of the IOV functions 830 falls below a threshold, and/or the like).

The arbitration logic 842 of the FIG. 8G embodiment may comprise a credit-based arbiter 882, and an IOV queue arbiter 864. The credit-based arbiter 882 may be configured to arbitrate between the IOV functions 830A-N (e.g., select between the IOV functions 830A-N). The credit-based arbiter 882 may arbitrate between IOV functions 830 that have sufficient credits 847 (and may skip the IOV functions 830 that have no remaining credits 847 and/or fewer than a threshold amount of credits 847). In some embodiments, the credit-based arbiter 882 may be configured to implement an arbitration scheme in which each IOV function 830 with more than a threshold amount of credits 847 is assigned a same weight and/or priority (e.g., a round robin arbitration scheme). Alternatively, the credit-based arbiter 882 may be configured to implement a weighted and/or prioritized arbitration scheme. The credit-based arbiter 882 may assign weights and/or priorities of the respective IOV functions 830, as disclosed herein (e.g., in accordance with weights and/or priorities assigned to the IOV functions 830 in the arbitration metadata 845 thereof). In some embodiments, the credit-based arbiter 882 may weight and/or prioritize respective IOV functions 830A-N based on, inter alia, the amount of the remaining credits 847 of the respective IOV functions 830A-N. The credit-based arbiter 882 may be configured to adjust predetermined weights and/or priorities of the respective IOV functions 830A-N in accordance with the amount of credits 847 of the respective IOV functions 830A-N. The credits 847 of one or more IOV functions 830 may be compared to an average or a mean of the credits 847 held by the IOV functions 830. The weight and/or priority of IOV functions 830 having less than the average and/or mean may be reduced, and the weight and/or priority of IOV functions 830 having more than the average and/or mean may be increased. In some embodiments, the amount of adjustment may be proportional to deviation from the average and/or mean. The weight and/or priority (P) of an IOV function 830 having the remaining credits (Cr) 847 may be adjusted as follows: $P_{adj} = P_{orig} * Cr/C_{av}$, where $P_{orig}$ is the original weight and/or priority of the IOV function 830, $P_{adj}$ is the adjusted weight and/or priority, which is calculated by scaling $P_{orig}$ by a ratio of the remaining credits (Cr) 847 of the IOV function 830 to the average amount of the remaining credits (Cr) 847 of the IOV functions 830A-N. Although particular examples for determining and/or adjusting the weights and/or priorities of IOV functions 830 are described, the disclosure is not limited in this regard and could be adapted to use any suitable mechanism and/or technique.

The credit-based arbiter 882 may be configured to select one of the IOV functions 830A-N (and/or select one of the sets 812A-N of submission queues 112). The IOV queue arbiter 864 may be configured to arbitrate between the submission queues 112 of the currently-selected IOV function 830. The IOV queue arbiter 864 may implement any suitable arbitration scheme including, but not limited to: a static submission queue selection scheme (e.g., round robin, weighted round robin, weighted round robin with urgent priority class, and/or the like), a dynamic submission queue selection scheme (in accordance with command queue statistics and/or resource state), and/or the like, as disclosed herein. Alternatively, or in addition, the IOV queue arbiter 864 may be configured to implement one of a plurality of different arbitration schemes 866 in accordance with the configuration and/or settings of the selected IOV function 830 (and/or the configuration and/or settings of the host-based submission queues 112 thereof). As such, in some embodiments, each IOV function 830 may correspond to a respective IOV queue arbitration scheme having a respective state and/or parameters. The arbitration logic 842 may be configured to maintain the arbitration state metadata 867, which may comprise, inter alia, information pertaining to arbitration between the submission queues 112 of each IOV function 830 (e.g., information pertaining to each arbitration scheme 866 used to arbitrate between the submission queues 112 of the respective IOV functions 830). The arbitration state metadata 867 may indicate, for example, the arbitration scheme 866 used for each IOV function 830, a last winner of the arbitration scheme 866 of each IOV function 830, and so on.

The command fetch logic 840 may use result 857 generated by the arbitration logic 842 as the currently-selected submission queue 841, and may fetch commands therefrom. The fetched commands may be executed by the command processing logic 410, as disclosed herein. The arbitration manager 844 may be configured to monitor the commands fetched from the currently-selected submission queue 841 in order to, inter alia, interrupt command fetching and/or trigger selection of a next submission queue 112, as disclosed herein. The arbitration manager 844 may be further configured to monitor the commands to determine the amount of credits 847 consumed by each fetched command. As disclosed above, the amount of the credits 847 consumed by a command may be determined by, inter alia, characteristics of the command. Monitoring the fetched commands may comprise determining one or more characteristics of the fetched commands in order to, inter alia, determine the amount of the credits 847 consumed by the fetched commands. For each fetched command, the arbitration manager 844 may be configured to determine one or more of: an opcode of the command, a type of the command (e.g., read, write, admin), the priority classification of the command, estimated amount of data to be transferred to/from the nonvolatile storage device 106 during execution of the command, estimated amount of bandwidth to be consumed during execution of the command, one or more command attributes (e.g., cache enabled, fused operation, metadata parameters, data set management, etc.), a namespace associated with the command, a stream identifier associated with the command, an address range of the command (e.g., logical address range, physical address range, and/or the like), a host buffer method used by the command, a buffer location for data pertaining to the command, and/or the like. The arbitration manager 844 may use the determined command characteristics of the fetched commands to determine the amount of credits 847 consumed by each fetched command, and to decrement the remaining credits 847 of the corresponding IOV function 830 accordingly. For example, if the currently-selected submission queue 841 corresponds to IOV function 830B, the arbitration manager 844 may decrement the remaining credits 847 of IOV function 830B in response to monitoring commands fetched therefrom.

The arbitration manager 844 may be configured to monitor the commands fetched from the currently-selected submission queue 841 in order to, inter alia, interrupt command fetching and/or trigger selection of a next submission queue 112, as disclosed herein. In the FIG. 8G embodiment, the arbitration manager 844 may implement a credit-based criteria, which may comprise comparing the remaining credits 847 of the IOV function 830 associated with the currently-selected submission queue 841 to one or more credit thresholds. The arbitration manager 844 may be configured to: prevent interruption of command fetching from the currently-selected submission queue 841 while the remaining credits 847 of the associated IOV function 830 are greater than a first threshold, enable interruption when the remaining credits 847 fall below the first threshold, and/or interrupt fetching when the remaining credits 847 are exhausted (and/or fall below a second threshold). Alternatively, or in addition, the arbitration manager 844 may interrupt command fetching in response to the currently-selected submission queue 841 consuming a threshold amount of the credits 847, regardless of the amount of the remaining credits 847 of the IOV function 830 associated therewith. In addition to a credit-based criteria, the arbitration manager 844 may evaluate one or more other arbitration criteria 849, such as interrupt criteria, data criteria, and/or the like.

In the FIG. 8G embodiment, the arbitration manager 844 may configure the arbitration logic 842 to implement queue-level and/or IOV-level arbitration operations. As disclosed above, a queue-level arbitration operation may comprise arbitrating between the submission queues 112 of a currently-selected IOV function 830 (e.g., without arbitrating between the IOV functions 830A-N). In the FIG. 8G embodiment, a queue-level arbitration operation be implemented by the IOV queue arbiter 864 (and may not involve the credit-based arbiter 882). An IOV-level arbitration operation may comprise arbitrating between the IOV functions 830A-N (by use of the credit-based arbiter 882), and may further comprise a queue-level arbitration operation to arbitrate between the submission queues 112 of the IOV function 830 selected in the credit-based arbitration. The arbitration manager 844 may initiate queue- and/or IOV-level arbitration operations in accordance with the arbitration criteria 849 (and/or arbitration monitoring data 843), as disclosed herein.

Figure 8H:
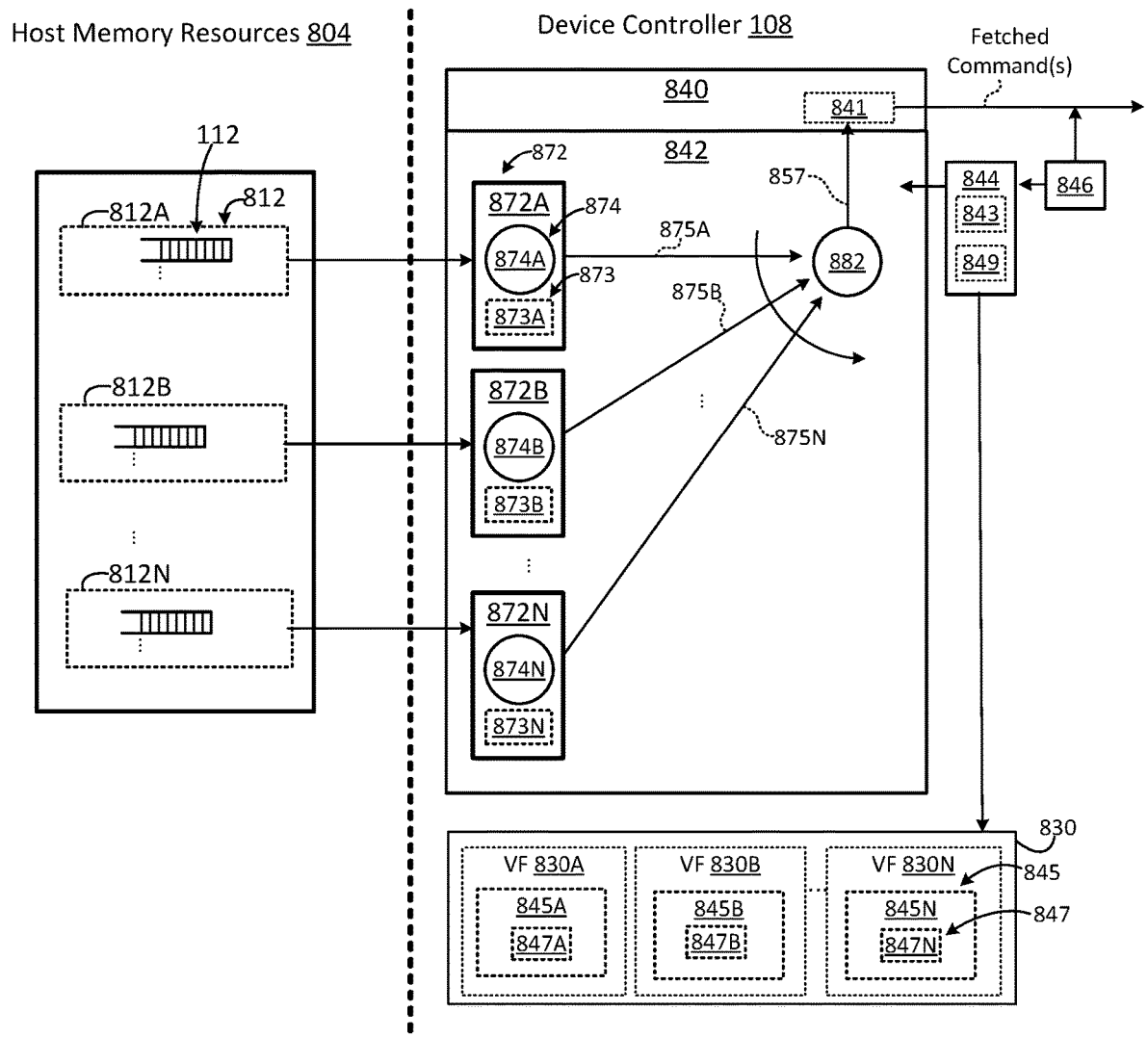
FIG. 8H is a schematic block diagram depicting one embodiment of a device controller configured to implement another embodiment of a credit-based arbitration scheme.

FIG. 8H is a schematic block diagram depicting further embodiments of the device controller 108, as disclosed herein. In the FIG. 8H embodiment, the arbitration logic 842 is configured to implement another embodiment of a credit-based arbitration scheme. The arbitration logic 842 may comprise a plurality of queue-level arbiters 872, which may be configured to arbitrate between submission queues 112 of respective IOV functions 830, as disclosed above. The arbitration logic 842 may comprise queue-level arbiters 872A-N, each configured to implement a respective queue-level arbitration between the submission queues 112 of a respective set 812A-N of submission queues 112, each set 812A-N comprising the submission queues 112 of a respective IOV function 830A-N. Each queue-level arbiter 872 may be configured to implement a respective arbitration scheme 874 and/or maintain respective arbitration state metadata 873.

The credit-based arbiter 882 may be configured to arbitrate between the IOV functions 830A-N, as disclosed herein. The credit-based arbiter 882 may be configured to implement IOV-level arbitration arbitrate between the IOV functions 830A-N in accordance with the amount credits 847A-N currently held by the respective IOV functions 830A-N. The credit-based arbiter 882 may arbitrate between the results 875A-N, each result 875A-N produced by a queue-level arbiter 872A-N of a respective one of the IOV functions 830A-N. Selecting an IOV function 830 may comprise coupling the result 857 of the arbitration logic 842 to the queue-level arbiter 872 of the selected IOV function 830, such that the submission queue(s) 112 selected by the queue-level arbiter 872 are used as the currently-selected submission queue 841 of the command fetch logic 840 (which may be configured to fetch commands therefrom).

The arbitration manager 844 may be configured to determine arbitration monitoring data 843 pertaining to fetched commands, which may include queue-level arbitration data pertaining to commands fetched from the currently-selected submission queue 841 and/or IOV-level arbitration data pertaining to commands fetched from submission queue(s) 112 of the currently-selected IOV function 830. The arbitration manager 844 may compare the arbitration monitoring data 843 to one or more arbitration criteria 849 (e.g., queue- and/or IOV-level arbitration criteria) and, in response, may initiate one or more queue- and/or IOV-level arbitration operations. A queue-level arbitration operation may comprise configuring the queue-level arbiter 872 of the currently-selected IOV function 830 to arbitrate between the submission queues 112 of the currently-selected IOV function 830 (replace the currently-selected submission queue 841 with another submission queue 112 of the currently-selected IOV function 830). An IOV-level arbitration operation may comprise configuring the credit-based arbiter 882 to replace the currently-selected IOV function 830 with another IOV function 830, and may further comprise coupling another one of the queue-level arbiters 872 to the result 857. As illustrated in FIG. 8H, the queue-level arbitration operation(s) for each IOV function 830A-N may be performed substantially in parallel (e.g., by respective queue-level arbiters 872A-N), which may enable IOV-level arbitrations to be completed quickly, without the need for implementing a queue-level arbitration following the IOV-level arbitration (as in the FIG. 8G embodiment).

Figure 9A:
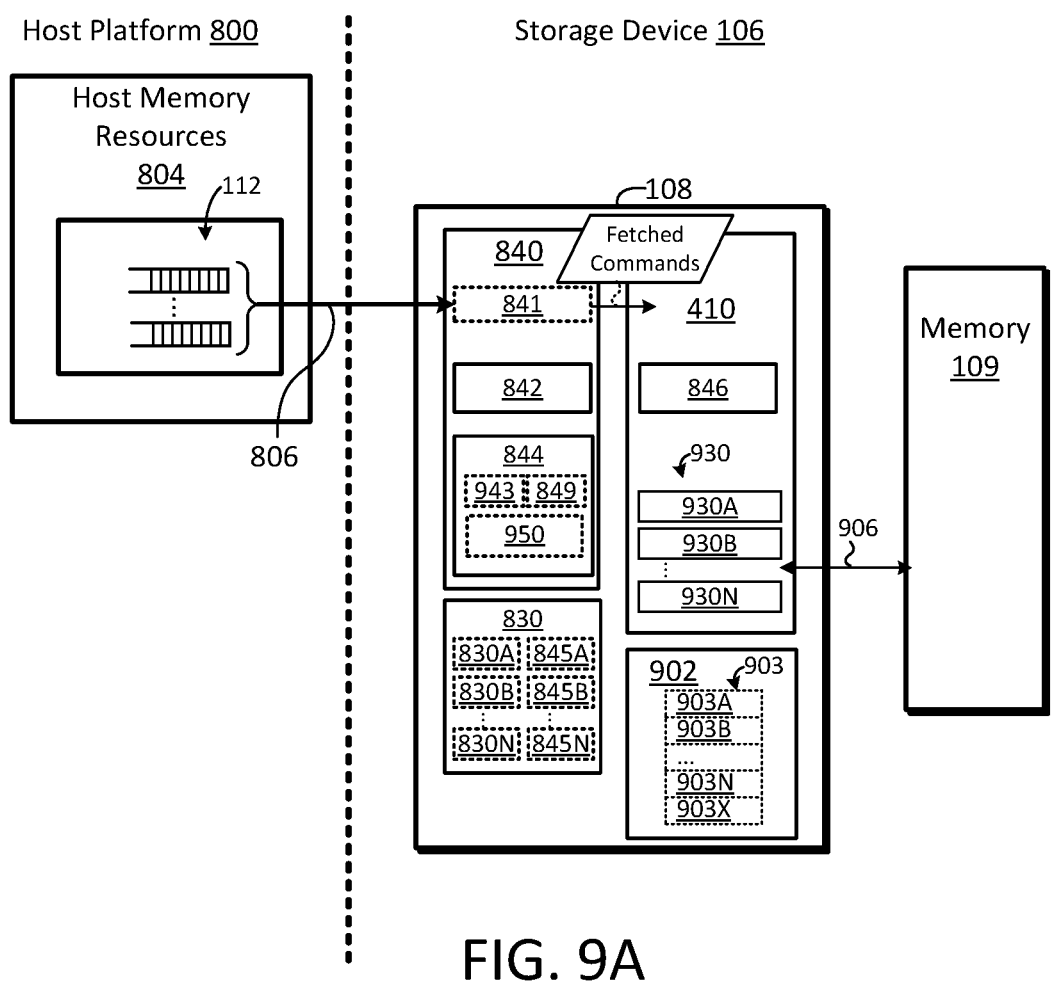
FIG. 9A is a schematic block diagram of another embodiment of a nonvolatile storage device configured to intelligently arbitrate between submission queues in a virtual computing environment.

FIG. 9A is a schematic block diagram of one embodiment of a nonvolatile storage device 106 configured to arbitrate between submission queues 112 of respective IOV functions 830 based on, inter alia, command statistics and/or current availability of storage device resources. The nonvolatile storage device 106 of the FIG. 9A embodiment may comprise command fetch logic 840, which may be configured to fetch commands from submission queues 112 maintained within host memory resources 804 of the host platform 800, as disclosed herein. The fetched commands may be executed by use of the command processing logic 410 and/or memory 109. The command processing logic 410 may transfer information and/or data pertaining to the fetched commands to the memory 109 via a memory interconnect 906. The memory interconnect 906 may comprise any suitable means for operatively coupling the device controller 108 to the memory 109 and may include, but is not limited to: an interconnect, an interconnect controller, a bus, a bus controller, a channel, a chip-to-chip interconnect, one or more signal lines, one or more traces, and/or the like.

Execution of commands at the nonvolatile storage device 106 may require the use of one or more storage device resources 930. The storage device resources 930 may include: admin resources (storage device resources 930 configured to execute admin commands), read resources (e.g., storage device resources 930 required to execute read commands, such as logical-to-physical translation resources, read pipelines, ECC decoders, and/or the like), write resources (e.g., storage device resources 930 configured for execution of write commands, such as write pipelines, ECC encoders, and/or the like), data transfer resources (e.g., resources pertaining to data transfers, such as resources pertaining to the interconnect 806, the memory interconnect 906, and/or the like), and so on.

The nonvolatile storage device 106 may comprise a plurality of storage device resources 930A-N, including private resources and flexible resources. As used herein, "private resources" refer to storage device resources 930 that are permanently assigned to a particular IOV function 830 (and/or corresponding controller), and "flexible resources" refer to storage device resources 930 that are capable of being selectively assigned to respective IOV functions 830 (and/or corresponding controllers). The primary IOV function 830A may be configured to assign flexible resources to secondary IOV functions 830B-N (and/or assign flexile resources for use by the primary IOV function 830A itself). The primary IOV function 830A may be configured to provision flexible resources between IOV functions 830A-N in accordance with QoS and/or other configuration information specified by, inter alia, issuing commands to the primary IOV function 830A.

The storage controller 108 of the FIG. 9A embodiment may further comprise a resource monitor 902, which may be configured to monitor respective storage resources 930A-N, and determine a state of the respective storage device resources 930A-N based on the monitoring. The state of a storage resource 930 may indicate whether respective storage resources 930 are assigned to an IOV function 830 (if the storage resource 930 is a flexible resource), current utilization of the storage resource 930, current availability of the storage resource 930, expected availability of the storage resource 930 (e.g., whether the storage resource 930 is about to become available or utilized), and/or the like. The resource monitor 902 may be further configured to record the determined state of respective storage device resources 930 in resource state metadata 903. The resource state metadata 903 may be maintained within the host platform 800 (e.g., within the host memory resources 804). Alternatively, and as illustrated in FIG. 9A, the resource state metadata 903 may be maintained within the nonvolatile memory device 106 (e.g., within memory resources of the device controller 108, such as one or more registers, on-board memory, volatile memory, RAM, DRAM or SRAM, the memory 109, and/or the like). In some embodiments, resource state metadata 903 comprises resource state metadata 903A-N pertaining to storage device resources 930 assigned to respective IOV functions 830A-N (e.g., the resource state metadata 903A may indicate the state of the storage device resources 930 assigned to the primary IOV function 830A, the resource state metadata 903B may indicate the state of the storage device resources 930 assigned to the secondary IOV function 830B, and so on, with resource state metadata 903N indicating a state of the storage device resources 930 assigned to secondary IOV function 830N (and/or the corresponding secondary controller). Resource state metadata 903X may indicate the resource state of storage device resources 930 that are currently unassigned.

The device controller 108 may further comprise an arbitration manager 844, which may be configured to, inter alia, monitor commands fetched from respective submission queues 112 (by use of the command monitor 846, as disclosed herein). The arbitration manager 844 may be configured to capture arbitration monitoring data 843 corresponding to commands fetched from the currently-selected submission queue 841 (and/or submission queue(s) 112 of a currently-selected IOV function 830). The arbitration manager 844 may be further configured to determine whether to interrupt command fetching from the currently-selected submission queue 841 and/or currently-selected IOV function 830 (and/or trigger selection of a next submission queue 112 and/or IOV function 830) by, inter alia, comparing the arbitration monitoring data 843 to arbitration criteria 849 associated with the currently-selected submission queue 841 (and/or IOV function 830). As disclosed above, the arbitration criteria 849, and/or parameters thereof, may be defined in arbitration metadata 845 associated with the currently-selected submission queue 841 (and/or corresponding IOV function 830). The arbitration criteria 849 may include, but is not limited to: interrupt criteria, burst criteria, command threshold criteria, time-based criteria, data criteria, credit-based criteria, and/or the like.

The arbitration manager 844 may be further configured to determine statistics pertaining to commands fetched from respective submission queues 112 (e.g., by monitoring the fetched commands and/or determining statistical information pertaining to characteristics of the monitored commands, as disclosed herein). The arbitration manager 844 may be configured to record command statistics pertaining to the fetched commands within command statistics metadata 950. The command statistics metadata 950 may be maintained within memory and/or storage resources of the nonvolatile storage device 108, such as on-board RAM of the nonvolatile storage device 106, DRAM, SRAM, one or more registers, and/or the like (not shown in FIG. 9A to avoid obscuring details of the illustrated embodiments). Alternatively, or in addition, the command statistics metadata 950 may be recorded and/or maintained within the host platform 800 (e.g., within the host memory resources 804 and/or other storage location).

The arbitration manager 844 may be configured to capture any suitable statistical information pertaining to the fetched commands, including statistical information pertaining to one or more characteristics of the fetched commands, which may include, but are not limited to: command type (e.g., admin, I/O, read, write, ratio(s) of different command types, and/or the like), priority classification (e.g., admin, urgent, high, medium, low, ratio(s) of different priority classifications, and/or the like), command address (e.g., logical address range(s) of fetched commands), command sequentially (e.g., random I/O commands, sequential I/O commands, ratio(s) of random and/or sequential I/O commands, and/or the like), command size, command bandwidth, and so on. In some embodiments, the arbitration manager 844 may be further configured to monitor credit characteristics pertaining to the fetched commands (e.g., the amount(s) of credits consumed by the fetched commands, and/or the like).

The arbitration manager 844 may be configured to determine command statistics pertaining to respective submission queues 112 (SQ command statistics). The SQ command statistics of a particular submission queue 112 may be based on statistical information pertaining to commands fetched from the particular submission queue 112. The arbitration manager 844 may be further configured to determined command statistics pertaining to respective IOV functions 830 (IOV command statistics). The IOV command statistics of a particular IOV function 830 may be based on statistical information pertaining to commands fetched from the submission queues 112 of the IOV function 830 (e.g., may comprise a combination and/or aggregation of the SQ command statistics of each submission queue 112 thereof). The arbitration manager 844 may be configured to maintain SQ command statistics and/or IOV command statistics within the command statistics metadata 950.

In some embodiments, the arbitration manager 844 is further configured to determine likely characteristics of commands queued within respective submission queues 112, based on, inter alia, statistical information pertaining to commands previously fetched from the respective submission queues 112. The arbitration manager 844 may, for example, determine a probability that a next command fetched from a particular submission queue 112 will be an admin command, a read command, a write command, or the like. The arbitration manager 844 may develop respective command models for the submission queues (SQ command models), which may indicate the probability of queued commands having one or more characteristics (probability of next command comprising an admin, read, or write command). The command model of a submission queue 112 may comprise any suitable statistical information pertaining to previously fetched commands (e.g., type, priority, address, sequentially, size, bandwidth, and/or the like). Table 1 illustrates one embodiment of an SQ command model determined for a particular submission queue 112.

| Count | Admin | Read | Write | Addr | Size | ... |
|---|---|---|---|---|---|---|
| N | 0% | 68% | 32% | X-Y | Z | ... |

As illustrated above, based on N commands previously fetched from the particular submission queue 112 (during a particular time period and/or window), the SQ command model for the particular submission queue 112 indicates that the likelihood of a next command fetched therefrom being an admin command is about 0%, a read command is about 68%, and a write command is about 32%. The SQ command model may further include addressing information pertaining to the previously fetched commands, which may comprise one or more of: a distribution of logical addresses to which the previously fetched commands were addressed, a logical address range comprising addresses of the previously fetched commands (e.g., logical address range X-Y), and/or the like. The SQ command model may further comprise size information, such as an average size of the previously fetched commands, a size distribution, a largest size, a smallest size, and/or the like. The arbitration manager 844 may be further configured to determine command models for respective IOV functions 830 (IOV command models). An IOV command model of an IOV function may be derived from the SQ command models of the submission queues 112 thereof, and may include similar command modeling information as illustrated in Table 1 above. The arbitration manager 844 may be configured to maintain SQ command models and/or IOV command models within the command statistics metadata 950.

The arbitration logic 842 of the FIG. 9A embodiment may be configured to arbitrate between IOV functions 830 and/or the submission queues 112 thereof, as disclosed herein. The arbitration logic 842 may be configured to adapt the static arbitration schemes disclosed above in accordance with monitored command statistics and/or current resource availability (e.g., adapt and/or modify the arbitration schemes disclosed in conjunction with FIGS. 8A-8G). Alternatively, or in addition, the arbitration logic 842 may be configured to operate in one or more different modes, including a static mode, a dynamic mode, a hybrid mode, and/or the like. In the static mode, the arbitration logic 842 may be configured to arbitrate between submission queues 112 of respective IOV functions 830 as disclosed above in conjunction with FIGS. 8A-8G. While configured to operate in dynamic mode, the arbitration logic 842 may be configured to arbitrate between the submission queues 112 based, at least in part, on one or more dynamic factors, such as the command statistics metadata 950 pertaining to the submission queues 112 (and/or IOV functions 830), the state of respective storage device resources 930 (as indicated by the resource state metadata 903), the state of storage device resources 930 assigned to respective IOV functions 830A-N (as indicated by resource metadata 903A-N), and/or the like. The arbitration logic 842 may be configured to operate in the dynamic mode during resource scarcity conditions. As used herein, a "resource scarcity condition" refers to a condition during which access to one or more storage device resources 930 is limited and/or constrained. A resource scarcity condition may be caused by various factors and/or events including, but not limited to: high utilization of the nonvolatile storage device 106 by the host platform 800, power state (e.g., the nonvolatile storage device 106 being configured to operate at a reduced power state), operating conditions (e.g., high temperature), and/or the like. The resource monitor 902 may be configured to detect resource scarcity condition(s) and, in response, may configure the arbitration logic 842 to operate in the dynamic mode (the resource monitor 902 may be configured to operate in the static mode otherwise, e.g., unless configured to operate in the dynamic mode by the device controller 108 and/or resource monitor 902). Alternatively, or in addition, the arbitration logic 842 may be configured to operate in the dynamic mode regardless of high utilization (and/or other conditions). In some embodiments, the arbitration logic 842 may be configured to operate in a hybrid mode in which the influence of various dynamic factors in arbitration operations (e.g., command statistics, probable resource requirements, execution probabilities, device resource state, and/or the like) are adjusted in accordance with one or more operating conditions of the nonvolatile storage device 106 and/or host platform 800 (e.g., utilization, temperature, power constraints, and/or the like). The operating mode of the arbitration logic and/or the relative influence of dynamic factors in the arbitration operations implemented thereby may be defined in, inter alia, configuration data of the nonvolatile storage device 106, which may be maintained in any suitable memory and/or storage location (e.g., on-board memory, the memory 109, firmware storage, the host platform 800, and/or the like). The configuration data may be queried, updated, and/or modified through one or more commands (e.g., commands issued to the primary IOV function 830A).

The arbitration logic 842 may implement a dynamic and/or hybrid arbitration scheme by, inter alia, comparing the resources required by commands likely queued within respective submission queues 112 (of respective IOV functions 830) to currently available storage device resources 930 of the nonvolatile storage device 106. Submission queues 112 (and/or IOV functions 830) that are likely to comprise commands that would result in an execution stall (e.g., commands that cannot be executed using currently available resources), may be skipped and/or assigned a lower priority or weight in arbitration operation(s) implemented by the arbitration logic 842. The arbitration logic 842 may, therefore, arbitrate between submission queues 112 and/or IOV function 830 based on, inter alia, the probable resource requirements of commands likely to be queued therein in view of the current availability of storage device resources 930. The probable resource requirements for next command(s) queued within a submission queue 112 may be determined based on, inter alia, statistical information pertaining to commands previously fetched therefrom. The probable resource requirements of a submission queue 112 may be determined by, inter alia, mapping probable command characteristics determined for the submission queue 112 to one or more storage device resources 930 (and/or types of storage device resources 930). In some embodiments, probable resource requirements may be determined by the use of resource mappings, configured to associate command statistics (e.g., probable command characteristics, a command model, and/or the like) with resources of the nonvolatile storage device 106. The resource mappings may be recorded and/or maintained in one or more of a map, table, index, set of mapping rules, and/or the like. Alternatively, or in addition, one or more of the resource mappings may be encoded into the arbitration logic 842 (e.g., in circuitry, configuration data, firmware, instructions, microcode, of the device controller 108). The resource mappings may associate probable command characteristics with respective resource types (e.g., map admin command(s) and/or admin opcodes to admin resources of the nonvolatile storage device 106, map read command(s) and/or read opcodes to read resources of the nonvolatile storage device 106, map write commands and/or write opcodes to write resources of the nonvolatile storage device 106, and so on). By way of non-limiting example, the command statistics metadata 950 may indicate that about 90% of the commands previously fetched from a first submission queue 112 were write commands and that about 70% of the commands previously fetched from a second submission queue 112 were read commands. The likelihood that a next command fetched from the first submission queue 112 will be a write command may, therefore, be determined to be about 90%, and the likelihood that a next command fetched from the second submission queue 112 will be a read command may be determined to be about 70%. The probable resource requirements of the first submission queue 112 may indicate that a next command fetched from the first submission queue 112 will likely require write resources of the nonvolatile storage device 106 (e.g., indicate that the probability of a next command fetched from the first submission queue 112 will require a resource, such as a write pipeline, ECC encoder, etc., is about 90%). The probable resource requirements determined for the second submission queue 112 may indicate that a next command fetched from the second submission queue 112 will likely require read resources of the nonvolatile storage device 106 (e.g., indicate that the probability of the next command fetched from the second submission queue 112 requiring a read resource such as a read pipeline, ECC decoder, etc., is about 70%). When arbitrating between the first and second submission queues 112 in the dynamic mode, the arbitration logic 842 may compare the probable resource requirements of the first and second submission queues 112 to the resource state metadata 930 to determine, inter alia, whether the next command fetched from the respective submission queues 112 is likely to be capable of being executed using currently available resources. If the resource state metadata 930 indicates low availability of write resources, the arbitration logic 842 may skip and/or de-prioritize selection of the first submission queue 112 (since the next command fetched therefrom is likely to be a write command that cannot be executed using currently available resources). Conversely, if the resource state metadata 930 indicates low availability of read resources, the arbitration logic 842 may skip and/or de-prioritize selection of the second submission queue 112 (since the next command fetched therefrom is likely to be a read command that cannot be executed using currently available resources).

In another non-limiting example, the command statistics metadata 950 may indicate that commands previously fetched from a particular submission queue 112 are relatively large (e.g., typically involve the transfer of large amounts of data to/from the nonvolatile storage device 106). In response, the arbitration logic 842 may determine that probable resource requirements of a next command fetched from the particular submission queue 112 include the use of one or more interconnect and/or buffer resources of the nonvolatile storage device. The arbitration logic 842 may determine whether such resources are currently available and, if not, may skip and/or de-prioritize the particular submission queue 112, as disclosed herein.

By way of further non-limiting example, the arbitration logic 842 may be configured to arbitrate between submission queues 112 based on, inter alia, the availability of specific storage device resources 930. The arbitration logic 842 may be configured to map command statistics of a submission queue 112 and/or IOV function 830 to one or more specific storage device resources 930. The storage device resources 930 may comprise a plurality of logical-to-physical translation engines, each configured to translate logical addresses within a designated address range to corresponding physical addresses within the memory 109. The command statistics metadata 950 may indicate that read commands previously fetched from a first submission queue 112 fall within the logical address range of a first logical-to-physical translation engine, and that addresses of commands previously fetched from a second submission queue 112 fall within the logical address range of a second logical-to-physical translation engine. The arbitration logic 842 may, therefore, determine that the probable resource requirements of the first submission queue 112 include the first logical-to-physical translation engine (by, inter alia, using the resource mappings to associate the probable address characteristic of the first submission queue 112 to the first logical-to-physical translation engine). The arbitration logic 842 may further determine that the probable resource requirements of the second submission queue 112 include the second logical-to-physical translation engine. When arbitrating between the first and second submission queues 112, the arbitration logic 842 may compare resource requirements thereof to current resource availability, which may comprise determining the current availability of the first and/or second logical-to-physical translation engines (as indicated in the resource state metadata 930). The arbitration logic 842 may skip (and/or de-prioritize) selection of the first and/or second submission queue 112 in accordance with the current availability of the first and/or second logical-to-physical translation engines.

The probable resource requirements of an IOV function 830 may be determined by, inter alia, combining and/or aggregating the probable resource requirements determined for the submission queue(s) 112 of the respective IOV functions 830. Alternatively, the probable resource requirements of an IOV function 830 may be determined by, inter alia, associating command statistics of the IOV functions 830 (IOV command statistics) with resources of the nonvolatile storage device 106 (e.g., resource types and/or specified storage device resources 930, as disclosed herein).

In some embodiments, the arbitration logic 842 may be configured to arbitrate between submission queues 112 based on a determined probability that next command(s) fetched therefrom will be capable of execution using currently available resources. As disclosed above, the command statistics metadata 950 may indicate the probability that a next command fetched from respective submission queues 112 will have particular characteristics. By way of non-limiting example, the command statistics metadata 950 may indicate a distribution of one or more command types previously fetched from submission queues 112A-C, as illustrated in Table 2.

| Submission Queue | Read | Write |
|---|---|---|
| 112A | 55% | 45% |
| 112B | 95% | 5% |
| 112C | 10% | 90% |

The probability that next command(s) fetched from the respective submission queues 112A-C will require particular storage device resources 930 may be estimated by use of the command statistics metadata 950 of Table 2. The probability that a next command fetched from submission queue 112A will require read or write resources for execution may correspond to the probability of the next command fetched therefrom being a read or write command (e.g., the probability of a next command fetched from submission queue 112A requiring read resources may be estimated to be about 55%). When arbitrating between submission queues 112A-C, the arbitration logic may compare the probable resource requirements of each submission queue 112 to current availability of corresponding storage device resources. The comparison may indicate an execution probability of each submission queue 112A-C (a probability that currently available resources of the nonvolatile storage device 106 will be capable of executing a next command fetched therefrom). Table 3 illustrates one embodiment of such a comparison.

| Submission Queue | Read Req. | Write Req. |
|---|---|---|
| 112A | 55% | 45% |
| 112B | 95% | 5% |
| 112C | 10% | 90% |
| Resource State | Read Avail. | Write Avail. |
| 930 | Yes | No |

As illustrated above, the current resource state of the nonvolatile storage device 106 may indicate that read resources of the nonvolatile storage device 106 are currently available, but write resources are not. The availability of respective storage device resources 930 and/or resource types may be indicated using a binary indicator (yes or no). Alternatively, availability may be indicated using a range (e.g., current utilization level). For example, the resource state metadata 930 may indicate that admin resources are 100% available, read resources are 80% available (20% being utilized), and so on (with write resources being 0% available). In the non-limiting example, above, the arbitration logic 842 may determine execution probabilities for each submission queue 112A-C. The execution probability of submission queue 112A may be determined to be about 55% (due the probability of the next command being a read command, that can be executed by currently available resources being about 55%, while the probability of the next command being a write command, which cannot be executed by currently available resources is about 45%). The execution probability of submission queue 112B may be about 95%, and the execution probability of submission queue 112C may be about 10%.

In some embodiments, the arbitration logic 842 may be configured to skip submission queues 112 determined to have an execution probability that is below a threshold. In the non-limiting example, the threshold may be set to be about 20% and, as such, the arbitration logic 842 may be configured to skip selection of submission queue 112C. Alternatively, the arbitration logic 842 may weight and/or prioritize the submission queues 112A-C in accordance with the determined execution probabilities. In the non-limiting example above, the submission queue 112B may be heavily weighted due to having a high execution probability, the submission queue 112A may be given a medium weight due to having a medium execution probability (about 55%), and the submission queue 112C may be given a low weight due to having a low execution probability (about 10%). In some embodiments, the arbitration logic 842 is configured to adjust existing weights and/or priorities assigned to the respective submission queues 112A-C in accordance with the determined execution probabilities. In the non-limiting example above, the arbitration logic 842 may increase the weight of submission queue 112B and decrease the weight of submission queue 112C, while the weight of submission queue 112A remains substantially the same. The arbitration logic 842 may adjust the weights in accordance with the determined execution probabilities as follows: $W_{adj}=W_{orig}*PE$, where $W_{orig}$ is the original weight assigned to the submission queue 112 (or IOV function 830), PE is the execution probability determined for the submission queue 112 (or IOV function 830), and $W_{adj}$ is the resulting adjusted weight for the submission queue 112.

In some embodiments, the degree to which weights and/or priorities are set by one or more scaling factors. In some embodiments, adjusted weights may be calculated as, $W_{adj}=S*W_{orig}+D(W_{orig}*PE)$, where S and D are scaling factors that, inter alia, determine a relative emphasis of static (S) and dynamic (D) arbitration factors, in the resulting adjusting weight ($W_{adj}$), respectively. The scaling factor S may determine a relative importance of the original, statically assigned weight ($W_{orig}$), and the scaling factor D may determine the relative importance of dynamic factors (e.g., the execution probability (PE) determined for the submission queue 112 and/or IOV function 830). In some embodiments, S and/or D may be configured such that S+D=1. One or more of the scaling factors may be determined in accordance with command statistics and/or current resource availability. In some embodiments, the dynamic scaling factor (D) may be set in accordance with confidence factor(s) associated with respective execution probabilities. Alternatively, or in addition, the dynamic scaling factor (D) may be set in accordance with a deviation between execution probabilities (PE) (e.g., variance between the PE determined for respective submission queues 112 and/or IOV functions 830). The dynamic scaling factor (D) may be increased, relative to the static scaling factor (S), where the execution probability (PE) is associated with a high confidence factor and/or there is a high degree of deviation between the execution probability (PE) determined for respective submission queues 112 and/or IOV functions 830 (and may be decreased otherwise).

In some embodiments, the arbitration logic 842 may be configured to determine the execution probability of a submission queue 112 based on, inter alia, the availability of storage device resources 930 currently assigned to the corresponding IOV function 830 (and may ignore storage device resources 930 assigned to other IOV functions 830, regardless of whether such resources are available). In a variation of the non-limiting example above, the submission queue 112A may correspond to IOV function 830A, the submission queue 112B may correspond to IOV function 830B, and the submission queue 112C may correspond to IOV function 830C. Each IOV function 830A-C may be assigned respective storage device resources 930 (e.g., private resources and/or flexible resources). The resource monitor 903 may be configured to determine the current availability of the resources assigned to each IOV function 830A-C and may track the current availability in respective resource metadata 903A-C. Determining the execution probabilities for each submission queue 112A-C may, therefore, comprise comparing command statistics of each submission queue 112A-C to corresponding resource metadata 903A-C. Table 4 illustrates one example of such a comparison.

| Submission Queue | Read Req. | Write Req. |
|---|---|---|
| 112A {830A} | 55% | 45% |
| 112B {830B} | 95% | 5% |
| 112C {830C} | 10% | 90% |
| Resource State | Read Avail. | Write Avail. |
| 903A {830A} | Yes | No |
| 903B {830B} | No | Yes |
| 903C {830C} | Yes | No |

In accordance with Table 4, the execution probability of submission queue 112A may be about 55%, the execution probability for submission queue 112B may be about 5% (due to the corresponding IOV function 830B lacking available read resources), and the execution probability for submission queue 112C may be about 10% (due to the corresponding IOV function 830C lacking available write resources). The arbitration logic 842 may be configured to skip and/or de-prioritize submission queues 112B and 112C based on the determined execution probabilities.

The execution probability of an IOV function 830 may be determined by, inter alia, combining and/or aggregating execution probabilities determined for each submission queue 112 of the IOV function 830. Alternatively, or in addition, the execution probability of an IOV function 830 may be determined from IOV command statistics of the IOV function 830 (e.g., determining probable resource requirements for the IOV function 830 by mapping the IOV command statistics to respective resources of the nonvolatile storage device 106, and comparing the probable resource requirements to current resource availability). Determining the execution probability of an IOV function 830A-N may comprise comparing the probable resource requirements determined for the IOV function 830 to resource state metadata 903A-N indicating the state of storage device resources 930 assigned to the IOV function 830 (and which excludes storage device resources 930 not currently assigned to the IOV function 830). Table 5 illustrates one embodiment of probable resource requirements of an IOV function 830M that comprises three submission queues 112X-Y. As shown, the SQ command statistics of the respective submission queues 112X-Y may indicate the likelihood that a next command fetched therefrom will be one of an admin, read, or write command (which will require corresponding admin, read, and/or write resources for execution at the nonvolatile storage device 106).

| SQ Command Stat. | Count | Admin Req. | Read Req. | Write Req. |
| --- | --- | --- | --- | --- |
| 112X {830M} | 100 | 100% | 0% | 0% |
| 112Y {830M} | 10000 | 0% | 90% | 10% |
| 112Y {830M} | 20000 | 0% | 80% | 20% |
| IOV Command Stat. | | Admin Req. | Read Req. | Write Req. |
| 830M | | 0.3% | 83% | 16.7% |
| Resource State | | Admin Req. | Read Req. | Write Req. |
| 903M {830M} | | Yes | Yes | No |

The execution probability of IOV function 830M may be determined by comparing the resource state metadata 903M pertaining to the resources assigned to IOV function 830M to the IOV command statistics (the probable resource requirements of IOV function 830M). In one embodiment, the IOV execution probability of IOV function 830M may comprise a sum of probable resource requirements that can be satisfied by currently available resources and/or 100 less a sum of probable resource requirements that cannot be satisfied by currently available resources. In the non-limiting example of Table 5, the execution probability of IOV function 830M may be about 83.3%, which may be determined by a sum of 0.3% and 83% (the likelihood of an admin or read command, for which resources are available), or 100 less of 16.7% (likelihood of a write command for which resources are not currently available).

In some embodiments, the arbitration logic 842 may be further configured to detect and/or correct resource allocation imbalances between IOV functions 830A-N. As used herein, a "resource allocation imbalance" refers to a condition in which an IOV function 830 lacks sufficient assigned resources to execute commands being submitted thereto (a resource allocation deficiency) and/or is currently assigned resources that are unlikely to be utilized by such commands (a resource allocation surplus). In some embodiments, a resource allocation deficiency may be corrected by, inter alia, assigning additional resources to an IOV function 830 (and/or informing the primary IOV function 830A of the resource allocation imbalances). The additional resources may be assigned from a pool of unassigned resources (e.g., storage device resources 930 corresponding to resource state metadata 903X) and/or may be reassigned from one or more other IOV functions 830. A resource allocation surplus may be corrected by deallocating one or more resources of an IOV function 830 (e.g., configuring the primary IOV function 830A to deallocate the surplus resources, return the surplus resources to the unassigned pool, and/or assign the surplus resources to other IOV function(s) 830).

In the non-limiting example illustrated in Table 4 above, the arbitration logic 842 may detect a resource allocation imbalance pertaining to IOV functions 830B and 830C. The arbitration logic 842 may determine that IOV function 830B has a read resource deficiency and a write resource surplus. The read resource deficiency may be detected in response to determining that the commands queued within submission queue 112B of IOV function 830B have a high probability of being read commands (about 95%), while the IOV function 830B lacks currently available read resources. The write resource surplus may be detected in response to determining that the commands queued within the submission queue 112B have a low probability of being write commands, while the IOV function 830B is assigned currently available write resources. The arbitration logic 842 may be further configured to determine that IOV function 830C has a read resource surplus and a write resource deficiency (based on the probability of read/write commands in the submission queue 112C thereof, the lack of currently available write resources, and assignment of currently available read resources).

The arbitration logic 842 may be configured to notify the device controller 108 of detected resource allocation deficiencies through, inter alia, the primary IOV function 830A (and/or corresponding primary controller). In the non-limiting example above, the arbitration logic 842 may be configured to issue one or more commands to the primary IOV function 830A indicating that IOV function 830B currently has a read resource deficiency and that IOV function 830C currently has a write resource deficiency. In response, the primary IOV function 830A may be configured to correct the indicated deficiencies by, inter alia, allocating and/or reallocating flexible resources between the IOV functions 830A-N, as disclosed herein. The arbitration logic 842 may be further configured to notify the primary function 830A that the IOV function 830B currently has a write resource surplus and/or the IOV function 830C currently has a read resource surplus (which may be used to correct the read/write resource deficiencies by, inter alia, reallocating resources between IOV functions 830B and 830C). Alternatively, or in addition, the arbitration logic 842 may configure the primary IOV function 830A to reassign the surplus write resources of IOV function 830B to IOV function 830C, and the surplus read resources of IOV function 830C to IOV function 830B (e.g., by issuing one or more commands to the primary IOV function 830C). Since the arbitration logic 842 prior to fetching command(s) from the submission queues 112, the arbitration logic 842 may be capable of detecting and/or correcting resource allocation deficiencies before such deficiencies cause execution stalls (e.g., before fetching commands that cannot be executed due to lack of assigned flexible resources). Accordingly, the arbitration logic 842 may preemptively address flexible resource assignment problems before such problems impact performance.

As disclosed above, the arbitration logic 842 may be configured to utilize the command statistics metadata 950 and/or resource state metadata 903 in order to, inter alia, intelligently arbitrate between respective submission queues 112. Alternatively, or in addition, the arbitration logic 842 may utilize the command statistics metadata 950 and/or resource state metadata 903 to, inter alia, arbitrate between respective IOV functions 830 (e.g., in one or more IOV-level arbitration and/or selection operations). The arbitration logic 842 may be configured to arbitrate and/or select between IOV functions 830 in accordance with IOV command statistics of the respective IOV functions 830. As disclosed above, the IOV command statistics of an IOV function 830 may indicate the probability that a next command fetched from a submission queue 112 of the IOV function 830 will have particular characteristics (e.g., will be an admin command, read command, or write command, will have a particular size, will fall within a particular address range, and/or the like). The IOV command statistics of an IOV function 830 may be determined by, inter alia, combining and/or aggregating the SQ command statistics of each of the submission queues 112 thereof. The arbitration logic 842 may use IOV command statistics of an IOV function 830 to determine an execution probability for the IOV function 830 (e.g., a probability that currently available storage device resources 930 will be capable of executing a next command fetched from a submission queue 112 of the IOV function 830). The execution probability of a particular IOV function 830 may comprise comparing IOV command statistics of the particular IOV function 830 to the resource state metadata 903 (and/or resource state metadata 903 pertaining to the particular IOV function 830), as disclosed herein. The arbitration logic 842 may use the determined execution probabilities to skip one or more IOV functions 830, adjust the weight and/or priority of one or more IOV functions 830, and/or the like. The arbitration logic 842 may be further configured to detect and/or correct resource allocation imbalances based on the comparing, as disclosed above.

The arbitration logic 842 may implement arbitration and/or selection operations, which may comprise selecting one of the submission queues 112 of the plurality of submission queues 112 associated with respective IOV function(s) 830A-N. The winner of the arbitration may be used as the currently-selected submission queue 841 of the command fetch logic 840. The command fetch logic 840 may fetch commands from the currently-selected submission queue 841 until interrupted and/or a next submission queue 112 is selected (in a next arbitration and/or selection operation implemented by the arbitration logic 842). The command fetch logic 840 may be interrupted (and/or a next arbitration may be triggered) by the arbitration manager 844, as disclosed above.

Figure 9B:
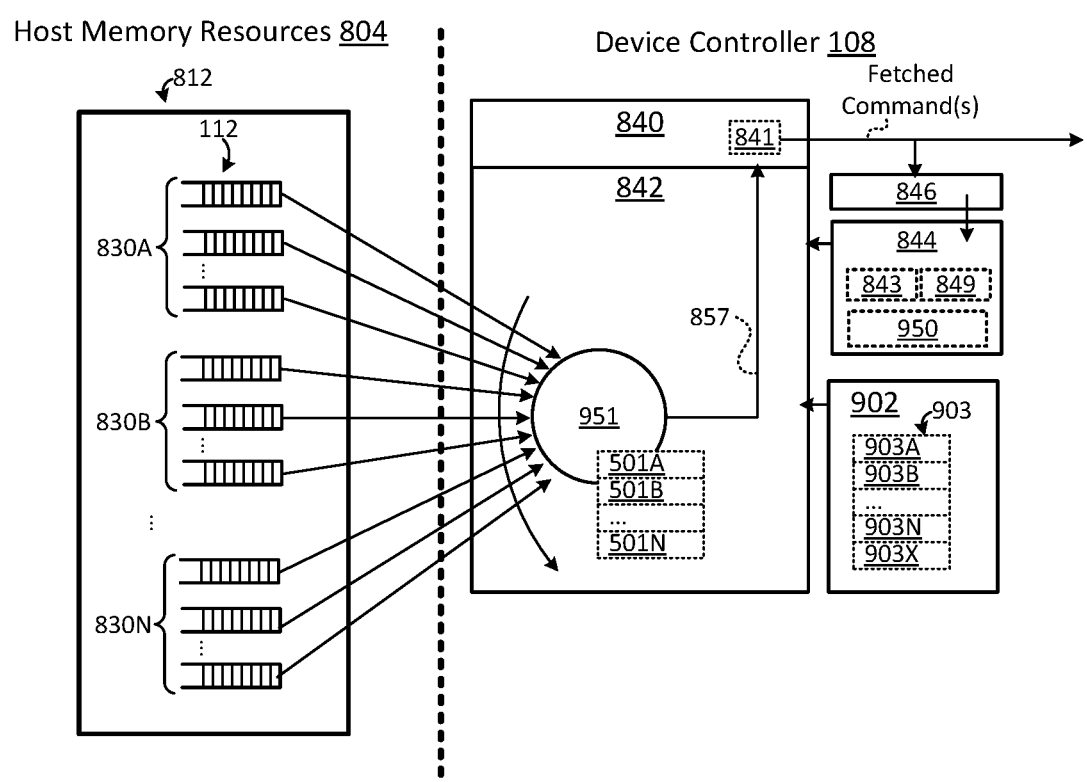
FIG. 9B is a schematic block diagram of further embodiments of a nonvolatile storage device configured to implement one embodiment of a dynamic, flat arbitration scheme in a virtual computing environment.

FIG. 9B is a schematic block diagram depicting one embodiment of a device controller 108 configured to arbitrate between submission queues 112 of each of a plurality of IOV functions 830A-N in accordance with an adaptive, flat arbitration scheme, in which each IOV function 830A-N and the host-based submission queues 821A-N thereof, are assigned substantially the same weight and/or priority.

The arbitration logic 842 may be configured to adapt the flat arbitration scheme in accordance with monitored command statistics and/or current resource availability, as disclosed herein. In some embodiments, the arbitration logic 842 may be configured to operate in one of a static mode and a dynamic mode. Operation in the static mode may comprise implementing a flat arbitration scheme, as described herein (e.g., as disclosed in conjunction with FIG. 8C). Operation in the dynamic and/or hybrid mode may comprise modifying arbitration operations in order to, inter alia, arbitrate between IOV functions 830 and/or submission queues 112 in accordance with command statistics pertaining to previously fetched commands and/or the availability of respective storage device resources 930.

The arbitration logic 842 may comprise an adaptive queue arbiter 951, which may be configured to perform arbitration operations to select submission queue(s) 112 from a plurality of submission queues 112, each submission queue 112 corresponding to a respective one of the IOV functions 830A-N (and/or having a respective priority classification or type). In static mode, the adaptive queue arbiter 951 may be configured to implement a flat arbitration scheme in which each submission queue 112 of each IOV function 830A-N is assigned substantially a same weight and/or priority (e.g., a round robin arbitration scheme).

In a dynamic and/or hybrid mode, the adaptive queue arbiter 951 may be configured to modify the flat arbitration scheme. The adaptive queue arbiter 951 may be configured to arbitrate between submission queues 112 based on whether currently available storage device resources 930 are likely to be capable of executing commands likely queued within the respective submission queues 112. Submission queues 112 determined to have a high probability of comprising commands that cannot be executed using currently available resources may be skipped (and/or deprioritized) in arbitration operations performed by the adaptive queue arbiter 951. In some embodiments, the adaptive flat arbiter 951 is configured to arbitrate between the submission queues 112 based on, inter alia, execution probabilities determined for the respective submission queues 112. In the FIG. 9B embodiment, the execution probabilities of the respective submission queues 112 are represented as 501A-N. The execution probabilities 501A-N may be derived from the command statistics metadata 950 and/or resource state metadata 903, as disclosed herein. The SQ command statistics of the respective submission queues 112 may indicate probable characteristics of commands queued therein (based on characteristics of commands previously fetched from the respective submission queues 112). The probable command characteristics may be used to determine probable resource requirements of the respective submission queues 112 (e.g., by mapping the probable command characteristics to respective storage device resources 930 and/or resource types, as disclosed herein). The execution probabilities 501A-N of the respective submission queues 112 may be determined by, inter alia, comparing the probable resource requirements of the submission queue(s) 112 to the resource state metadata 903, as disclosed herein. In some embodiments, the execution probability of a submission queue 112 corresponding to a particular IOV function 830A-N may be determined by comparing the probable resource requirements thereof to resource state metadata 903A-N pertaining to the storage device resource(s) 930 currently assigned to the particular IOV function 830A-N.

In some embodiments, the adaptive queue arbiter 951 may be configured to skip submission queues 112 having an execution probability 501A-N below a threshold. The adaptive queue arbiter 951 may be configured to implement a round robin arbitration on a subset of the submission queues 112, the subset comprising submission queues 112 having an execution probability 501A-N that satisfies the threshold. Alternatively, or in addition, the adaptive queue arbiter 951 may be configured to implement a weighted and/or prioritized arbitration scheme in which respective submission queues 112 as assigned weights and/or priorities in accordance with the execution probabilities 501A-N. In some embodiments, the adaptive queue arbiter 951 may weigh the submission queues 112 based on the determined execution probabilities 501A-N and a scaling factor. By way of non-limiting example, the weight assigned to a submission queue 112 may be: W=Ws+Wd*PE, where W is the weight assigned to the submission queue 112, Ws is a static weighting factor, Wd is a dynamic weighting factor, and PE is the execution probability determined for the submission queue 112. The values Ws and Wd may determine the respective importance of dynamic and static weighting factors in the arbitration scheme, respectively.

The submission queue 112 selected by the adaptive queue arbiter 951 may be designated as the currently-selected submission queue 841 of the command fetch logic 840. The command fetch logic 840 may be configured to fetch commands from the currently-selected submission queue 841 until interrupted by, inter alia, the arbitration manager 844, which may be configured to monitor commands fetched from the currently-selected submission queue 841 (by use of the command monitor 846), maintain command statistics metadata 950 pertaining to commands fetched from respective submission queues 112 and/or submission queues 112 of respective IOV functions 830A-N, determine arbitration monitoring data 843, and/or evaluate one or more arbitration criteria 849, as disclosed herein.

Figure 9C:
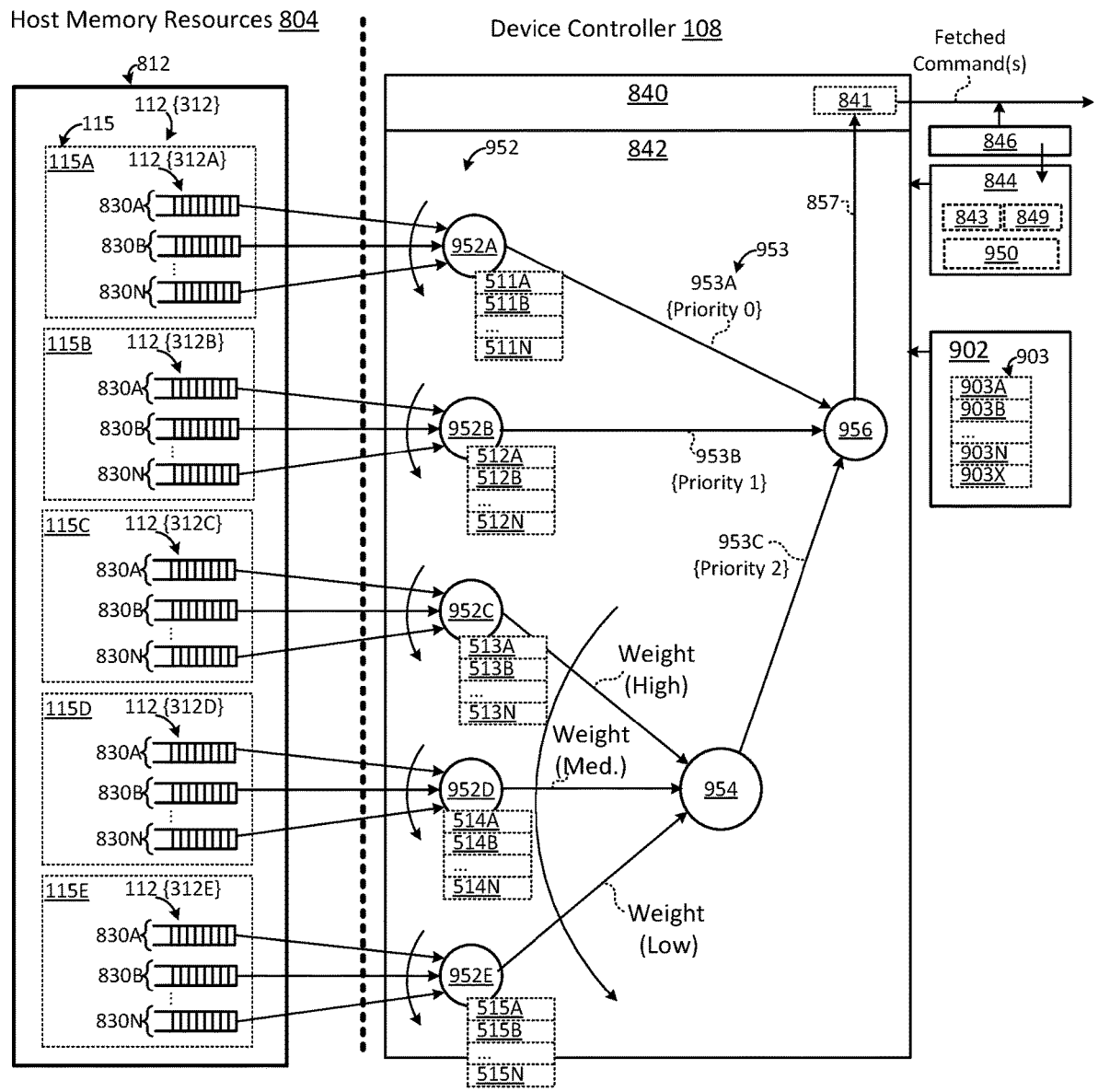
FIG. 9C is a schematic block diagram of further embodiments of a nonvolatile storage device configured to implement another embodiment of a dynamic, flat arbitration scheme in a virtual computing environment.

FIG. 9C is a schematic block diagram depicting one embodiment of a device controller 108 configured to arbitrate between submission queues 112 in a virtual computing environment in accordance with another embodiment of an adaptive, flat arbitration scheme. The arbitration logic 842 may be configured to implement a "flat" round robin arbitration scheme between respective IOV functions 830A-N, and implement a weighted and/or prioritized arbitration scheme between respective submission queues 112 of the IOV functions 830A-N (e.g., a weighted round robin arbitration scheme with urgent priority). During static mode operation, the arbitration logic 842 may be configured to implement the arbitration scheme disclosed above in conjunction with FIG. 8D. During operation in a dynamic or hybrid mode, the arbitration logic 842 may be configured to modify the arbitration scheme in accordance with one or more dynamic factors, such as command statistics determined for respective IOV functions 830A-N (and/or the submission queues 112 thereof), current resource availability, and/or the like, as disclosed herein.

The arbitration logic 842 may be configured to select a submission queue 112 (produce a result 857), which may be used as a currently-selected submission queue 841 of the command fetch logic 840. The command fetch logic 202 may fetch commands from the currently-selected submission queue 841 until interrupted by, inter alia, the arbitration manager 844, as disclosed herein (e.g., in response to monitoring commands fetched form the currently-selected submission queue 841).

The arbitration logic 842 may comprise a plurality of adaptive group arbiters 952, each configured to arbitrate between a selected set or group of submission queues 112 (e.g., groups 115A-E, as disclosed above in conjunction with FIG. 8D). The adaptive group arbiter 952A may be configured to arbitrate between submission queues 112 of the admin priority group 115A, the adaptive group arbiter 952B may be configured to arbitrate between submission queues 112 of the urgent priority group 115B, and so on, with the adaptive group arbiter 952E being configured to arbitrate between submission queues 112 of the low priority group 115E.

In some embodiments, the adaptive group arbiters 952 may be configured to operate in static mode, which may comprise arbitrating between respective groups of submission queues 112 using a static arbitration scheme, such as a round robin arbitration scheme, as disclosed above. The adaptive group arbiters 952 may be configured to modify and/or adapt the static arbitration scheme. The adaptive group arbiters 952 may be configured to arbitrate between the submission queues 112 of a group 115 based on, inter alia, execution probabilities determined for the respective submission queues 112. The execution probabilities of the respective submission queues 112 may be derived the command statistics metadata 950 (e.g., SQ command statistics pertaining to commands fetched from the respective submission queues 112) and/or resource state metadata 930 (e.g., current availability of resources assigned to respective IOV functions 830A-N), as disclosed herein. In FIG. 9C, the execution probabilities determined for the submission queues 112 of each group 115A-E are represented as 511A-N, 512A-N, 513A-N, 514A-N, and 515A-N, respectively: 511AN correspond to respective admin priority submission queue(s) 112 of each IOV function 830A-N, 512A-N correspond to respective urgent priority submission queue(s) of each IOV function 830A-N, 513A-N correspond to respective high priority submission queue(s) 112 of each IOV function 830A-N, 514A-N correspond to respective medium priority submission queue(s) 112 of each IOV function 830A-N, and so on, with 515A-N corresponding to respective low priority submission queue(s) 112 of each IOV function 830A-N.

Each adaptive group arbiter 952 may be configured to arbitrate between the submission queues 112 of a respective group 115 (e.g., in accordance with a round robin arbitration scheme). The adaptive group arbiters 952 may be configured to skip and/or de-prioritize submission queue(s) 112 having low execution probabilities (e.g., execution probabilities that are lower than a first threshold). Each submission queue 122 may be configured to arbitrate between a subset of the submission queues of a respective group 115 (a group subset), the group subset comprising submission queues 112 of the group having an execution probability that satisfies the first threshold (and excludes submission queues 112 of the group 115 that fail to satisfy the first threshold). Alternatively, or in addition, the adaptive group arbiters 952 may be configured to weight and/or prioritize submission queues 112 in accordance with the determined probabilities, as disclosed above (e.g., assign a weight W, where W=Ws+Wd*PE).

The arbitration logic 842 may further comprise an adaptive weighted arbiter 954, which may arbitrate between outputs of group arbiters 952C-E. When operating in static mode, the adaptive weighted arbiter 954 may implement a static arbitration scheme between the outputs of adaptive group arbiters 952C-E, as disclosed above. Alternatively, the adaptive weighted arbiter 954 may be configured to arbitrate between the submission queues 112 selected by the adaptive group arbiters 952C-N based on, inter alia, the execution probabilities determined for the selected submission queues 112, as disclosed above. The adaptive weighted arbiter 954 may skip selection of a submission queue 112 in response to determining that the execution probability thereof is lower than a second threshold. Alternatively, or in addition, the adaptive weighted arbiter 954 may be configured to weight and/or prioritize respective submission queues 112 based on the execution probabilities of the respective submission queues 112. In some embodiments, the execution probabilities may be used to adjust the weights assigned to the winners selected from the respective groups 115C-E (e.g., adjust high, medium, and/or low weights assigned to the results from adaptive group arbiters 952C-E). The adjusted weights ($W_{adj}$) may be determined by $W_{adj}=W_{orig}*PE$ and/or $W_{adj}=S*W_{orig}+D$ ($W_{orig}*PE$), as disclosed above.

The arbitration logic 842 may further comprise an adaptive priority arbiter 956, which may be configured to arbitrate between results 953 in accordance with a priority arbitration scheme. As disclosed above, the adaptive priority arbiter 956 may assign a highest priority to the result 953A of adaptive group arbiter 952A, assign a next highest priority to the result 953B of adaptive group arbiter 952B, and assign a lowest priority to the result 953C of the adaptive weighted arbiter 954. In some embodiments, the adaptive priority arbiter 956 may be configured to implement a static, priority-based arbitration scheme (per priority arbiter 856, disclosed above). Alternatively, the adaptive priority arbiter 956 may modify the static, priority-based arbitration scheme (override the strict priority scheme implemented during operation in the static mode). The adaptive priority arbiter 956 may be configured to skip submission queues 112 having execution probabilities that are lower than a minimum execution probability threshold, regardless of the priority thereof (a third minimum threshold). The minimum threshold applied to higher priority submission queues 112 may be lower than the minimum threshold applied to lower priority submission queues 112, which may reduce the likelihood of skipping and/or de-prioritizing the higher priority submission queues. In the FIG. 9C embodiment, the minimum execution probability threshold applied to the result 953A from the admin group 115A may be lower than the minimum execution probability threshold applied to the results 953B-C from groups 115C-E, and the minimum execution probability threshold applied to the result 953B may be lower than the minimum execution probability threshold applied to the result 953C (comprising a submission queue 112 selected from one of the lower priority groups 115C-D). Alternatively, or in addition, the adaptive priority arbiter 956 may be configured to adjust the weights and/or priorities assigned to the respective submission queues 112 of results 953A-C in accordance with the determined execution probabilities of the respective submission queues 112, as disclosed above. The weighting may ensure that the strict priority arbitration is enforced except in situations where a higher priority queue has a very low execution probability (e.g., may adjusting static (S) and/or dynamic (D) scaling factors in the determination of the adjusted weights ($W_{adj}$) of the respective submission queues 112).

The submission queue 112 selected by the adaptive priority arbiter 956 (from results 953A-C) may comprise the result 857 of the arbitration operation. The result 857 may be used as the currently-selected submission queue 841 of the command fetch logic 840, which may fetch one or more command(s) therefrom (e.g., until interrupted). The arbitration monitor 844 may determine arbitration monitoring data 843 pertaining to the fetched, evaluate one or more arbitration criteria 849, and/or determine whether to interrupt command fetching (e.g., initiate arbitration operation(s) to replace the currently-selected submission queue 841 with a next submission queue 112), as disclosed herein.

Figure 9D:
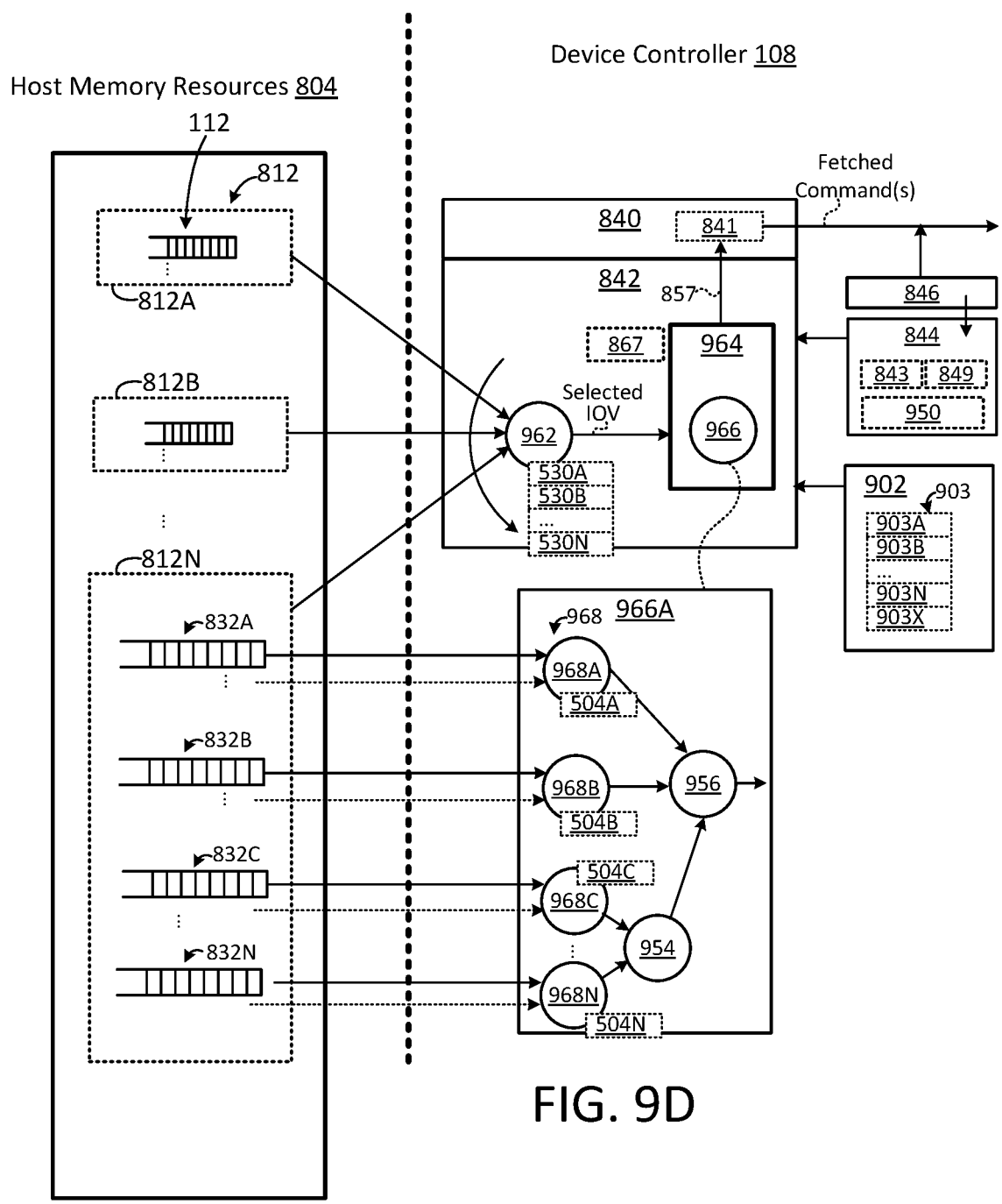
FIG. 9D is a schematic block diagram depicting one embodiment of a device controller configured to arbitrate between submission queues in a virtual computing environment in accordance with an adaptive, weighted arbitration scheme.

FIG. 9D is a schematic block diagram depicting one embodiment of a device controller 108 configured to arbitrate between submission queues 112 in a virtual computing environment in accordance with an adaptive, weighted arbitration scheme. The arbitration logic 842 of the FIG. 9D embodiment may be configured to modify the static arbitration schemes described above in conjunction with FIG. 8E to, inter alia, arbitrate between IOV functions 830 and/or submission queues 112 in accordance with command statistics of respective IOV functions 830 and/or the current availability of storage device resources 930 (as indicated by resource state metadata 903).

In the FIG. 9D embodiment, each IOV function 830A-N may be assigned a respective weight and/or priority. The weight and/or priority of each IOV function 830A-N may be maintained within, inter alia, arbitration metadata 845 of the IOV functions 830A-N, and may be managed by and/or through the primary IOV function 830A.

The arbitration logic 842 comprise an adaptive IOV arbiter 962. When operating in the static mode, the adaptive IOV arbiter 962 may be configured to arbitrate between the IOV functions 830A-N in accordance with weights and/or priorities assigned thereto. The arbitration logic 842 may modify this static arbitration scheme to, inter alia, arbitrate between IOV functions 830A-N based on command statistics of the respective IOV function 830A-N (e.g., IOV command statistics) and/or the current availability of storage device resources 930 assigned to the respective IOV functions 830A-N. As disclosed above, the arbitration manager 844 may be configured to maintain IOV command statistics pertaining to commands fetched from the submission queues 112 of respective IOV functions 830A-N. The IOV command statistics of an IOV function 830 may be derived from the SQ command statistics of each submission queue 112 thereof (may comprise a combination or aggregation of each set of SQ command statistics). The IOV command statistics of an IOV function 830 may indicate the probability that the next command fetched therefrom will have particular characteristics (e.g., will be an admin, read, or write command), which may indicate the likelihood that execution of the next command will require the use of particular storage device resources 930. The IOV command statistics may be compared to resource state metadata 903 pertaining to the IOV function 830, which may indicate the probability that currently available storage device resources 930 assigned thereto will be capable of executing the next command likely to be fetched from the IOV function 830 (e.g., determine an execution probability for the IOV function 830, based on commands previously fetched from submission queue(s) 112 of the IOV function 830).

The adaptive IOV arbiter 962 may arbitrate between IOV functions 830A-N based on, inter alia, execution probabilities determined for each IOV function 830A-N. In FIG. 9D, the execution probabilities determined for each IOV function 830A-N are represented as execution probabilities 530A-N (execution probability 530A corresponding to IOV function 830A, and so on, with execution probability 530N corresponding to IOV function 830N). Each execution probability 530A-N may be determined by comparing IOV command statistics of a respective IOV function 830A-N to resource state metadata 903A-N indicating the state of resources assigned to the respective IOV functions 830A-N. The adaptive IOV arbiter 962 may be configured to skip and/or de-prioritize IOV functions 830A-N determined to have an execution probability 530A-N lower than a threshold. The adaptive IOV arbiter 962 may be configured to adjust weights assigned to each IOV function 830A-N in accordance with the respective execution probabilities 530A-N of the IOV functions 830A-N (e.g., determine an adjusted weight ($W_{adj}$) for each IOV function 830A-N based on an original weight ($W_{orig}$) and execution probability 530A-N of the IOV function 830A-N). The adaptive IOV arbiter 962 may arbitrate between the IOV functions 830A-N in accordance with the adjusted weights ($W_{adj}$). In some embodiments, the adaptive IOV arbiter 962 may be configured to arbitrate between a subset of the IOV functions 830A-N, the subset comprising IOV functions 830A-N determined to have an execution probability 530A-N that satisfies a first minimum threshold.

The IOV function 830 selected by the adaptive IOV arbiter 962 (the winner IOV function 830A-N) may flow to the adaptive IOV queue arbiter 964. The adaptive IOV queue arbiter 964 may be configured to arbitrate between the submission queues 112 of the selected IOV function 830 (e.g., select one of the submission queues 112 of the IOV function 830). The adaptive IOV queue arbiter 964 may be configured to arbitrate between a subset of the submission queues 112 (e.g., the set 812A-N of submission queues 112 of the selected IOV function 830A-N). In one non-limiting example, the IOV arbiter 962 may select IOV function 830N and, in response, the IOV queue arbiter 964 may be configured to arbitrate between the set 812N of submission queues 112 of IOV function 830N (excluding submission queues 112 included in sets 812A-N−1).

The adaptive IOV queue arbiter 964 may implement any suitable adaptive queue arbitration scheme 966. The adaptive IOV queue arbiter 964 may be configured to implement one of a plurality of different adaptive queue arbitration schemes 966 in accordance with the configuration and/or settings of the selected IOV function 830 (and/or the configuration and/or settings of the submission queues 112 thereof). The arbitration logic 842 may be configured to maintain arbitration state metadata 867, which may comprise, inter alia, information pertaining to arbitration between the submission queues 112 of each IOV function 830 (e.g., information pertaining to the adaptive queue arbitration scheme 966 used to arbitrate between the submission queues 112 of respective IOV functions 830A-N and/or the state thereof).

In the FIG. 9D embodiment, the winner of the adaptive IOV arbiter 862 may be IOV function 830N, and the adaptive IOV queue arbiter 864 may be configured to implement an adaptive queue arbitration scheme 966A. In static mode, the adaptive queue arbitration scheme 966A may be implemented by a plurality of adaptive queue-level arbiters 968A-C. Each adaptive queue-level arbiter 968 may be configured to arbitrate between a respective type or classification of submission queues 112, including admin submission queues 832A, urgent submission queues 832B, high priority submission queues 832C, and so on, including low priority submission queues 832N. When operating in static mode, the adaptive queue-level arbiters 968 may implement a static arbitration scheme (e.g., round robin, weighted round robin, and/or the like). Alternatively, the adaptive queue-level arbiters 968 may be configured to modify the static arbitration scheme in accordance with execution probabilities determined for the submission queues 112 of IOV function 830N, as disclosed herein. In FIG. 9D, the execution probabilities determined for the respective submission queues 112 of IOV function 830N are represented as execution probabilities 504A-N. As disclosed above, the execution probabilities 504A-N of the respective submission queues 832A-N may be determined by, inter alia, comparing probable resource requirements of the respective submission queues 832A-N (derived from SQ command statistics pertaining to commands previously fetched form the respective submission queues 112), to the resource state metadata 903 (e.g., resource state metadata 903N, which may indicate the state of storage device resources 930 assigned to the IOV function 830N, and exclude storage device resources 930 assigned to other IOV functions 830A-N−1).

The submission queues 12 selected from the lower-priority submission queues 832C-N (by queue arbiters 968C-N) may flow to the adaptive weighted arbiter 954, which may select a winner therefrom. The arbitration may be based, at least in part, on execution probabilities 504C-D of the submission queues 112 selected by the queue arbiters 968C-N. The adaptive weighted arbiter 954 may be configured to implement one or more of a static, dynamic, and/or hybrid arbitration scheme, as disclosed herein (e.g., as disclosed above in conjunction with FIG. 9C). The adaptive prioritized arbiter 956 may be configured to arbitrate between the submission queues 112 selected by each of the queue-level arbiter 968A, the queue-level arbiter 968B, and the adaptive weighted arbiter 954. The arbitration may be based on, inter alia, execution probabilities 504A-N of the selected submission queues 112. The adaptive prioritized arbiter 956 may be configured to implement one or more of a static, dynamic, and/or hybrid arbitration scheme, as disclosed herein (e.g., as disclosed above in conjunction with FIG. 9C).

The command fetch logic 840 may use the result 857 produced by the arbitration logic 842 as the currently-selected submission queue 841, and may fetch commands therefrom. The arbitration manager 844 may be configured to monitor the fetched commands in order to, inter alia, determine whether to interrupt command fetching (e.g., by comparing arbitration monitoring data 843 to one or more arbitration criteria 849), capture command statistics pertaining to commands fetched from respective submission queues 112, and/or the like, as disclosed herein. In some embodiments, arbitration manager 844 may be configured to initiate one or more queue-level and/or IOV-level arbitration operations. As disclosed above, a queue-level arbitration operation may comprise arbitrating between the submission queues 112 of the currently-selected IOV function 830A-N. In the non-limiting example above, a queue-level arbitration operation may comprise arbitrating between the submission queues 112 of IOV function 830N (e.g., submission queues 832A-N of set 812N). In the FIG. 9D embodiment, queue-level arbitration operations may not involve arbitration between IOV functions 830A-N (e.g., may not involve the use of the adaptive IOV arbiter 962). An IOV-level arbitration operation may comprise arbitrating between the IOV functions 830A-N (by use of the adaptive IOV arbiter 962) to select an IOV function 830, and may further comprise a queue-level arbitration operation to arbitrate between the submission queues 112 of the selected IOV function 830.

Figure 9E:
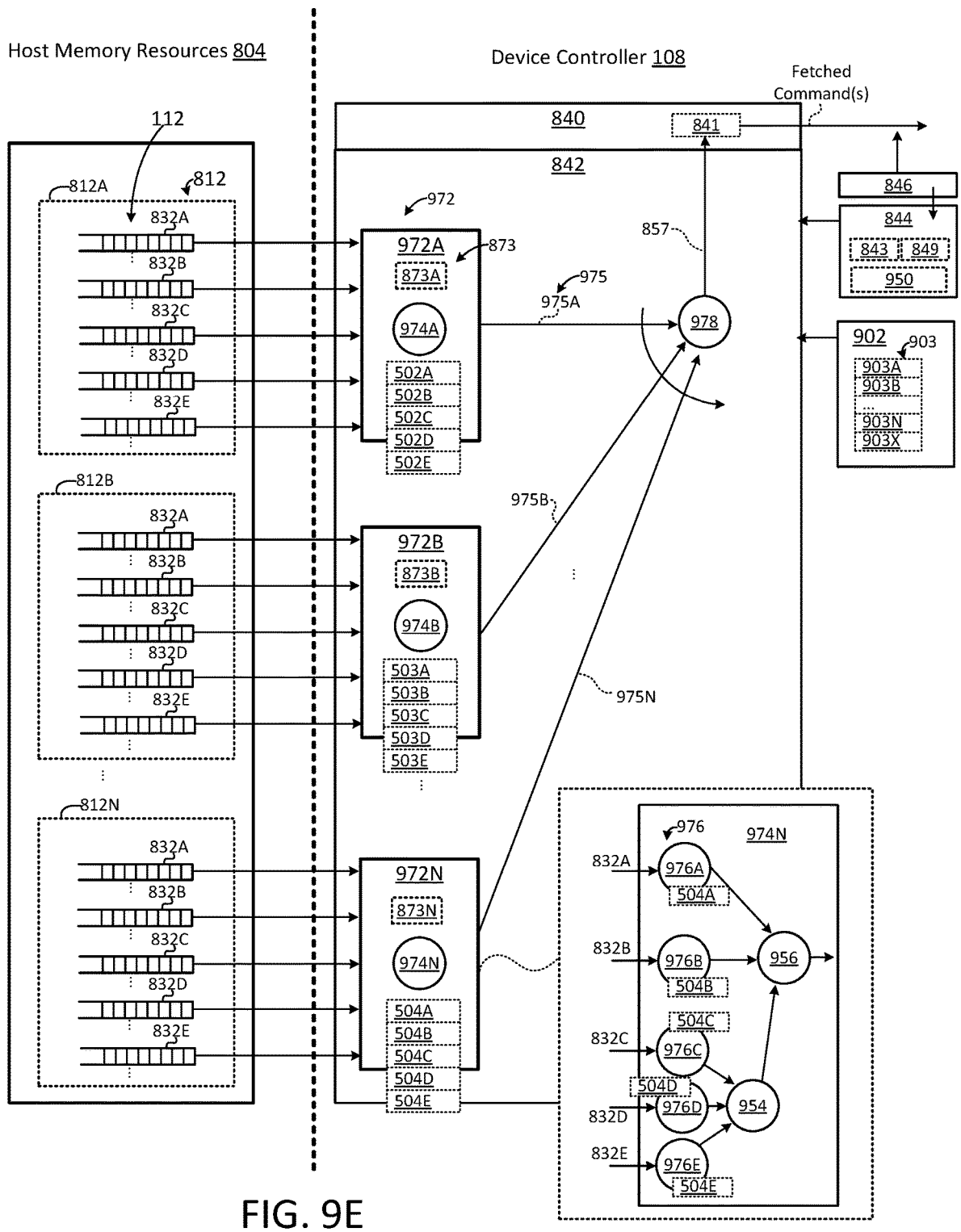
FIG. 9E is a schematic block diagram depicting one embodiment of a device controller configured to arbitrate between submission queues in a virtual computing environment in accordance with another embodiment of an adaptive, weighted arbitration scheme.

FIG. 9E is a schematic block diagram depicting one embodiment of a device controller 108 configured to implement another embodiment of an adaptive, weighted arbitration scheme. The arbitration logic 842 of the FIG. 9E embodiment may be configured to modify the static arbitration schemes described above in conjunction with FIG. 8F to, inter alia, arbitrate between IOV functions 830 and/or submission queues 112 in accordance with command statistics of respective IOV functions 830 and/or the current availability of storage device resources 930 (as indicated by resource state metadata 903).

As illustrated in FIG. 9E, each IOV function 830 may comprise and/or correspond to a plurality of submission queues 112 (e.g., a respective set 812 of submission queues 112). The arbitration logic 842 may comprise a plurality of adaptive first- and/or queue-level arbiters 972 and a secondand/or IOV-level arbiter 978. In the FIG. 9E embodiment, implementing an arbitration operation may comprise: a) performing first- or queue-level arbitration(s) between submission queues 112 of respective IOV functions 830 (respective sets 812) to determine a plurality of first- and/or queue-level results 975; and b) performing a second- or IOV-level arbitration between the plurality of queue-level results 975 to determine the result 857 of the arbitration (which may determine the currently-selected submission queue 841 of the command fetch logic 840, as disclosed herein).

Each adaptive queue-level arbiter 972A-N may be configured to arbitrate between the submission queues 112 of a respective IOV function 830A-N (e.g., a respective set 812A-N of submission queues), and/or maintain corresponding arbitration state metadata 873A-N, as disclosed herein. The adaptive queue-level arbiters 972A-N may implement respective adaptive arbitration schemes 974A-N (or may implement a same arbitration scheme 974). During static mode operation, the queue-level arbiters 972A-N may implement static arbitration operations to select between the submission queues 112 of respective IOV functions 830A-N (e.g., as disclosed above in conjunction with FIG. 8F).

In some embodiments, the adaptive queue-level arbiters 972 may be configured to operate in one or more of a dynamic and/or hybrid mode. The adaptive queue-level arbiters 972A-N may be configured to arbitrate between the submission queues 112 of respective IOV functions 830A-N in accordance with execution probabilities determined for the respective submission queues 112 (which may be based on SQ command statistics pertaining to commands previously fetched from the respective submission queues 112 and/or current availability of storage device resources 930, as disclosed herein). In the FIG. 9E embodiment, the adaptive queue-level arbiter 972A may be configured to arbitrate between submission queues 112 of IOV function 830A (set 812A) in accordance with execution probabilities 502A-E, which may correspond to respective admin, urgent, high priority, medium priority, and/or low priority submission queue(s) 832A-N of set 812A; the adaptive queue-level arbiter 972B may be configured to arbitrate between the submission queues 112 of IOV function 830B (set 812B) in accordance with execution probabilities 503A-E, which may correspond to respective admin, urgent, high priority, medium priority, and/or low priority submission queues 832A-N of set 812B; and so on, with the adaptive queue-level arbiter 972N being configured to arbitrate between the submission queues 112 of IOV function 830N (set 812N) in accordance with execution probabilities 504A-E determined for respective admin, urgent, high priority, medium priority, and/or low priority submission queues 832A-N of set 812N.

The adaptive queue-level arbiters 972 may be configured to skip submission queues 112 determined to have execution probabilities below a minimum threshold. Accordingly, one or more of the adaptive queue-level arbiters 972 may be configured to arbitrate between a subset of the submission queues 112 of an IOV function 830, the subset comprising submission queues 112 having an execution probability greater than the minimum threshold. Alternatively, or in addition, the adaptive queue-level arbiters 972 may be configured to determine and/or weights and/or priorities of the respective submission queues 112 in accordance with the execution probabilities of the respective submission queues 112, as disclosed herein. The adaptive queue-level arbiters 972A-N may be configured to select submission queues 112 from each IOV function 830A-N concurrently and/or in parallel, which may enable fast and efficient switching between submission queues 112 of different IOV functions 830A-N (since the winner(s) from each IOV function 830A-N may be available substantially concurrently, as opposed to being selected only after an IOV-level arbitration between the IOV functions 830A-N, as in the FIG. 9D embodiment).

The adaptive queue-level arbiters 972 may be configured to implement any suitable arbitration scheme 974. In the FIG. 9E embodiment, the adaptive queue-level arbiter 972N comprises an adaptive arbitration scheme 974N configured to arbitrate between submission queues 112 of IOV function 830N by use of one or more adaptive queue arbiter(s) 976, an adaptive weighted arbiter 954, and an adaptive prioritized arbiter 956. Each adaptive queue arbiter 976 may be configured to arbitrate between submission queues 112 of a particular type and/or priority classification. The adaptive queue arbiter 976A may be configured to arbitrate between admin submission queues 832A of the IOV function 830N, the adaptive queue arbiter 976B may be configured to arbitrate between urgent submission queues 832B of the IOV function 830N, the adaptive queue arbiter 976C may be configured to arbitrate between high priority submission queues 832C of the IOV function 830N, the adaptive queue arbiter 976D may be configured to arbitrate between medium priority submission queues 832D of the IOV function 830N, and so on, with the adaptive queue arbiter 976E being configured to arbitrate between low priority submission queues 832E of the IOV function 830N. The adaptive queue arbiters 976 may implement any suitable arbitration scheme (e.g., round robin arbitration), and may modify and/or adapt the arbitration scheme in accordance with execution probabilities 504A-N determined for respective submission queues 112, as disclosed herein (e.g., by skipping submission queues 112 having execution probabilities lower than a threshold, weighting and/or prioritizing submission queues 112 by execution probability, and/or the like). The adaptive weighted arbiter 954 may be configured to arbitrate between submission queues 112 selected by the respective adaptive queue arbiters 976C-E, and the adaptive priority arbiter 956 may be configured to arbitrate between submission queues 112 selected from the admin queues 832A, urgent queues 832B, and lower-priority queues 832C-E of the IOV function 830N, as disclosed herein (e.g., in accordance with one or more of a static, dynamic, and/or hybrid mode). The result of the arbitration implemented by the adaptive priority arbiter 956 may comprise the result 975 of the queue-level arbiter 972N.

The adaptive queue-level arbiter 978 may be configured to arbitrate between the results 975 selected from submission queues 112 of respective IOV functions 830A-N. Each result 975A-N may comprise a submission queue 112 selected from the submission queues 112 of a respective IOV function 830A-N (by a respective, adaptive queue-level arbiter 972A-N). The adaptive IOV-level arbiter 978 may implement any suitable arbitration scheme, and may be configured to operate in one or more of a static, dynamic, and/or hybrid mode, as disclosed herein. The adaptive IOV-level arbiter 978 may be configured to arbitrate between results 957A-N in accordance with execution probabilities thereof (and/or execution probabilities of the corresponding IOV functions 830A-N). The adaptive IOV-level arbiter 978 may be configured to skip results 975A-N determined to have an execution probability lower than one or more minimum threshold(s). Alternatively, or in addition, the adaptive IOV-level arbiter 978 may be configured to weight and/or prioritize respective results 975A-N in accordance with the execution probabilities thereof, as disclosed herein (e.g., determine weights, as $W=Ws+Wd*PE$, where W is the weight determined for a selected submission queue 975, Ws is a pre-determined static weighting factor, Wd is a pre-determined dynamic weighting factor, and PE is execution probability determined for the submission queue 112). In some embodiments, the adaptive IOV-level arbiter 978 may be configured to weight the results 975A-N in accordance with weights and/or priorities assigned to the corresponding IOV functions 830A-N (as defined in, inter alia, arbitration metadata 845A-N of the respective IOV functions 830A-N). The adaptive IOV-level arbiter 978 may be further configured to adjust the assigned weights and/or priorities in accordance with the execution probabilities of the results 975A-N (e.g., determine the adjusted weight of a result 975 corresponding to a particular IOV function 830 as, $W_{adj}=S*W_{orig}+D (W_{orig}*PE)$, where $W_{adj}$ is the adjusted weight for the result 975, S is a pre-determined static weighting factor, $W_{orig}$ is the original weight assigned to the particular IOV function 830, D is a pre-determined dynamic weighting factor, and PE is the execution probability determined for the result 975).

In some embodiments, the adaptive IOV-level arbiter 978 may be configured to implement a prioritized arbitration scheme, as disclosed above in conjunction with FIG. 8F. The prioritized arbitration scheme may comprise designating one or more of the IOV functions 830 with an admin (or urgent) priority classification and/or designating other IOV functions 830 as lower priority (e.g., similar to the submission queue priorities 312A-N, as disclosed herein). The designation(s) may be recorded within the arbitration metadata 845 of the IOV functions 830, which may be managed by and/or through the primary IOV function 830A. By way of non-limiting example, the primary IOV function 830A may be designated an admin priority, and the secondary IOV functions 830B-N may be non-designated (e.g., designated with lower priorities). During static mode operation, the adaptive IOV-level arbiter 978 may be configured to implement a strict priority arbitration, which may comprise selecting submission queues 112 of the primary IOV function 830A (result 975A of adaptive queue-level arbiter 972A) until all of the submission queues 112 of the primary IOV function 830A are empty (and may arbitrate between results 975B-N while the submission queues 112 of the primary IOV function 830A remain empty). The adaptive IOV-level arbiter 978 may be configured to modify the strict priority arbitration scheme based on execution probabilities of the results 975A-N, as disclosed herein. The result 975A of the primary IOV function 830A may be selected with the submission queues 112 thereof are non-empty and an execution probability thereof satisfies a specified threshold, which may be lower than other minimum thresholds applied to other results 975B-N. The adaptive IOV-level arbiter 978 may arbitrate between results 975B-N while the submission queues 112 of IOV function 830A are empty and/or have execution probabilities below the specified threshold.

The adaptive IOV-level arbiter 978 may determine the result 857 produced by the arbitration logic 842. The adaptive IOV-level arbiter 878 may be configured to couple the result 857 of the arbitration logic 842 to a selected one of the adaptive queue-level arbiters 972, such that the result 857 (and/or currently-selected submission queue 841) is determined the result(s) 975 produced by the selected adaptive queue-level arbiter 972. The command fetch logic 840 may be configured to fetch commands from respective submission queue(s) 112 of the currently-selected IOV function 830 until interrupted by, inter alia, the arbitration manager 844. The arbitration manager 844 may be configured to monitor commands fetched from the currently-selected submission queue 841 (by use of the command monitor 846), maintain command statistics metadata 950 pertaining to commands fetched from respective submission queues 112 and/or submission queues 112 of respective IOV functions 830A-N, determine arbitration monitoring data 843, and/or evaluate one or more arbitration criteria 849, as disclosed herein. The currently-selected submission queue 841 may be determined by the adaptive queue-level arbitrator 872 of a currently-selected IOV function 830 (per the IOV-level arbitration implemented by adaptive IOV arbiter 978). The arbitration manager 844 may initiate queue-level arbitration operations to arbitrate between the submission queues 112 of the currently-selected IOV function 830 (e.g., replace the currently-selected submission queue 841 with another submission queue 112 of the currently-selected IOV function 830) in accordance with queue-level arbitration criteria and/or arbitration monitoring data 843 pertaining to commands fetched from the currently-selected submission queue 841. The arbitration manager 844 may be further configured to initiate IOV-level arbitration operations to arbitrate between IOV functions 830 (e.g., replace the currently-selected IOV function 830 with another one of the IOV functions 830A-N) in accordance with IOV-level arbitration criteria and/or arbitration monitoring data 843 pertaining to commands fetched from submission queues 112 of the currently-selected IOV function 830.

Figure 9F:
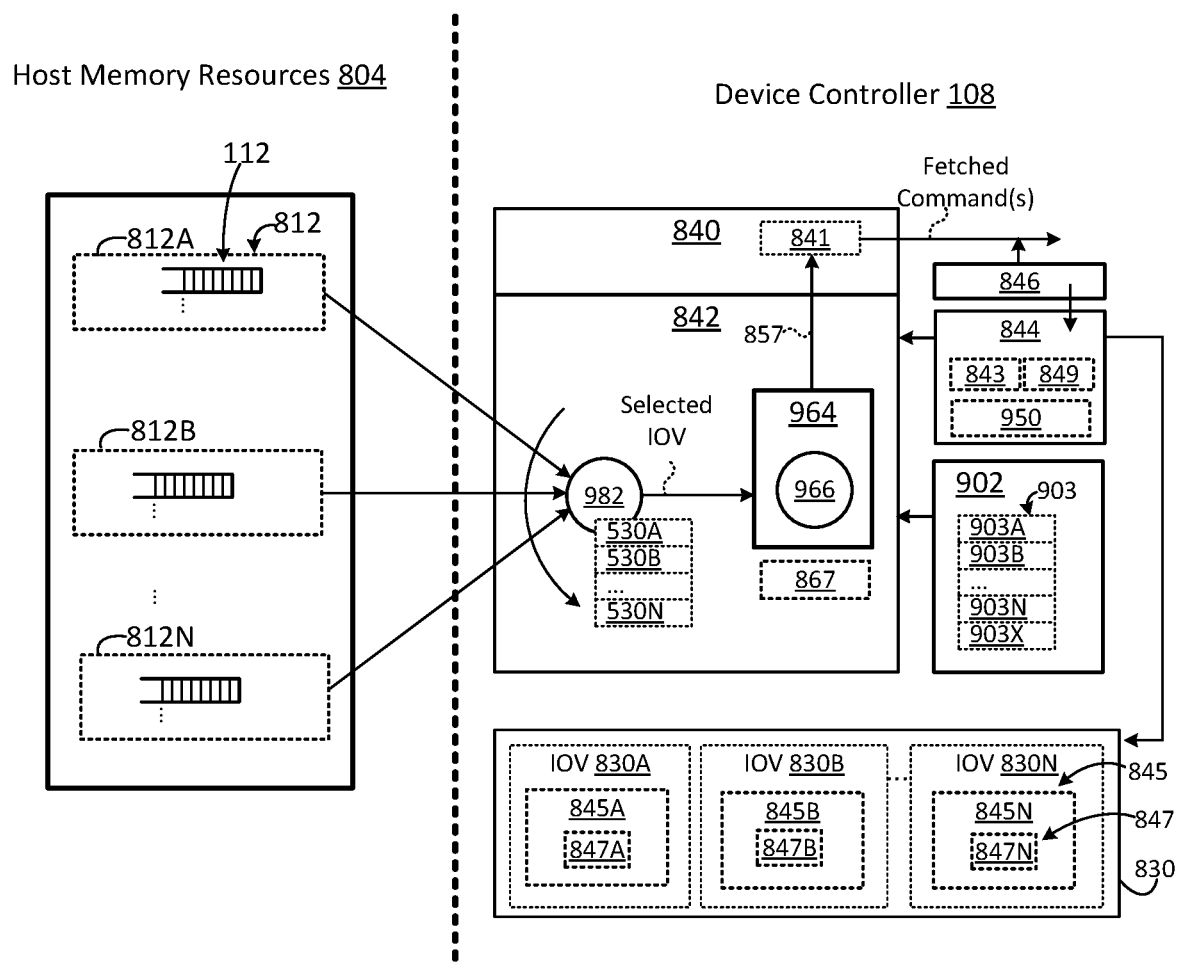
FIG. 9F is a schematic block diagram depicting one embodiment of a device controller configured to arbitrate between submission queues in a virtual computing environment in accordance with an adaptive, credit-based arbitration scheme.

FIG. 9F is a schematic block diagram depicting one embodiment of a device controller 108 configured to arbitrate between submission queues 112 in a virtual computing environment in accordance with an adaptive, credit-based arbitration scheme. During static mode operation, the arbitration logic 842 may implement a credit-based arbitration scheme, as described herein (e.g., as described in conjunction with FIGS. 8G and/or 8H). The arbitration logic 842 may be configured to modify the static credit-based arbitration scheme in order to, inter alia, arbitrate between IOV functions and/or submission queues 112 in accordance with command statistics and/or the current availability of respective storage device resources 930.

In the FIG. 9F embodiment, each IOV function 830A-N may be allocated a determined number of credits 847. Fetching a command from a submission queue of an IOV function 830A-N may consume a determined amount of credits 847A-N of the IOV function 830A-N. The adaptive credit-based arbiter 982 may be configured to arbitrate between the IOV functions 830A-N (e.g., select between the IOV functions 830A-N) in accordance with the amount of remaining credits 847A-N held by the respective IOV functions 830A-N. During static mode operation, the adaptive credit-based arbiter 982 may arbitrate between IOV functions 830 as disclosed herein (e.g., as described above in conjunction with FIGS. 8G and/or 8H).

In some embodiments, the adaptive, credit-based arbiter 982 may be configured to modify the static, credit-based arbitration scheme disclosed above based on, inter alia, execution probabilities determined for respective IOV functions 830A-N (in FIG. 9F, the execution probabilities determined for each IOV function 830A-N are represented as execution probabilities 530A-N). The adaptive credit-based arbiter 982 may be configured to skip selection of IOV functions 830A-N determined to have an execution probability 530A-N lower than a threshold. Alternatively, or in addition, the adaptive credit-based arbiter 982 may select the IOV function 830A-N having a highest determined execution probability 530A-N (regardless of the remaining credits 847 thereof). In some embodiments, an IOV function 830A-N having no remaining credits 847 (and/or fewer than a threshold amount) may be selected in response to skipping other IOV functions 830A-N with larger amounts of credits, but lower execution probabilities 530A-N.

The IOV function 830 selected by the adaptive credit-based arbiter 982 may flow to the adaptive queue arbiter 964. The adaptive queue arbiter 964 may be configured to arbitrate between the submission queues 112 of the selected IOV function 830 (the winner of the adaptive, credit-based arbitration). The adaptive queue arbiter 964 may be configured to implement any suitable adaptive arbitration scheme 966 including, but not limited to: a static queue arbitration scheme (e.g., round robin, weighted round robin, weighted round robin with urgent priority class, and/or the like), a dynamic queue arbitration scheme, a hybrid queue arbitration scheme, and/or the like (e.g., an adaptive, weighted round robin with urgent priority class arbitration scheme as disclosed above in conjunction with FIG. 9D). The submission queue 112 selected by the adaptive queue arbiter 964 may comprise the result 857 of the arbitration logic 842. The command fetch logic 840 may use the result 857 as the currently-selected submission queue 841, and may fetch commands therefrom. The arbitration manager 844 may be configured to monitor the fetched commands in order to, inter alia, determine whether to interrupt command fetching (e.g., by comparing arbitration monitoring data 843 to one or more arbitration criteria 849), capture command statistics pertaining to commands fetched from respective submission queues 112, and/or the like, as disclosed herein.

In the FIG. 9F embodiment, the arbitration manager 844 may configure the arbitration logic 842 to implement queue-level and/or IOV-level arbitration operations. As disclosed above, a queue-level arbitration operation may comprise arbitrating between the submission queues 112 of a currently-selected IOV function 830 (e.g., without arbitrating between the IOV functions 830A-N). In the FIG. 9F embodiment, a queue-level arbitration operation be implemented by the adaptive IOV queue arbiter 864 (and may not involve the adaptive credit-based arbiter 982). An IOV-level arbitration operation may comprise arbitrating between the IOV functions 830A-N (by use of the adaptive credit-based arbiter 982), and may further comprise a queue-level arbitration operation to arbitrate between the submission queues 112 of the IOV function 830 selected in the adaptive, credit-based arbitration. The arbitration manager 844 may initiate queue- and/or IOV-level arbitration operations in accordance with the arbitration criteria 849 (and/or arbitration monitoring data 843), as disclosed herein.

Figure 9G:
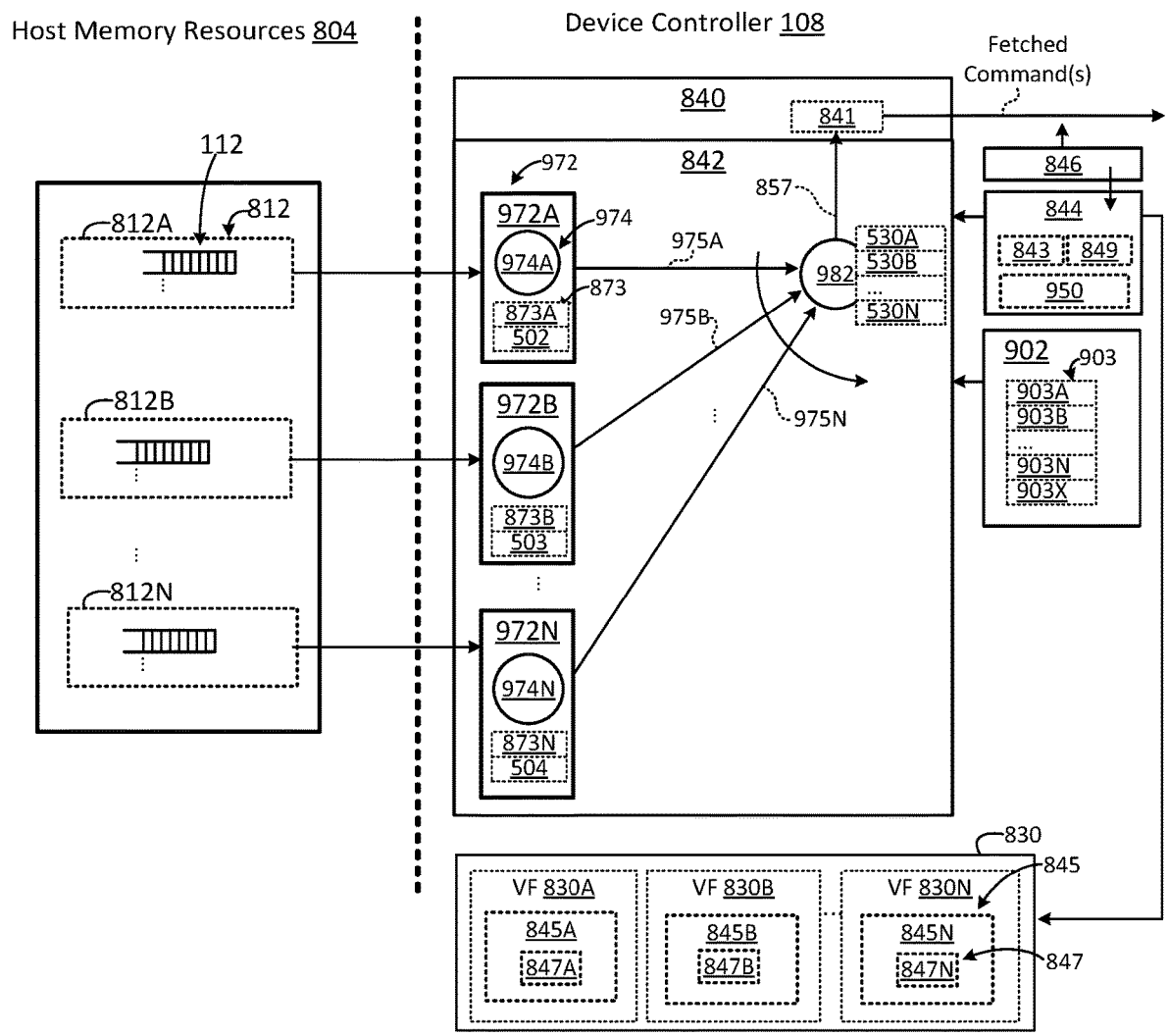
FIG. 9G is a schematic block diagram depicting one embodiment of a device controller configured to implement another embodiment of an adaptive, credit-based arbitration scheme.

FIG. 9G is a schematic block diagram depicting further embodiments of the device controller 108, as disclosed herein. In the FIG. 9G embodiment, the arbitration logic 842 is configured to implement another embodiment of an adaptive credit-based arbitration scheme. The arbitration logic 842 may comprise a plurality of adaptive queue-level arbiters 972, which may be configured to arbitrate between submission queues 112 of respective IOV functions 830, as disclosed above. The arbitration logic 842 may comprise adaptive queue-level arbiters 972A-N, each configured to implement a respective adaptive, queue-level arbitration between the submission queues 112 of a respective set 812A-N of submission queues 112, each set 812A-N comprising the submission queues 112 of a respective IOV function 830A-N. Each adaptive queue-level arbiter 972 may be configured to implement a respective adaptive arbitration scheme 974 and/or maintain respective arbitration state metadata 873, as disclosed herein (to determine a result 975, comprising submission queue(s) 112 of a respective IOV function 830). The adaptive queue-level arbiters 972A-N may be configured to arbitrate between the submission queues 112 of respective IOV functions 830A-N in accordance with execution probabilities determined for the respective submission queues 112, as disclosed herein. In FIG. 9G, execution probabilities 502 represent execution probabilities determined for the submission queues 112 of IOV function 830A (set 812A); execution probabilities 503 represent execution probabilities determined for the submission queues 112 of IOV function 830B (set 812B); and so on, with the execution probabilities 503 representing execution probabilities determined for the submission queues 112 of IOV function 830N (set 812N).

The adaptive credit-based arbiter 982 may be configured to arbitrate between the IOV functions 830A-N based on one or more of: credits 847 of the respective IOV functions 830A-N; execution probabilities 530A-N of the respective IOV functions 830A-N; execution probabilities of the submission queue(s) 112 selected by the respective adaptive queue-level arbiters 972A-N (e.g., results 975A-N), and/or the like, as disclosed herein. The result 875A-N selected by the adaptive credit-based arbiter 982 may comprise the result 857 of the arbitration logic 842. In some embodiments, the adaptive credit-based arbiter 982 may be configured to couple to adaptive queue-level arbiter 972 of the currently-selected IOV function 830 to the result 857, such that the currently-selected submission queue 841 is selected from submission queue(s) 112 of the currently-selected IOV function 830. The command fetch logic 840 may be configured to fetch command(s) from the currently-selected submission queue 841, as disclosed herein.

The arbitration manager 844 may be configured to determine arbitration monitoring data 843 pertaining to fetched commands, which may include queue-level arbitration data pertaining to commands fetched from the currently-selected submission queue 841 (as selected by the adaptive queue-level arbiter 972 of the currently-selected IOV function 830) and/or IOV-level arbitration data pertaining to commands fetched from submission queue(s) 112 of the currently-selected IOV function 830 (as selected by the adaptive credit-based arbiter 982). The arbitration manager 844 may compare the arbitration monitoring data 843 to one or more arbitration criteria 849 (e.g., queue- and/or IOV-level arbitration criteria) and, in response, may initiate one or more queue- and/or IOV-level arbitration operations. A queue-level arbitration operation may comprise configuring the adaptive queue-level arbiter 972 of the currently-selected IOV function 830 to arbitrate between the submission queues 112 of the currently-selected IOV function 830 (replace the currently-selected submission queue 841 with another submission queue 112 of the currently-selected IOV function 830). An IOV-level arbitration operation may comprise configuring the adaptive credit-based arbiter 982 to replace the currently-selected IOV function 830 with another IOV function 830, which may comprise coupling another one of the adaptive queue-level arbiters 972 to the result 857. As illustrated in FIG. 9G, the adaptive queue-level arbitration operation(s) for each IOV function 830A-N may be performed substantially in parallel (e.g., by respective adaptive queue-level arbiters 972A-N), which may enable IOV-level arbitrations to be completed quickly, without the need for implementing adaptive queue-level arbitrations following IOV-level arbitrations (as in the FIG. 9F embodiment).

Figure 10A:
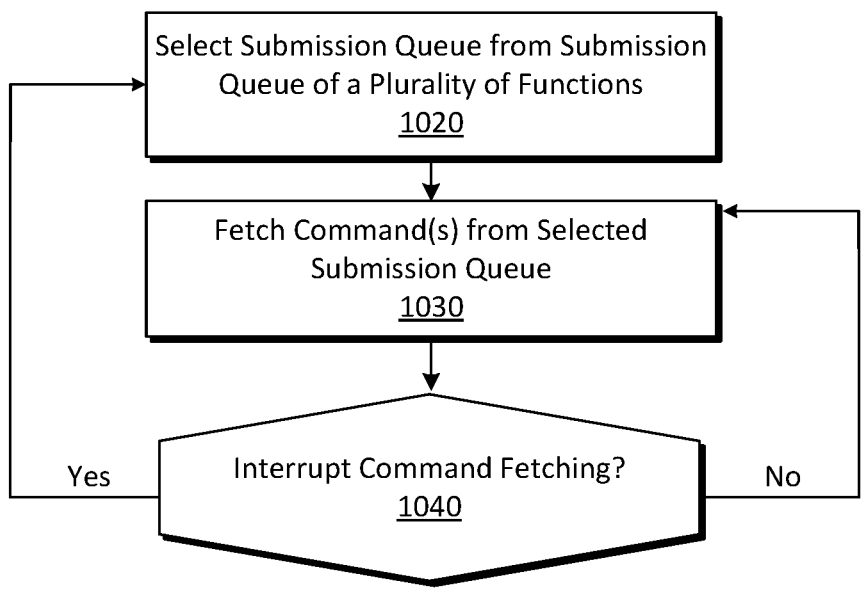
FIG. 10A is a flow diagram depicting one embodiment of a method for command arbitration in a virtual computing environment.

FIG. 10A is a flow diagram of one embodiment of a method 1000 for command arbitration in a virtual computing environment. One or more of the steps and/or operations of the method 1000 (and/or the other method(s) disclosed herein) may be implemented by the use of one or more of hardware components, instructions stored within a non-transitory medium, firmware, configuration data, programmable logic, and/or the like. Portions of the steps and/or operations may be implemented at and/or by one or more of the nonvolatile storage device 106, device controller 108, host device 100 (e.g., by a driver operating on the host device 100, the driver comprising computer-readable instructions stored within non-transitory storage accessible to the host device 100), and/or the like. Embodiments of the method(s) disclosed herein may be embodied as one or more circuits, programmable circuits, logic circuits, programmable logic circuits, control circuitry, device control circuitry, device controller circuitry, the device controller 108, microcode, firmware, configuration data (e.g., an FPGA bitstream, a circuit design (e.g., a Very Large-Scale Integrated (VLSI) circuit design), and/or the like.

Step 1020 may comprise selecting a submission queue 112 from a plurality of submission queues 112, each submission queue 112 corresponding to a respective function of a plurality of functions implemented and/or supported by a nonvolatile storage device 106. Step 1020 may comprise selecting a submission queue 112 from a plurality of submission queues 112, each submission queue 112 corresponding to a respective IOV function 830 of a plurality of IOV functions 830A-N. The IOV functions 830A-N may comprise a primary or physical IOV function (e.g., a primary or physical virtual function) and one or more secondary IOV functions 830B-N (e.g., secondary or virtual functions). The IOV functions 830A-N may comprise and/or correspond to respective IOV controllers implemented and/or supported by the device controller 108 of the nonvolatile storage device 106.

Step 1020 may be initiated and/or triggered by the arbitration manager 844, as disclosed herein (e.g., per step 1040 below). Step 1020 may comprise configuring the arbitration logic 842 to arbitrate between the plurality of submission queues 112, and to designate a result 857 of the arbitration as the currently-selected submission queue 841 of the command fetch logic 840, as disclosed herein.

Step 1020 may comprise selecting a submission queue 112 from a plurality of submission queues 112, each submission queue 112 corresponding to a respective IOV function 830 of a plurality of IOV functions 830A-N. Step 1020 may comprise arbitrating between the plurality of submission queues 112 in accordance with a selected arbitration scheme, designating a result 857 of the arbitration operation as the currently-selected submission queue 841, and so on, as disclosed herein.

Step 1020 may comprise assigning substantially a same weight and/or priority to each IOV function 830A-N. Step 1020 may further comprise assigning substantially a same weight and/or priority to each submission queue 112 of each IOV function 830 and/or arbitrating between the submission queues 112 of each IOV function 830A-N in accordance with a same arbitration scheme (e.g., a round robin arbitration scheme, as disclosed above in conjunction with FIG. 8C). Alternatively, in some embodiments, step 1020 may comprise weighting and/or prioritizing the submission queues 112 of each IOV function 830A-N (e.g., assigning an admin priority to admin queue(s) 832A of each IOV function 830A-N, assigning an urgent priority to urgent queue(s) 832B of each IOV function 830A-N, assigning a high priority to high priority queue(s) 832C of each IOV function 830A-N, and so on, including assigning a low priority to low priority queue(s) 832E of each IOV function 830A-N). In such embodiments, step 1020 may comprise arbitrating between respective groups 115 of the submission queues 112 (e.g., an admin group 115A, urgent group 115B, high priority group 115C, and so on, including a low priority group 115E). Step 1020 may comprise a weighted and/or prioritized arbitration in which submission queues 112 are selected from higher priority groups 115 before being selected from lower priority groups 115 (e.g., as disclosed above in conjunction with FIG. 8D).

In some embodiments, step 1020 may further comprise arbitrating between submission queues 112 based on, inter alia, command statistics pertaining to commands previously fetched from the respective submission queues 112 (and/or current resource availability). Step 1020 may comprise skipping, weighting, and/or prioritizing respective submission queues 112 and/or submission queues 112 of respective groups 115 in accordance with execution probabilities determined for the respective submission queues 112, as disclosed herein (e.g., as disclosed above in conjunction with FIGS. 9B and/or 9C). Step 1020 may, therefore, determine execution probabilities for respective submission queues 112 by, inter alia, monitoring the state of respective storage device resources 930 of the nonvolatile storage device 106 (e.g., by use of the resource monitor 902, as disclosed herein); maintaining command statistics metadata 950 pertaining to commands previously fetched from respective submission queues 112 (e.g., by use of the command monitor 846, as disclosed herein); determining probable resource requirements of the submission queues 112, which may comprise mapping probable command characteristics derived from the command statistics to storage device resource(s) 930 and/or resource types, as disclosed herein (e.g., by the use of pre-determined resource mappings); and/or comparing the probable resource requirements of each submission queue 112 to the resource state metadata 930, as disclosed herein (and/or comparing the probable resource requirements of each submission queue 112 to resource state metadata 903A-N pertaining to the storage device resources 930 currently assigned to the IOV function 830A-N of each submission queue).

The submission queue selected at step 1020 may be designated as the currently-selected submission queue 841 of the command fetch logic 840. Step 1020 may, therefore, comprise interrupting command fetching from the currently-selected submission queue 841 (if any). Step 1020 may further comprise replacing the currently-selected submission queue 841 (if any) with the submission queue 112 selected in the arbitration operation of step 1020 (e.g., the result 857 generated by the arbitration logic 842).

Step 1030 may comprise fetching command(s) from the submission queue 112 selected at step 1020. Step 1030 may comprise continuing to fetch commands from the selected submission queue 112 until interrupted by, inter alia, the arbitration manager 844. Step 1030 may comprise monitoring the fetched commands (by use of the command monitor 846), parsing the fetched commands, determining arbitration monitoring data 843 pertaining to the fetched commands, determining command statistics metadata 950 pertaining to the selected submission queue 112, and/or the like, as disclosed herein.

Step 1040 may comprise determining whether to interrupt command fetching from the selected submission queue 112. Step 1040 may comprise determining whether to designate another submission queue 112 as the currently-selected submission queue 841. Step 1040 may comprise determining whether to configure the arbitration logic 842 to perform a next arbitration and/or selection operation to replace the currently-selected submission queue 841 with a next submission queue 112. Step 1040 may comprise evaluating one or more arbitration criteria 849 (e.g., comparing the arbitration monitoring data 843 of step 1030 to one or more arbitration criteria 849). Step 1030 may further comprise accessing arbitration criteria 849 of the selected submission queue 112 (and/or the configuration, settings, and/or parameters thereof), from the arbitration metadata 845, as disclosed herein (e.g., arbitration metadata 845A-N of the IOV function 830A-N corresponding to the selected submission queue 112). Step 1040 may comprise evaluating one or more burst criteria, command threshold criteria, time-based criteria, data criteria, credit-based criteria, and/or the like, as disclosed herein. Step 1040 may comprise comparing a number of commands fetched from the selected submission queue 112 to one or more command thresholds, comparing a time for which commands have been fetched from the selected submission queue 112 to one or more time thresholds, comparing data transfer and/or bandwidth estimates pertaining to the fetched commands to one or more data transfer and/or bandwidth thresholds, and/or the like. Step 1040 may further comprise blocking interruption of command fetching (e.g., blocking interruption until a minimum number of commands have been fetched in accordance with a burst criterion). Blocking interruption may comprise preventing one or more other arbitration criteria 849 from triggering interruption of command fetching.

If the determination of step 1040 is to interrupt command fetching, the flow may continue back at step 1020, which may comprise arbitrating between the submission queues 112 to select a next submission queue 112, as disclosed herein; otherwise, the flow may continue at step 1030, where the command fetch logic 840 may continue fetching command(s) from the selected submission queue 112.

Figure 10B:
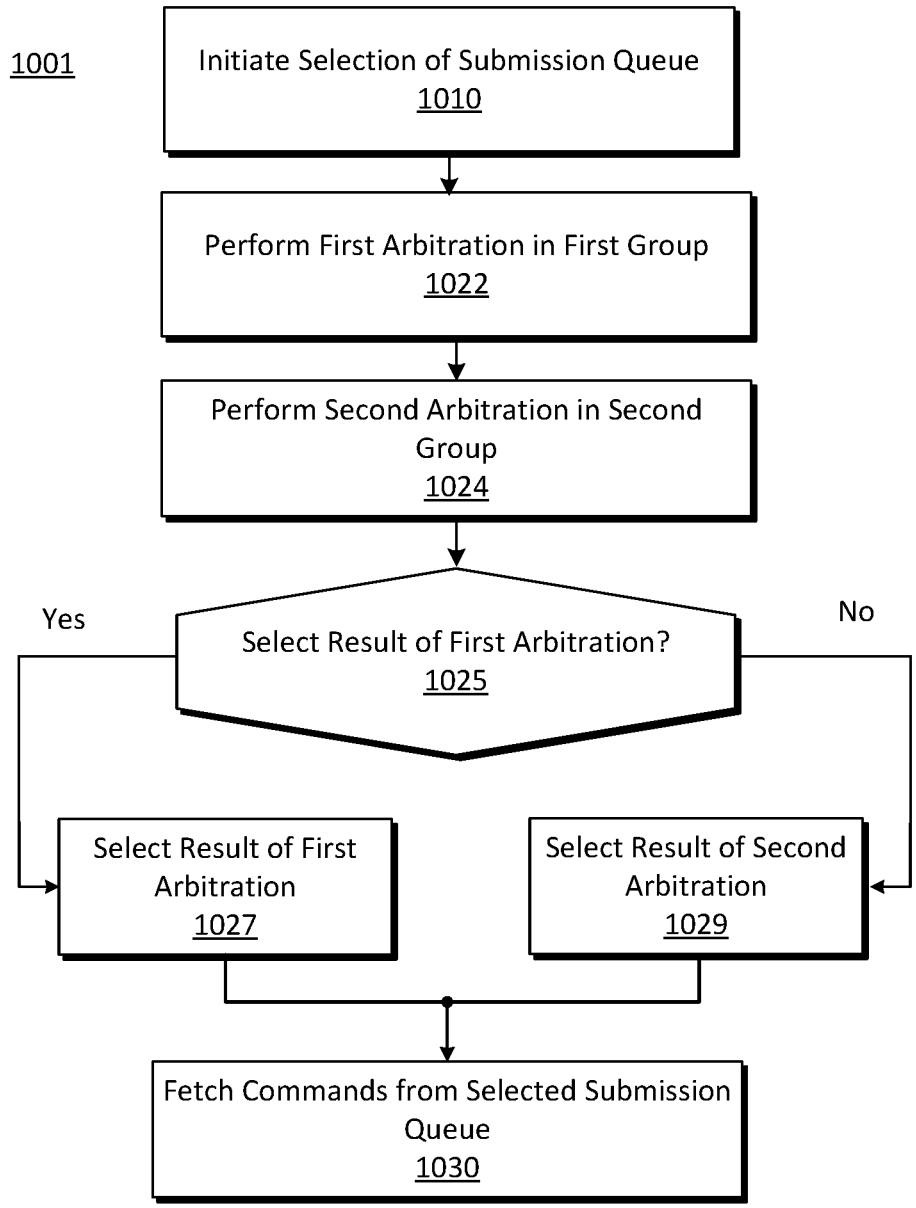
FIG. 10B is a flow diagram illustrating one embodiment of a method for arbitrating between groups of submission queues of a plurality of IOV functions.

FIG. 10B is a flow diagram of one embodiment of a method 1001 for arbitrating between groups 115 of submission queues 112 in a virtualized computing environment. Step 1010 may comprise initiating selection of a submission queue 112 from a plurality of submission queues 112 of respective IOV functions 830 (e.g., selecting a submission queue per step 1020 of FIG. 10A). Step 1010 may be triggered by the arbitration manager 844 in response to, inter alia, fetching one or more commands from a currently-selected submission queue 841 (if any), as disclosed herein. Step 1010 may comprise configuring the arbitration logic 842 to implement an arbitration operation to select a next submission queue 112, as disclosed herein. Step 1010 may comprise configuring the arbitration logic 842 to generate a result 857 (a selected submission queue 112) and/or designating the result 857 as the currently-selected submission queue 841 of the command fetch logic 840. The arbitration operation may comprise one or more arbitration(s) within respective group(s) 115 of submission queues 112, each group 115 comprising submission queues 112 of each of the plurality of IOV functions 830A-N.

Step 1022 may comprise performing a first arbitration within a first group of submission queues 112. The first group may comprise submission queues 112 of each of the plurality of IOV functions 830A-N (e.g., each function implemented and/or supported by the nonvolatile storage device 106). Each submission queue 112 of the first group may comprise and/or be assigned a same first priority. The first priority may comprise one of an admin priority and urgent priority. The first group may comprise one or more of an admin group 115A and an urgent group 115B, as disclosed herein. The first arbitration may comprise a flat arbitration in which each submission queue 112 of each IOV function 830A-N is given substantially the same weight and/or priority (e.g., a round robin arbitration between the first group 115 of submission queues 112, as disclosed above in conjunction with FIG. 8D). The result of the first arbitration of step 1022 may comprise a submission queue 112 selected from the first group 115.

Step 1024 may comprise performing a second arbitration within a second group 115 of submission queues 112. The second arbitration may comprise selecting a submission queue 112 from the second group 115. The second group 115 may comprise submission queues 112 corresponding to each of the plurality of IOV functions 830A-N, as disclosed herein. Each submission queue 112 of the second group 115 may comprise and/or be assigned a respective priority lower than the first priority (e.g., one of an urgent priority, high priority, medium priority, low priority, and/or the like). The second group 115 may comprise one or more of the urgent group 115B, high priority group 115C, medium priority group 115D, and/or low priority group 115E, as disclosed herein. The second arbitration may comprise arbitrating between a plurality of groups of submission queues 112 (e.g., arbitrating between groups 115D-E, as disclosed above in conjunction with FIG. 8D).

In some embodiments, the first and/or second arbitration(s) of steps 1022 and/or 1024 may further comprise arbitrating between respective groups 115 of submission queues 112 in accordance with command statistics pertaining to commands previously fetched from the respective submission queues 112 (and/or current resource availability), as disclosed herein. Steps 1022 and/or 1024 may comprise determining execution probabilities of the respective submission queues 112, skipping submission queues 112 having execution probabilities that fail to satisfy a minimum threshold, weighting and/or prioritizing submission queues 112 based on execution probability, and/or the like, as disclosed herein.

Step 1025 may comprise determining whether to select the result of the first arbitration of step 1022 as the result 857 of the arbitration operation of method 1001. Step 1025 may comprise determining whether any of the submission queues 112 of the first group 115 are non-empty (e.g., comprise one or more commands). Alternatively, or in addition, step 1025 may comprise determining whether each submission queue 112 of the first group 115 is empty (e.g., does not comprise any queued commands). If any of the submission queues 112 of the first group 115 comprise one or more commands (and/or not all of the submission queues 112 of the first group 115 are empty), the flow may continue at step 1027; otherwise, the flow may continue at step 1029. Step 1027 may comprise designating the submission queue 112 selected in the first arbitration of step 1022 (from the first group 115) as the result 857 of the arbitration operation (e.g., the currently-selected submission queue 841). Step 1029 may comprise designating the submission queue 112 selected in the second arbitration of step 1024 (from the second group 115) as the result 857 of the arbitration operation (e.g., the currently-selected submission queue 841). Step 1025 may, therefore, comprise selecting submission queue(s) 112 from the first group 115 while any of the submission queues 112 of the first group 115 are and/or remain non-empty, and selecting submission queue(s) 112 from the second group 115 while the submission queues 112 of the first group 115 are and/or remain empty.

Step 1030 may comprise fetching commands from the submission queue 112 selected at step 1027 or 1029. Step 1030 may comprise continuing to fetch commands until interrupted by, inter alia, the arbitration manager 844, as disclosed herein. Step 1030 may further comprise monitoring the fetched commands, parsing the fetched commands, determining arbitration monitoring data 843 pertaining to command(s) fetched from the currently-selected submission queue 841, determining and/or maintaining command statistics metadata 950, and so on, as disclosed herein. Step 1030 may comprise evaluating one or more arbitration criteria 849 pertaining to the currently-selected submission queue 841 to determine, inter alia, whether to interrupt command fetching (e.g., trigger selection of a next submission queue 112). Step 1030 may comprise evaluating interruption criteria, which may comprise determining to interrupt command fetching from submission queue(s) 112 of the second group 115 in response to determining that one or more of the submission queues 112 of the first group 115 are non-empty.

Figure 10C:
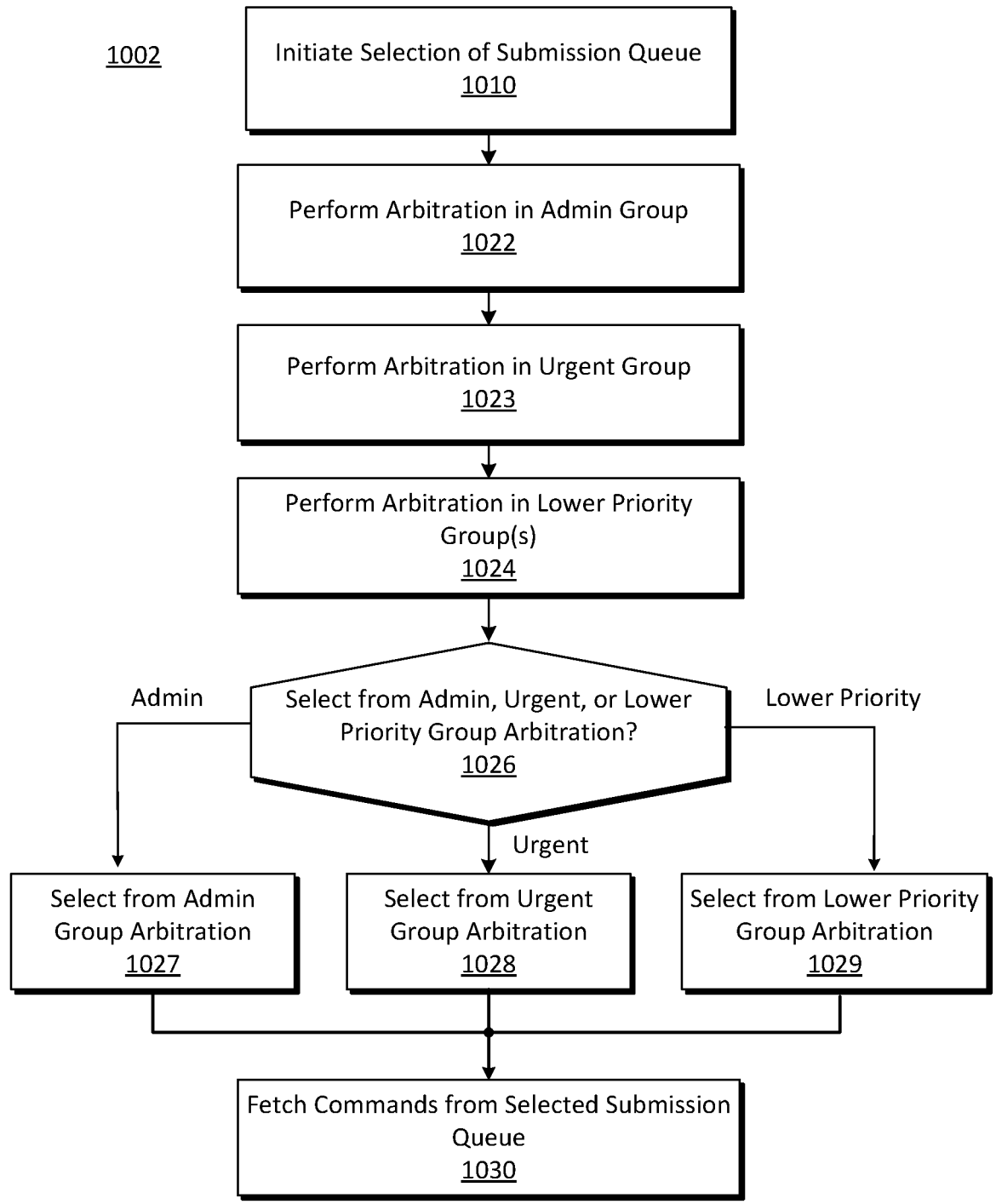
FIG. 10C is a flow diagram depicting another embodiment of a method for arbitrating between groups of submission queues of a plurality of IOV functions.

FIG. 10C is a flow diagram of another embodiment of a method 1002 for arbitrating between groups of submission queues 112 in a virtualized computing environment. Step 1010 may comprise initiating selection of a submission queue 112 from a plurality of submission queues 112 of respective IOV functions 830 (e.g., selecting a submission queue per step 1020 of FIG. 10A), as disclosed herein.

Step 1022 may comprise arbitrating between the submission queues 112 of an admin group 115A of submission queues 112. The admin group 115A may comprise admin priority submission queues 112 of each IOV function 830A-N (e.g., admin queues 832A of each IOV function 830A-N). Each submission queue 112 of the admin group 115A may be assigned a same admin priority classification (e.g., may be configured to receive and/or queue admin commands of a respective IOV function 830A-N). Step 1022 may comprise selecting a submission queue 112 from the admin group 115A. Step 1022 may comprise performing a flat arbitration in which each submission queue 112 of the admin group 115A is given substantially the same weight and/or priority (e.g., may comprise performing a round robin arbitration between admin priority submission queues 112 of each IOV function 830A-N by use of, inter alia, a group arbiter 852A, as disclosed herein). Alternatively, or in addition, step 1022 may comprise arbitrating between the submission queues 112 of the admin group 115A in accordance with command statistics and/or current resource availability, as disclosed herein, which may comprise determining execution probabilities for respective submission queues 112 of the admin group 115B and/or arbitrating between the respective submission queues 112 based on the determined execution probabilities (e.g., by use of an adaptive group arbiter 952A, as disclosed herein).

Step 1023 may comprise arbitrating between submission queues 112 of an urgent group 115B of submission queues 112. The urgent group 115B may comprise urgent priority submission queues 112 of each IOV function 830A-N (e.g., urgent queues 832B of each IOV function 830A-N). Each submission queue 112 of the urgent group 115B may be assigned a same urgent priority classification (e.g., may be configured to receive and/or queue urgent commands of a respective IOV function 830A-N). Step 1023 may comprise selecting a submission queue 112 from the urgent group 115B. Step 1023 may comprise performing a flat arbitration in which each submission queue 112 of the urgent group 115B is given substantially the same weight and/or priority (e.g., may comprise performing a round robin arbitration between the urgent priority submission queues 112 of each IOV function 830A-N by use of, inter alia, a group arbiter 852B, as disclosed herein). Alternatively, or in addition, step 1023 may comprise arbitrating between the submission queues 112 of the urgent group 115B in accordance with command statistics and/or current resource availability, as disclosed herein, which may comprise determining execution probabilities for respective submission queues 112 of the urgent group 115B and/or arbitrating between the respective submission queues 112 based on the determined execution probabilities (e.g., by use of an adaptive group arbiter 952B, as disclosed herein).

Step 1024 may comprise arbitrating between submission queues 112 of one or more lower priority groups 115 of submission queues. Step 1024 may comprise arbitrating between submission queues 112 included in one or more high, medium, and/or low priority groups 115C-D, which may comprise high, medium, and/or low priority submission queues 112 of each IOV function 830A-N, respectively (e.g., submission queues 832C-E of each IOV function 830A-N). Step 1024 may comprise arbitrating between respective groups 115C-E of submission queues 112 in accordance with a round robin arbitration scheme (e.g., by use of respective group arbiters 852C-E, as disclosed above in conjunction with FIG. 8D). Step 1024 may further comprise implementing a weighted arbitration between the results selected from each of the respective groups 115C-E (e.g., by use of a weighted arbiter 854). Alternatively, or in addition, step 1024 may comprise arbitrating between the submission queues 112 of groups 115C-D in accordance with command statistics and/or current resource availability, as disclosed herein, which may comprise determining execution probabilities for respective submission queues 112 of groups 115C-E and/or arbitrating between the respective submission queues 112 based on the determined execution probabilities (e.g., by use of adaptive group arbiters 952C-D and/or or an adaptive weighted arbiter 954, as disclosed herein).

In some embodiments, steps 1022, 1023, and 1024 may be performed in parallel by respective group arbiters 852A-E and/or weighted arbiter 854 (and/or respective adaptive group arbiters 952A-E and/or adaptive weighted arbiter 954), as disclosed above in conjunction with FIGS. 8D and 9C.

Step 1026 may comprise determining to select the result of the arbitration operation (result 857) from a result of one of: the submission queue 112 selected from the admin group 115A in step 1022; the submission queue 112 selected from the urgent group 115B in step 1023; and the submission queue 112 selected from the lower priority group(s) 115C-D in step 1024. Step 1026 may comprise: selecting submission queue(s) 112 from the admin group 115A while any of the submission queues 112 of the admin group 115A are non-empty; selecting submission queue(s) 112 from the urgent group 115B while the submission queues 112 of the admin group 115A are empty and one or more of the submission queues 112 of the urgent group 115B are non-empty; and selecting submission queue(s) 112 from the lower priority groups 115C-E while the submission queues 112 of the admin group 115A and the urgent group 115B are empty. Step 1026 may comprise implementing a prioritized arbitration, as disclosed herein (e.g., by use of a prioritized arbiter 856), which may comprise assigning a highest priority to the result of the admin group arbitration of step 1022, a next highest priority to the result of the urgent group arbitration of step 1023, and a lowest priority to the result of the lower priority arbitration of step 1024, and arbitrating between the respective results in accordance with a strict priority scheme.

Alternatively, or in addition, step 1026 may be modified in accordance with one or more dynamic factors, such as command statistics pertaining to commands previously fetched from the respective submission queues 112, current resource availability, and/or the like. Step 1026 may comprise selecting submission queue(s) 112 from the admin group 115A while submission queue(s) 112 of the admin group 115A are non-empty (and/or have execution probabilities that satisfy a first minimum threshold); fetching command(s) from submission queue(s) 112 selected from the urgent group 115B while the submission queues 112 of the admin group 115A are empty (and/or have execution probabilities below the first minimum threshold) and submission queues 112 of the urgent group 115B are non-empty (and/or have execution probabilities that satisfy a second minimum threshold, which may be higher than the first minimum threshold); and/or fetching command(s) from submission queue(s) 112 selected from lower priority groups 115C-E while the submission queues 112 of the admin group 115A and the urgent group 115B are empty (and/or have execution probabilities lower than the first and/or second minimum thresholds, respectively).

In response to step 1026 determining to select the result of the admin group arbitration of step 1022, the flow may continue at step 1027; in response to determining to select the result of the urgent group arbitration of step 1023, the flow may continue at step 1028; and in response to determining to select the result of the lower priority group arbitration of step 1024, the flow may continue at step 1029. Step 1027 may comprise designating the submission queue 112 selected from the admin group 115A (at step 1022) as the currently-selected submission queue 841; step 1028 may comprise designating the submission queue 112 selected from the urgent group 115E3 (at step 1023) as the currently-selected submission queue 841; and step 1029 may comprise designating the submission queue 112 selected from the lower priority group(s) 115C-E (at step 1024) as the currently-selected submission queue 841.

Step 1030 may comprise fetching commands from the submission queue 112 selected at step 1027, 1028, or 1029. Step 1030 may comprise continuing to fetch commands until interrupted by, inter alia, the arbitration manager 844, as disclosed herein. Step 1030 may further comprise monitoring the fetched commands, parsing the fetched commands, determining arbitration monitoring data 843 pertaining to command(s) fetched from the currently-selected submission queue 841, determining and/or maintaining command statistics metadata 950, and so on, as disclosed herein. Step 1030 may comprise evaluating interruption criteria, which may comprise one or more of: determining to interrupt command fetching from submission queue(s) 112 selected from the urgent group 115E3 (in step 1023) in response to determining that one or more of the submission queues 112 of the admin group 115A are non-empty (and/or have execution probabilities that satisfy the first minimum threshold); determining to interrupt command fetching from submission queue(s) 112 selected from the lower priority group(s) 115C-E (in step 1024) in response to determining that one or more of the submission queues 112 of the admin group 115A and/or urgent group are non-empty (and/or have execution probabilities that satisfy the first and/or second minimum threshold, respectively); and/or the like.

Figure 10D:
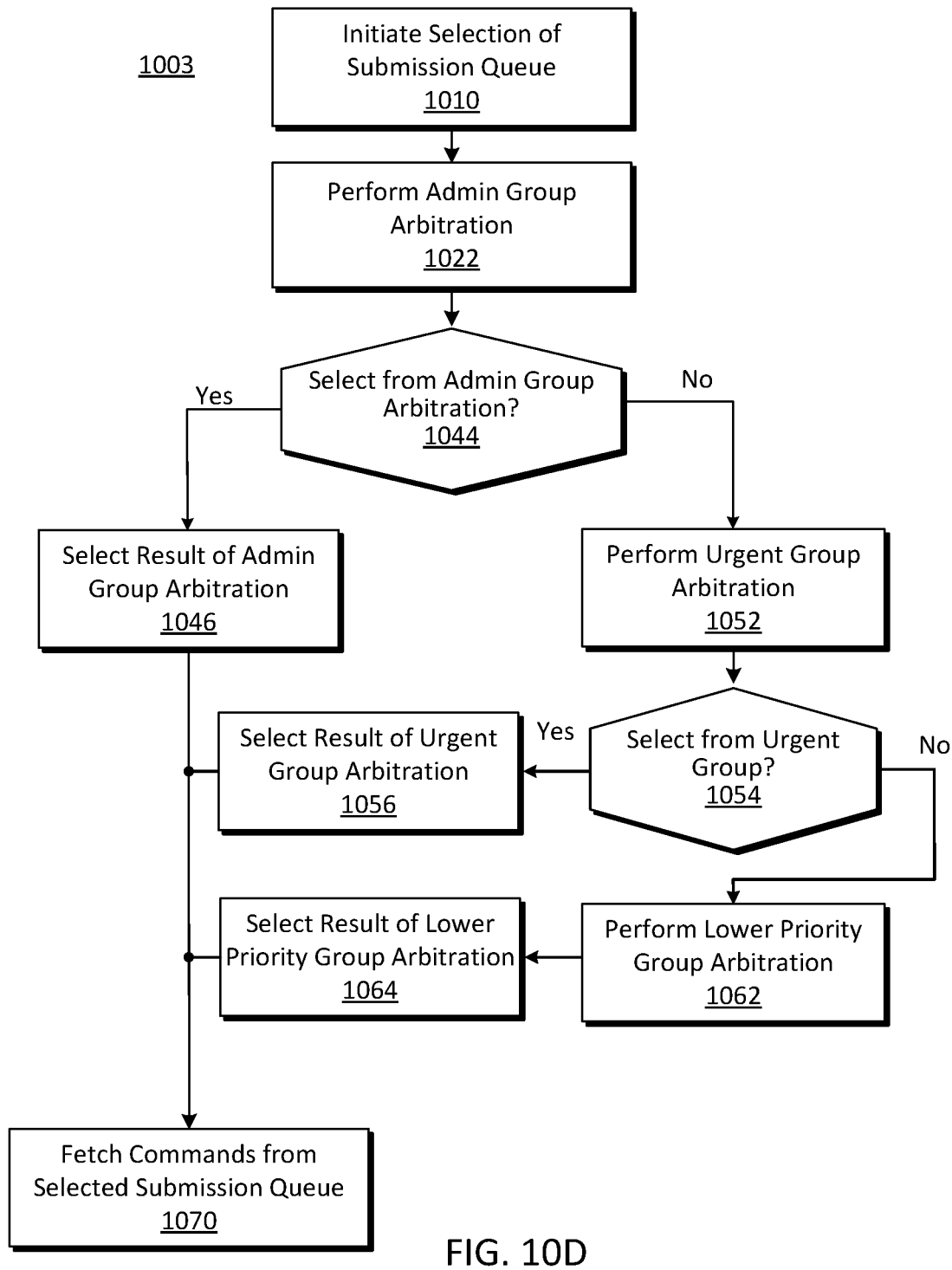
FIG. 10D is a flow diagram illustrating one embodiment of another method for command arbitration in a virtual computing environment.

FIG. 10D is a flow diagram of another embodiment of a method 1003 for arbitrating between groups 115 of submission queues 112 in a virtual computing environment. Step 1010 may comprise initiating selection of a submission queue 112 from a plurality of submission queues 112 of respective IOV functions 830A-N, as disclosed herein.

Step 1042 may comprise implementing a first arbitration in an admin group 115A of the submission queues 112, as disclosed herein (e.g., in accordance with a round robin arbitration scheme, and/or in accordance with execution probabilities determined for the respective submission queues 112 of the admin group 115A). Step 1042 may be implemented by one or more of a group arbiter 852A and/or an adaptive group arbiter 952A, as disclosed herein.

Step 1044 may comprise determining whether to select the result of the arbitration within the admin group 115A of step 1042 as the currently-selected submission queue 841 (e.g., as the result 857 of the arbitration operation). Step 1044 may comprise determining whether the submission queues 112 of the admin group 115A are empty (and/or have an execution probability below the first minimum threshold), as disclosed herein. If so, flow may continue to step 1054; otherwise, the flow may continue at step 1046, which may comprise setting the result of the admin group arbitration of step 1042 as the currently-selected submission queue 841 of the command fetch logic 840, as disclosed herein.

Step 1052 may comprise implementing a second arbitration in an urgent group 115B of the submission queues 112, the urgent group 115B comprising urgent priority submission queues 112 of each of the plurality of IOV functions 830A-N. Step 1052 may comprise arbitrating between the submission queues 112 of the urgent group 115B, as disclosed herein (e.g., in accordance with a round robin arbitration scheme, and/or in accordance with execution probabilities determined for the respective submission queues 112 of the urgent group 115B). Step 1052 may be implemented by one or more of a group arbiter 852B and/or an adaptive group arbiter 952B, as disclosed herein.

Step 1054 may comprise determining whether to select the result of the urgent group arbitration of step 1052 as the currently-selected submission queue 841 (e.g., as the result 857 of the arbitration operation performed by the arbitration logic 842). Step 1054 may comprise determining whether the submission queues 112 of the urgent group 115B are empty (and/or have an execution probability below the second minimum threshold). If so, flow may continue to step 1062; otherwise, the flow may continue at step 1056, which may comprise setting the result of the urgent group arbitration of step 1052 as the currently-selected submission queue 841 of the command fetch logic 840, as disclosed herein.

Step 1062 may comprise arbitrating between submission queues 112 of one or more group(s) 115 of lower priority submission queues 112 of each of the IOV functions 830A-N, as disclosed herein (e.g., arbitrating between submission queues 112 of groups 115C-E). Step 1062 may comprise arbitrating between the submission queues 112 of respective groups 115C-E in a round robin scheme and/or arbitrating results selected from the respective groups 115C-E in accordance with a weighted arbitration scheme (e.g., by use of group arbiters 852C-E and a weighted arbiter 854). Alternatively, or in addition, step 1062 may comprise arbitrating between the submission queues 112 of the lower priority groups 115C-E in accordance with execution probabilities determined for the respective submission queues 112 (e.g., by use of adaptive groups arbiters 852C-E and/or adaptive weighted arbiters 954, as disclosed herein).

Step 1066 may comprise selecting a result of the arbitration of step 1062 as the currently-selected submission queue 841 (e.g., as the result 857 of the arbitration operation performed by the arbitration logic 842).

Step 1070 may comprise fetching command(s) from the selected submission queue 112, as disclosed herein (e.g., fetching command(s) until interrupted by, inter alia, the arbitration manager 844). Step 1070 may comprise monitoring command(s) fetched from the selected submission queue 112 (by use of the command monitor 846), determining arbitration monitoring data 843 pertaining to the fetched commands, evaluating one or more arbitration criteria 849, and so on. Step 1070 may comprise interrupting fetching of commands from a lower priority submission queue 112 in response to determining that commands are queued within one or more higher priority submission queues 112 (e.g., in accordance with interrupt criteria of the arbitration criteria 849), as disclosed herein. Accordingly, steps 1040-1070 may comprise: fetching command(s) from submission queue(s) 112 selected from the admin group 115A while submission queue(s) 112 of the admin group 115A are non-empty (and/or have execution probabilities that satisfy the first minimum threshold); fetching command(s) from submission queue(s) 112 selected from the urgent group 115B while the submission queues 112 of the admin group 115A are empty (and/or have execution probabilities below the first minimum threshold) and submission queues 112 of the urgent group 115B are non-empty (and/or have execution probabilities that satisfy the second minimum threshold); and/or fetching command(s) from submission queue(s) 112 selected from lower priority groups 115C-E while the submission queues 112 of the admin group 115A and the urgent group 115B are empty (and/or have execution probabilities lower than the first and/or second minimum thresholds, respectively).

Figure 11A:
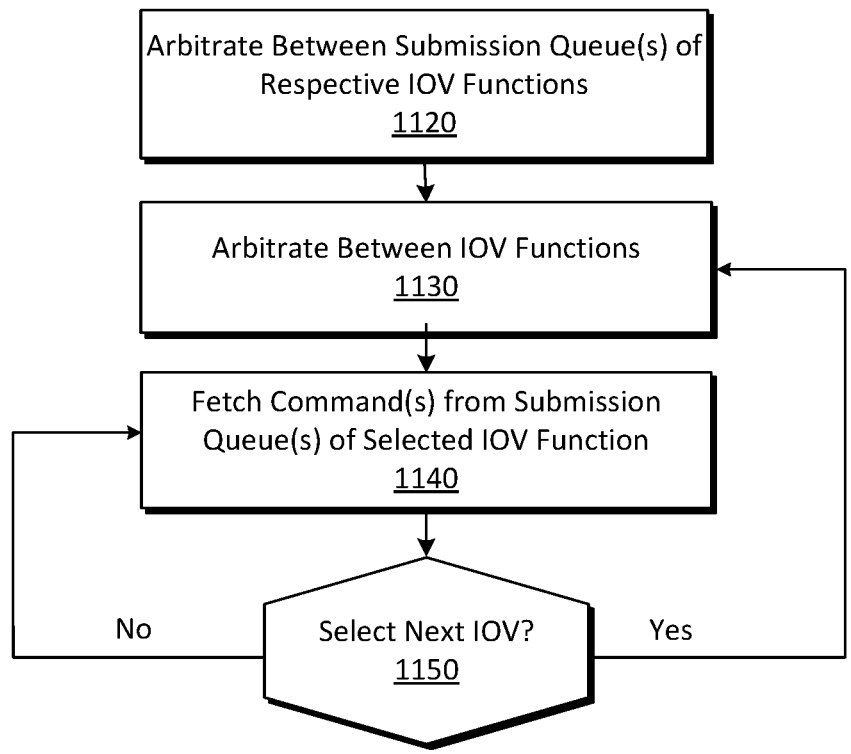
FIG. 11A is a flow diagram depicting another embodiment of a method for command arbitration in a virtual computing environment.

FIG. 11A is a flow diagram of another embodiment of a method 1100 for command arbitration in a virtual computing environment. Step 1120 may comprise arbitrating between submission queues 112 of respective IOV functions 830 of a plurality of IOV functions 830A-N. Each IOV function 830A-N may comprise and/or correspond to a plurality of submission queues 112 maintained within a host platform 800 (e.g., maintained within host memory resources 804). Step 1120 may comprise performing a plurality of queue-level arbitration operations substantially in parallel, each queue-level arbitration to select a submission queue 112 of each of the plurality of IOV functions 830A-N (e.g., each queue-level arbitration to select a submission queue 112 from a respective set 812A-N of submission queues 112, each set 812A-N comprising the submission queues 112 of a respective IOV function 830A-N). Step 1120 may, therefore, comprise performing a plurality of queue-level arbitrations within respective subsets of the submission queues 112 pertaining to the nonvolatile storage device 106. Step 1120 may comprise determining a plurality of results 875, each result 875A-N comprising a submission queue 112 selected from the set 812A-N of submission queues 112 of a respective IOV function 830A-N. Step 1120 may comprise performing the queue-level arbitrations substantially in parallel (e.g., by use of a plurality of queue-level arbiters 872A-N, each queue-level arbiter 872A-N configured to arbitrate between the set 812A-N of submission queues 112 of a respective IOV function 830A-N substantially concurrently). Step 1120 may further comprise arbitrating between the respective sets 812A-N of submission queues 112 in accordance with selected arbitration schemes 874A-N (e.g., each queue-level arbiter 872 may arbitrate between a respective set 812 of submission queues 112 in accordance with a selected arbitration scheme 874). The arbitration schemes 874A-N may be selected in accordance with arbitration metadata 845A-N of the respective IOV functions 830A-N (and/or configuration(s) and/or arrangement(s) of the sets 812A-N of submission queues 112 of the respective IOV functions 830A-N). Step 1120 may comprise arbitrating between submission queues 112 of a first IOV function 830A in accordance with a first arbitration scheme, and arbitrating between submission queues 112 of a second IOV function 830B in accordance with a second, different arbitration scheme. Step 1120 may further comprise maintaining arbitration state metadata 873 pertaining to each queue-level arbitration, as disclosed herein (e.g., maintaining queue-level arbitration metadata 873A-N for the queue-level arbitration 874A-N pertaining to the set 812A-N of submission queues 112 of each IOV function 830A-N).

In some embodiments, step 1120 may comprise arbitrating between the respective sets 812A-N of submission queues 112 in accordance with execution probabilities of the respective submission queues 112, as disclosed herein (e.g., by use of a plurality of adaptive queue-level arbiters 972A-N).

Step 1130 may comprise arbitrating between IOV functions 830A-N. Step 1130 may comprise selecting one of the plurality of IOV functions 830A-N. Step 1130 may comprise a weighted and/or prioritized arbitration. Step 1130 may comprise weighting and/or prioritizing the IOV functions 830A-N in accordance with weights and/or priorities assigned thereto (e.g., as defined in, inter alia, arbitration metadata 845A-N of the respective IOV functions 830A-N). Step 1130 may be implemented by an IOV-level arbiter 878, as disclosed herein. Step 1130 may comprise arbitrating between result(s) 875 produced by respective queue-level arbiters 872. Step 1130 may comprise selecting result(s) 875A-N one of the queue-level arbiters 872A-N, such that the selected queue-level arbiter 872A-N determines the currently-selected submission queue 841 of the command fetch logic 840 (e.g., select(s) submission queues 112 from the set 812A-N of submission queues 112 of the selected IOV function 830A-N). Since the submission queues 112 of each IOV function 830 are arbitrated substantially concurrently (e.g., by use of respective queue-level arbiters 872), step 1130 may comprise immediately switching between IOV functions 830 without, inter alia, performing an intervening queue-level arbitration during such switching.

In some embodiments, step 1130 may comprise arbitrating between IOV functions 830A-N in accordance with execution probabilities of the respective IOV functions 830A-N (and/or execution probabilities of the submission queues 112 selected from the respective sets 812A-N of submission queues 112 of the respective IOV functions 830A-N), as disclosed herein (e.g., by use of an adaptive IOV-level arbiter 978).

Step 1140 may comprise fetching command(s) from submission queue(s) 112 of the IOV function 830 selected in the arbitration of step 1130. Step 1140 may comprise fetching commands from submission queues 112 selected from the set 812 of submission queues 112 of the selected IOV function 830A-N. Step 1140 may comprise fetching command(s) from submission queues 112 selected by the queue-level arbiter 872 of the selected IOV function 830 (e.g., the queue-level arbiter 872A-N configured to arbitrate between the set 812A-N of submission queues 112 of the selected IOV function 830A-N).

Step 1140 may further comprise monitoring the fetched commands, determining arbitration monitoring data 843 pertaining to commands fetched from respective submission queues 112 of the selected IOV function 830, and so on, as disclosed herein. Step 1140 may comprise triggering one or more queue-level arbitration operations to arbitrate between submission queues 112 of the selected IOV function 830 (e.g., trigger arbitration operations of the queue-level arbiter 872A-N corresponding to the selected IOV function 830A-

N). The queue-level arbitration operations may comprise arbitrating between the submission queues 112 of the selected IOV function 830, and may not involve arbitrating between the IOV functions 830A-N and/or arbitrating between submission queues 112 of IOV functions 830A-N other than the selected IOV function 830.

Step 1150 may comprise determining whether to select a next IOV function 830 (e.g., whether to perform an IOV-level arbitration operation). Step 1150 may comprise comparing arbitration monitoring data 843 pertaining to commands fetched from submission queue(s) 112 of the IOV function 830 selected at step 1130 to one or more arbitration criteria 849, as disclosed herein. The arbitration criteria 849 may define, inter alia, the number of commands to fetch from respective IOV functions 830A-N, the amount of time to fetch commands from respective IOV functions 830A-N, estimated data transfer and/or bandwidth thresholds for respective IOV functions 830A-N, and/or the like. If the determination of step 1150 is to select a next IOV function 830 (e.g., initiate an IOV-level arbitration operation), the flow may continue at step 1130, which may comprise arbitrating between the IOV functions 830A-N, as disclosed herein; otherwise, the flow may continue at step 1140, which may comprise continuing to fetch commands from submission queue(s) 112 of the selected IOV function 830 (e.g., submission queue(s) 112 selected by the queue-level arbiter 872 of the selected IOV function 830).

Figure 11B:
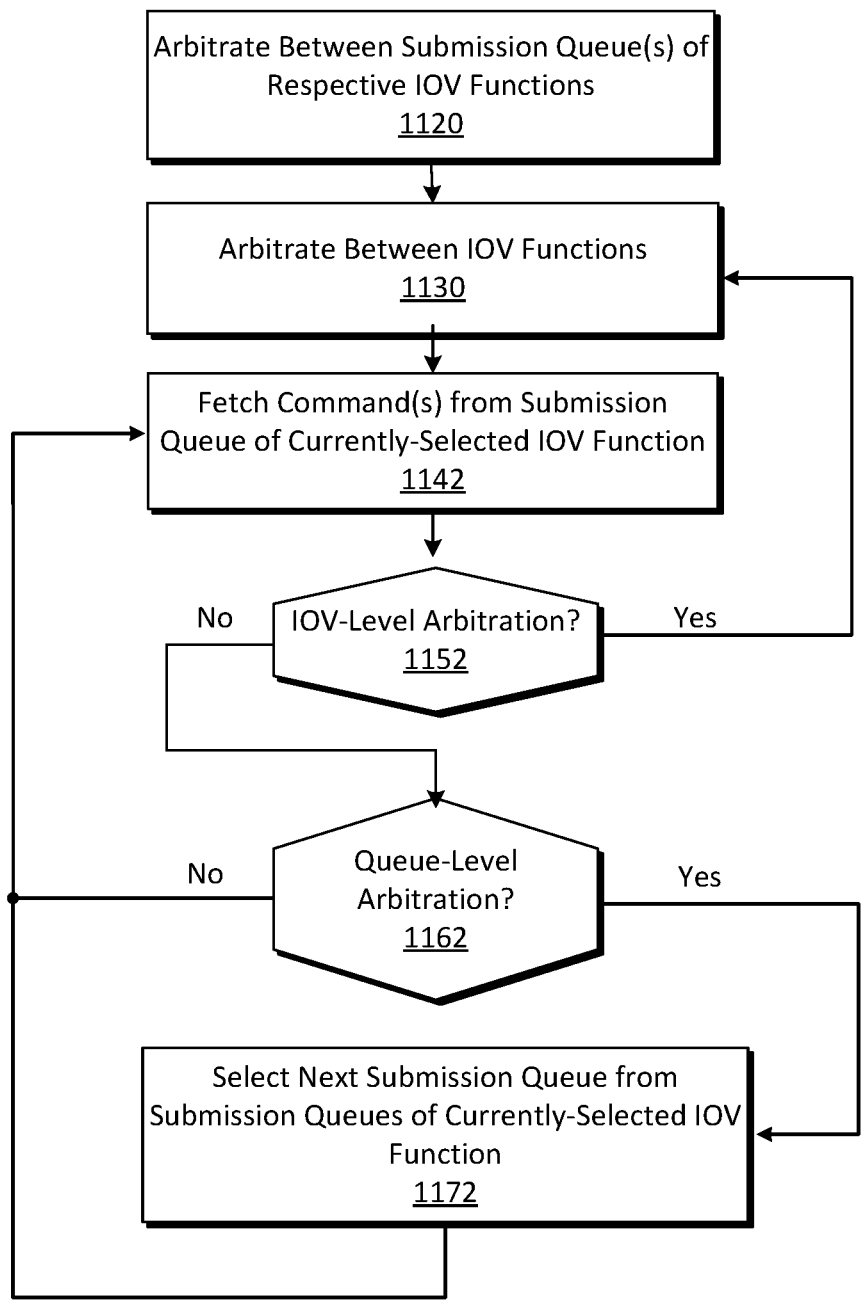
FIG. 11B is a flow diagram illustrating another embodiment of a method for command arbitration in a virtual computing environment.

FIG. 11B is a flow diagram of another embodiment of a method 1101 for command arbitration in a virtual computing environment. Step 1120 may comprise arbitrating between submission queues 112 of respective IOV functions 830 of a plurality of IOV functions 830A-N substantially concurrently and/or in parallel, as disclosed herein (e.g., arbitrating between respective sets 812 of submission queues 112 by use of respective queue-level arbiters 872). Step 1120 may comprise implementing a plurality of queue-level arbitration operations within respective subsets of the submission queues 112, each subset comprising submission queues 112 of a respective one of the IOV functions 830A-N.

Step 1130 may comprise arbitrating between IOV functions 830A-N. Step 1130 may comprise selecting one of the plurality of IOV functions 830A-N in accordance with an arbitration scheme (e.g., a weighted arbitration, as disclosed herein). Step 1130 may be implemented by an IOV-level arbiter 878, as disclosed herein. Step 1130 may comprise designating result(s) 875A-N of one of the queue-level arbiters 872A-N of the selected IOV function 830 as the currently-selected submission queue 841 of the command fetch logic 840.

Step 1142 may comprise fetching command(s) from the submission queue 112 selected by the queue-level arbiter 872 of the currently-selected IOV function 830 (the IOV function 830 selected at step 1130). Step 1142 may comprise monitoring the fetched commands, determining arbitration monitoring data 843, and so on, as disclosed herein. Step 1142 may comprise determining arbitration monitoring data 843 pertaining to the particular submission queue 112 currently-selected by the queue-level arbiter 872 (e.g., queue-level arbitration metadata) and/or commands fetched from other submission queue(s) 112 of the currently-selected IOV function 830 (e.g., IOV-level arbitration metadata), as disclosed herein.

Step 1152 may comprise determining whether to implement an IOV-level arbitration. Step 1152 may comprise comparing IOV-level arbitration metadata pertaining to commands fetched from submission queues 112 of the currently-selected IOV function 830 to one or more arbitration criteria 849 (e.g., IOV-level arbitration criteria, such as burst criteria, command threshold criteria, time-based criteria, data criteria, credit-based criteria, and/or the like). If the determination of step 1152 is to perform an IOV-level arbitration (e.g., select a next IOV function 830), the flow may continue at step 1130; otherwise, the flow may continue at step 1162.

Step 1162 may comprise determining whether to implement a queue-level arbitration. Step 1162 may comprise comparing one or more arbitration criteria 849 (e.g., queue-level arbitration criteria) to queue-level arbitration metadata pertaining to commands fetched from the currently-selected submission queue 841 (the winner selected by the queue-level arbiter 872 of the currently-selected IOV function 830), as disclosed herein. If the determination of step 1162 is to perform a queue-level arbitration operation, the flow may continue at step 1172; otherwise the flow may continue at step 1142, which may comprise continuing to fetch commands from the currently-selected submission queue 841.

Step 1172 may comprise selecting a next submission queue 112 from submission queues 112 of the currently-selected IOV function 830 (e.g., from the set 812 of submission queues 112 of the currently-selected IOV function 830). Step 1172 may be implemented by the queue-level arbiter 872 of the currently-selected IOV function 830, as disclosed herein (e.g., in the parallel queue-level arbitration(s) of step 1120).

Figure 12:
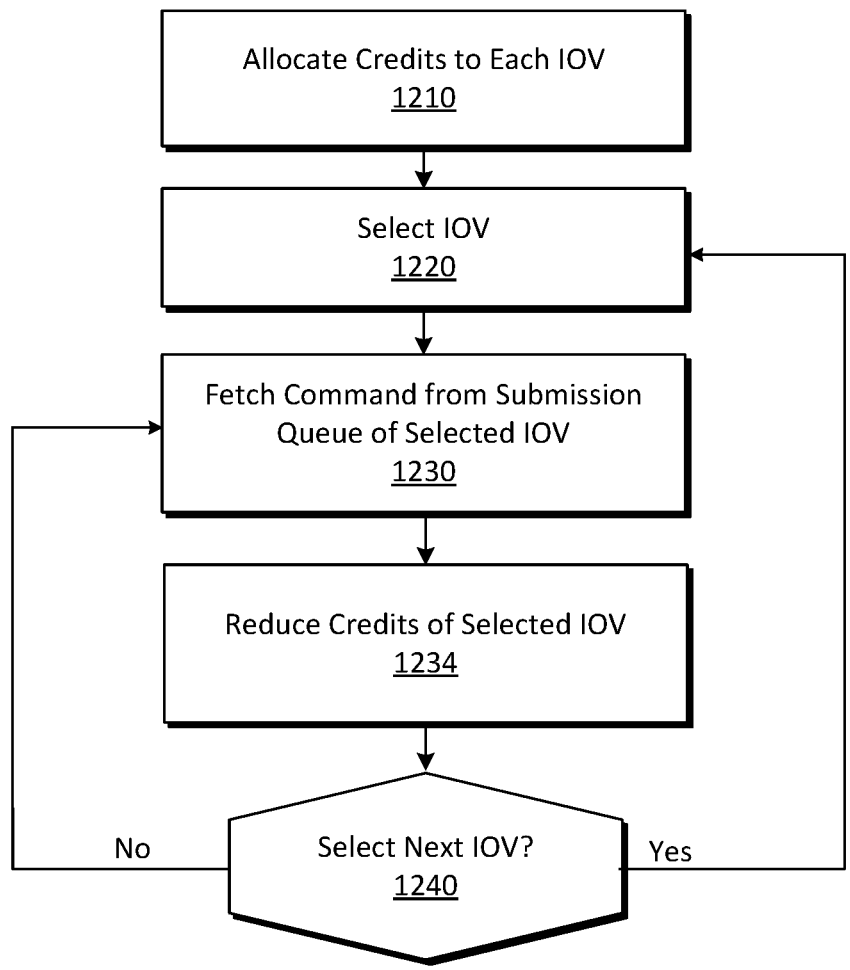
FIG. 12 is a flow diagram depicting one embodiment of a method for credit-based arbitration.

FIG. 12 is a flow diagram of another embodiment of a method 1200 for command arbitration in a virtual computing environment. Step 1210 may comprise allocating command fetching credits to each of a plurality of virtual functions of a nonvolatile storage device 106 (e.g., IOV functions 830A-N). The amount of credits allocated to each IOV function 830A-N may correspond to a priority and/or QoS assigned to the respective IOV functions 830A-N. The credits may be allocated by, inter alia, primary or physical virtual functions (e.g., primary IOV function 830A).

Step 1220 may comprise selecting one of the virtual functions of the nonvolatile storage device (e.g., IOV functions 830A-N). Step 1220 may comprise arbitrating between the IOV functions 830A-N according to a round robin arbitration scheme. Step 1220 may comprise skipping IOV functions 830A-N that have fewer than a threshold number of credits (e.g., fewer than 1 credits). In some embodiments, step 1220 comprises a weighted arbitration (e.g., a weighted round robin arbitration scheme) in which each IOV function 830A-N is weighted according to the amount of credits thereof. IOV functions 830A-N with more remaining credits than other IOV functions 830A-N may be prioritized accordingly. Step 1220 may comprise implementing a credit-based arbitration to select a winner IOV function 830 of the plurality of IOV functions 830A-N, as disclosed herein.

Step 1230 may comprise fetching commands from a submission queue 112 of the virtual function selected at step 1220 (e.g., the winner IOV function 830 of the credit-based arbitration). Step 1230 may comprise a queue-level arbitration to select a submission queue 112 from a plurality of submission queues of the IOV function 830. Step 1230 may comprise performing a weighted round robin arbitration scheme (and/or a weighted round robin with urgent priority class). Step 1230 may comprise selecting a winner submission queue 112, and fetching a command from the winner submission queue 112.

Step 1234 may comprise reducing the remaining credits of the selected virtual function by a determined amount (e.g., reducing the remaining credits of the selected IOV function 830), as disclosed herein.

Step 1240 may comprise determining whether to select a next virtual function (e.g., replace the currently-selected IOV function 830 with another IOV function 830). The determination of step 1240 may be based on one or more arbitration criteria 845, which may include, but are not limited to: interrupt criteria, burst criteria, command threshold criteria, time-based criteria, command count criteria, data criteria, credit-based criteria, and/or the like. Step 1240 may comprise determining to select a next IOV function 830 in response to consuming a threshold number of credits of the currently-selected IOV function 830, the remaining credits of the currently-selected function 830 falling below a threshold, and/or the like. If the determination of step 1240 is to select a next IOV function 830, the flow may continue at step 1220; otherwise, the flow may continue at step 1230, where the next command may be selected from a submission queue 112 of the currently-selected IOV function 830.

Figure 13:
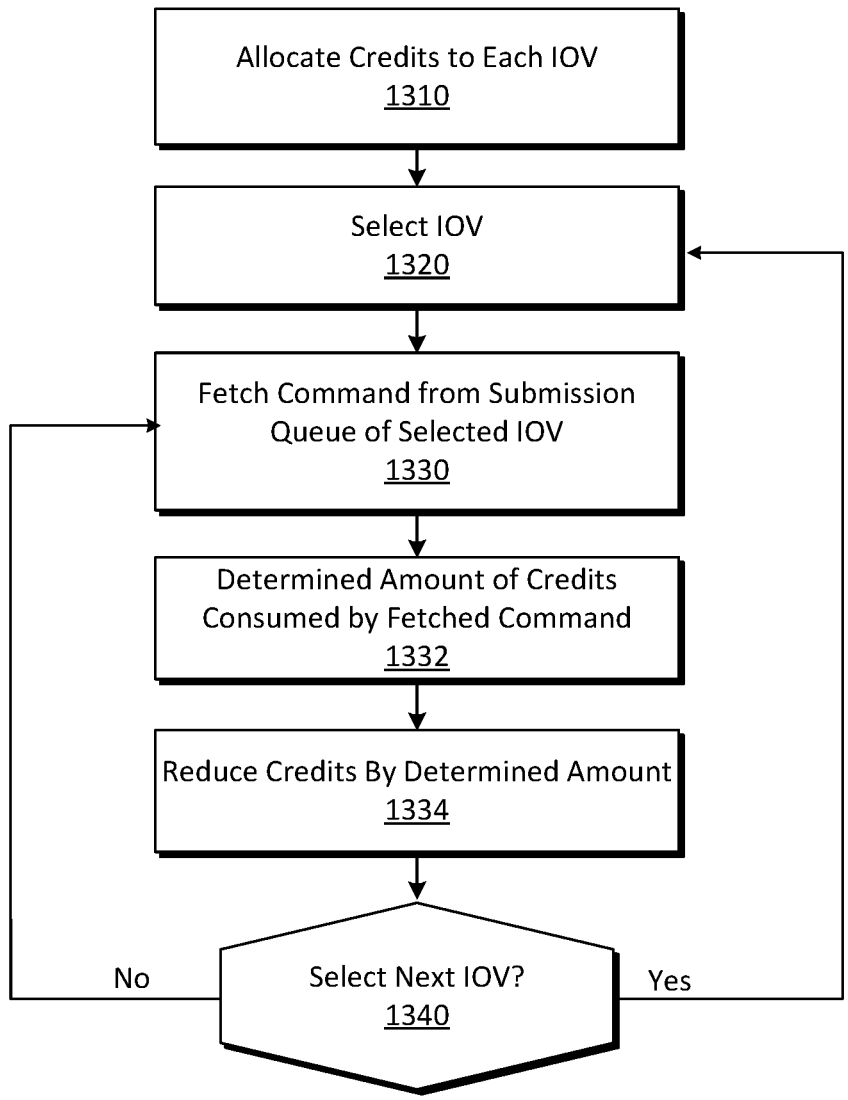
FIG. 13 is a flow diagram illustrating another embodiment of a method for credit-based arbitration.

FIG. 13 is a flow diagram of another embodiment of a method 1300 for command arbitration in a virtual computing environment. Step 1310 may comprise allocating command fetching credits to each of a plurality of IOV functions 830A-N, as disclosed herein.

Step 1320 may comprise selecting one of the IOV functions 830A-N. Step 1320 may comprise arbitrating between the IOV functions 830A-N according to one or more of a round robin arbitration scheme, a weighted round robin arbitration scheme, and/or the like. Step 1320 may comprise skipping IOV functions 830A-N that have fewer than a threshold number of credits remaining (e.g., fewer than 1 credits). Step 1320 may comprise weighting and/or prioritizing respective IOV functions 830A-N in accordance with the amount of remaining credits of the respective IOV functions 830A-N. Step 1320 may comprise implementing a credit-based arbitration to select a winner IOV function 830 of the plurality of IOV functions 830A-N, as disclosed herein.

Step 1330 may comprise fetching commands from a submission queue 112 of the IOV function 830 selected in step 1320. Step 1330 may comprise a queue-level arbitration between the submission queues 112 of the IOV function 830. Step 1330 may comprise performing a weighted round robin arbitration scheme (and/or a weighted round robin with urgent priority class). Step 1330 may comprise selecting a winner submission queue 112, designating the winner as the currently-selected submission queue 841 of the command fetch logic 840, and fetching a command therefrom.

Step 1332 may comprise determining an amount of credits consumed by the command fetched at step 1330. The amount of credits consumed by a command may be determined based on one or determined credit characteristics of the command, which may include, but are not limited to: an opcode of the command, the command type (e.g., read, write, admin), the command priority classification, estimated amount of data to be transferred to/from the nonvolatile storage device 106 during execution of the command, estimated amount of bandwidth to be consumed during execution of the command, command attributes (e.g., cache enabled, fused operation, metadata parameters, data set management, etc.), a namespace associated with the command, a stream identifier associated with the command, an address range of the command (e.g., a logical address range, physical address range, and/or the like), a host buffer method used by the command, a buffer location for data pertaining to the command, and/or the like. Step 1334 may comprise reducing the credits of the selected IOV function 830 by the amount determined at step 1332.

Step 1340 may comprise determining whether to select a next IOV function 830, as disclosed above. The determination of step 1340 may be based on one or more arbitration criteria 845, which may include, but are not limited to: burst criteria, command threshold criteria, time-based criteria, command count criteria, data criteria, interrupt criteria, credit-based criteria, and/or the like. Step 1330 may comprise determining to select a next IOV function 830 in response to consuming a threshold number of credits of the currently-selected IOV function 830, the remaining credits of the currently-selected function 830 falling below a threshold, and/or the like. If the determination of step 1340 is to select a next IOV function 830, the flow may continue at step 1320; otherwise, the flow may continue at step 1330, where the next command may be selected from a submission queue 112 of the currently-selected IOV function 830.

Figure 14:
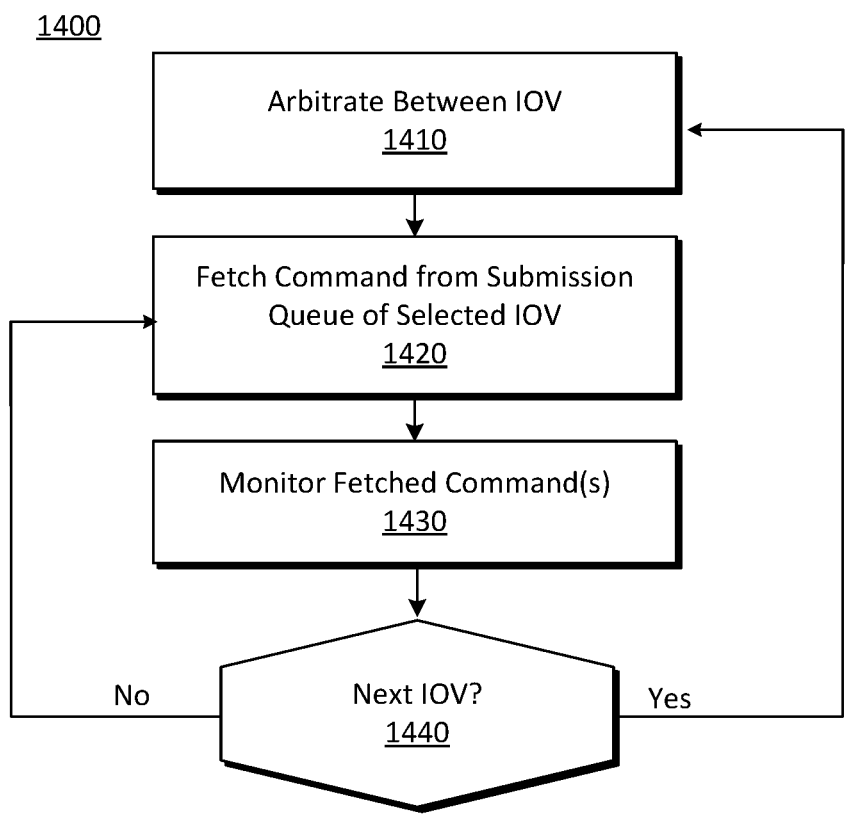
FIG. 14 is a flow diagram depicting one embodiment of a method for arbitrating between submission queues of a plurality of IOV functions.

FIG. 14 is a flow diagram of another embodiment of a method 1400 for arbitrating between host-based submission queues of a plurality of different virtual functions (IOV functions 830), as disclosed herein.

Step 1410 may comprise arbitrating between a plurality of IOV functions 830. Step 1410 may comprise implementing an arbitration scheme as illustrated above in conjunction with FIGS. 8D-F and/or 9B-E. Step 1410 may comprise selecting one of a plurality of IOV functions 830 by use of a weighted, prioritized, and/or credit-based arbitration scheme as illustrated in FIGS. 8E-F and/or 9D-E.

Step 1420 may comprise fetching a command from a host-based submission queue 112 of the IOV function 830 selected in the arbitration of step 1410. Step 1420 may comprise implementing a queue-level arbitration between the host-based submission queues 112 of the selected IOV function 830 (to select one of a plurality of the host-based queues of the selected IOV function 830). Step 1420 may comprise transferring a command from host memory resources 804 of the host platform 800, as disclosed herein (via the interconnect 806).

Step 1430 may comprise monitoring the fetched command. Monitoring the fetched command at step 1430 may comprise parsing portions of the fetched command. Step 1430 may further comprise determining arbitration monitoring data 843 pertaining to command(s) fetched from submission queue(s) 112 of the selected IOV function 830. The arbitration monitoring data 843 may pertain to any suitable arbitration criteria 849, including, but not limited to: burst criteria, command threshold criteria, time-based criteria, command count criteria, data criteria, interrupt criteria, credit-based criteria, and/or the like. Step 1430 may comprise one or more of: tracking a number of commands fetched from respective submission queue(s) 112 of the selected IOV function 830, an amount of data corresponding to the fetched commands, credits consumed by the commands, an amount of time the IOV function 830 has been selected (e.g., the amount of time for which commands have been fetched from submission queue(s) 112 of the selected IOV function 830), and/or the like.

In some embodiments, step 1430 may further comprise capturing arbitration monitoring data 843 pertaining to commands fetched from the currently-selected submission queue 841 (submission queue 112 selected at step 1420) and/or submission queue(s) 112 of the currently-selected IOV function 830 (IOV function 830 selected at step 1410). Step 1430 may comprise monitoring the fetched commands (by use of the command monitor 846). Step 1430 may comprise determining arbitration monitoring data 843, as disclosed herein (e.g., a number of commands fetched from the currently-selected submission queue 841 and/or submission queue(s) of the currently-selected IOV function, and/or the like).

Step 1440 may comprise determining whether to select a next IOV function 830 (e.g., interrupt command fetching from the currently-selected submission queue 841 and/or IOV function 830). Step 1440 may comprise determining whether to implement an arbitration operation to select a next submission queue 112 and/or IOV function 830 (e.g., whether to trigger an IOV arbitration operation by the arbitration logic 842 (e.g., a queue- and/or IOV-level arbitration operation). Step 1440 may comprise evaluating one or more arbitration criteria 849, which may include, but are not limited to, one or more of burst criteria, command threshold criteria, time-based criteria, command count criteria, data criteria, interrupt criteria, credit-based criteria, and/or the like (based on arbitration monitoring data 843 captured in step 1430). If the determination of step 1440 is to select a next IOV function 830, the flow may continue back at step 1410; otherwise, the flow may continue back at step 1420.

Figure 15:
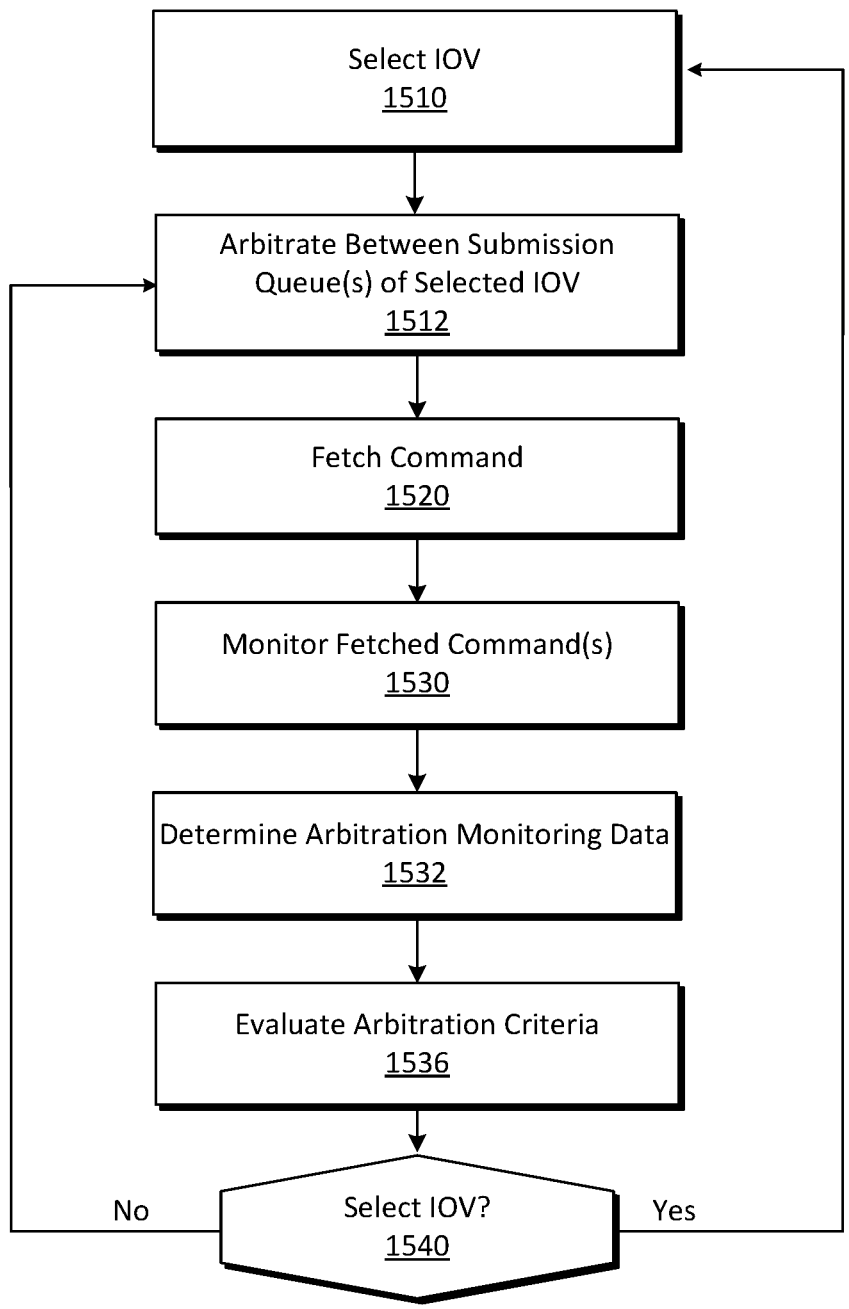
FIG. 15 is a flow diagram illustrating another embodiment of a method for arbitrating between submission queues of a plurality of IOV functions.

FIG. 15 is a flow diagram of another embodiment of a method 1500 for arbitrating between submission queues 112 of one or more IOV functions 830. Step 1510 may comprise selecting one of a plurality of IOV functions 830. Step 1510 may comprise arbitrating between IOV functions 830 in accordance with respective weights and/or priorities assigned thereto (e.g., may comprise implementing a weighted round robin arbitration scheme). Step 1510 may comprise a first- and/or IOV-level arbitration. Step 1510 may be implemented by an IOV arbiter 862, credit-based arbiter 882, adaptive IOV arbiter 962, and/or adaptive credit-based arbiter 982, as disclosed herein. Step 1510 may comprise selecting a winner from the plurality of IOV functions 830A-N.

In some embodiments, the arbitration of step 1510 may be based on command statistics associated with respective IOV 830 and/or current availability of one or more storage device resources 930. Step 1510 may comprise determining IOV command statistics corresponding to commands previously fetched from submission queue(s) 112 of the respective IOV functions 830 (e.g., IOV command statistics). Step 1510 may further comprise monitoring the state of respective storage device resources 930 of the nonvolatile storage device 106 (and/or recording corresponding resource state metadata 903). The arbitration of step 1510 may compare IOV command statistics determined for the respective IOV functions 830 to the resource state metadata 903 (and/or comparing the IOV command statistics of respective IOV functions 830A-N to resource state metadata 903A-N pertaining to storage device resources 930 assigned to the respective IOV functions 830A-N). Step 1510 may further comprise determining an execution probability for each IOV function 830 based on the comparing, as disclosed above. The arbitration of step 1510 may comprise skipping IOV functions 830 determined to have an execution probability lower than a threshold. Alternatively, or in addition, step 1510 may comprise weighting (and/or adjusting weightings) of respective IOV functions 830A-N in accordance with the execution probabilities determined for the respective IOV functions 830A-N.

Step 1512 may comprise arbitrating between submission queue(s) 112 of the IOV function 830 selected at step 1510 (the winner or result of step 1510). Step 1512 may comprise implementing any suitable arbitration scheme within a designated set of the submission queues 112 (e.g., within a set 812A-N comprising submission queues 112 of one of a plurality of IOV functions 830A-N). Step 1512 may comprise implementing a second- and/or queue-level arbitration. Step 1512 may be implemented by a queue-level arbiter (e.g., an IOV queue arbiter 864 and/or adaptive IOV queue arbiter 864) in accordance with a selected arbitration scheme (e.g., a weighted round robin with urgent priority arbitration scheme 866A and/or 966A). The submission queue selected at step 1512 may be designated as the currently-selected submission queue 841 of the command fetch logic 840.

Step 1512 may comprise arbitrating between the submission queues 112 of the selected IOV function 830 in accordance with, inter alia, command statistics pertaining to commands previously fetched from the respective submission queues 112 and/or current resource availability, as disclosed herein (e.g., respective SQ command statistics). Step 1512 may comprise determining an execution probability for each submission queue 112 of the selected IOV function 830 by comparing SQ command statistics determined for the submission queue 112 to the resource state metadata 903 (and/or resource state metadata 903A-N pertaining to resources currently assigned to the selected IOV function 830). The arbitration of step 1512 may comprise skipping submission queue(s) 112 of the selected IOV function 830 determined to have an execution probability lower than a threshold. Alternatively, or in addition, step 1512 may comprise weighting (and/or adjusting weightings) of respective submission queue(s) 112 in accordance with the determined execution probabilities.

Step 1520 may comprise fetching one or more commands from the currently-selected submission queue 112, and step 1530 may comprise monitoring the fetched command(s), as disclosed herein (e.g., by use of the command monitor 846). In some embodiments, step 1530 may further comprise determining command statistics pertaining to the fetched command(s) and/or recording corresponding command statistics metadata 950, as disclosed herein. Step 1530 may comprise determining SQ command statistics pertaining to commands fetched from respective submission queues 112 (e.g., commands fetched from the currently-selected submission queue 841). Step 1530 may further comprise determining IOV command statistics pertaining to commands fetched from submission queue(s) 112 of respective IOV functions 830, as disclosed herein.

Step 1532 may comprise determining arbitration monitoring data 843 pertaining to commands fetched from the currently-selected submission queue 841 (the submission queue 112 selected at step 1512) and/or currently-selected IOV function 830 (the IOV function selected at step 1510), as disclosed herein. Step 1532 may comprise determining information pertaining to the fetched commands, such as an amount of data to be transferred to/from the nonvolatile memory device 106 during execution of the fetched command(s), a number of credits to be consumed by the fetched commands, and/or the like. Step 1532 may comprise determining a data and/or bandwidth estimate for each fetched command and/or aggregating data and/or bandwidth estimates of the fetched commands (e.g., for commands fetched from the currently-selected submission queue 841 and/or submission queue(s) 112 of the currently-selected IOV function 830). Step 1532 may further comprise determining a time for which the currently-selected submission queue 841 has been selected (and/or the time for which the IOV function 830 has been selected). Step 1532 may further comprise monitoring the status of one or more other submission queues 112 (e.g., higher-priority submission queues, such as the submission queues 112 of the admin and/or urgent priority groups 115A and/or 115B).

Step 1536 may comprise evaluating one or more arbitration criteria 849 pertaining to the currently-selected IOV function 830 in accordance with the arbitration monitoring data 843 determined at step 1532. The arbitration criteria 849 may comprise one or more of an interrupt criteria, burst criteria, command threshold criteria, time-based criteria, command count criteria, data criteria, credit-based criteria, and/or the like. Step 1536 may comprise comparing the arbitration monitoring data 843 determined at step 1532 to one or more arbitration criteria 849, as disclosed herein.

Step 1540 may comprise determining whether to select a next IOV function 830 (e.g., interrupt command fetching from the currently-selected submission queue 841 and/or IOV function 830). The determination of step 1540 may be based on the evaluation of step 1536. If the determination of step 1549 is to select a next IOV function 830, the flow may continue back at step 1510; otherwise, the flow may continue back at step 1512.

Figure 16:
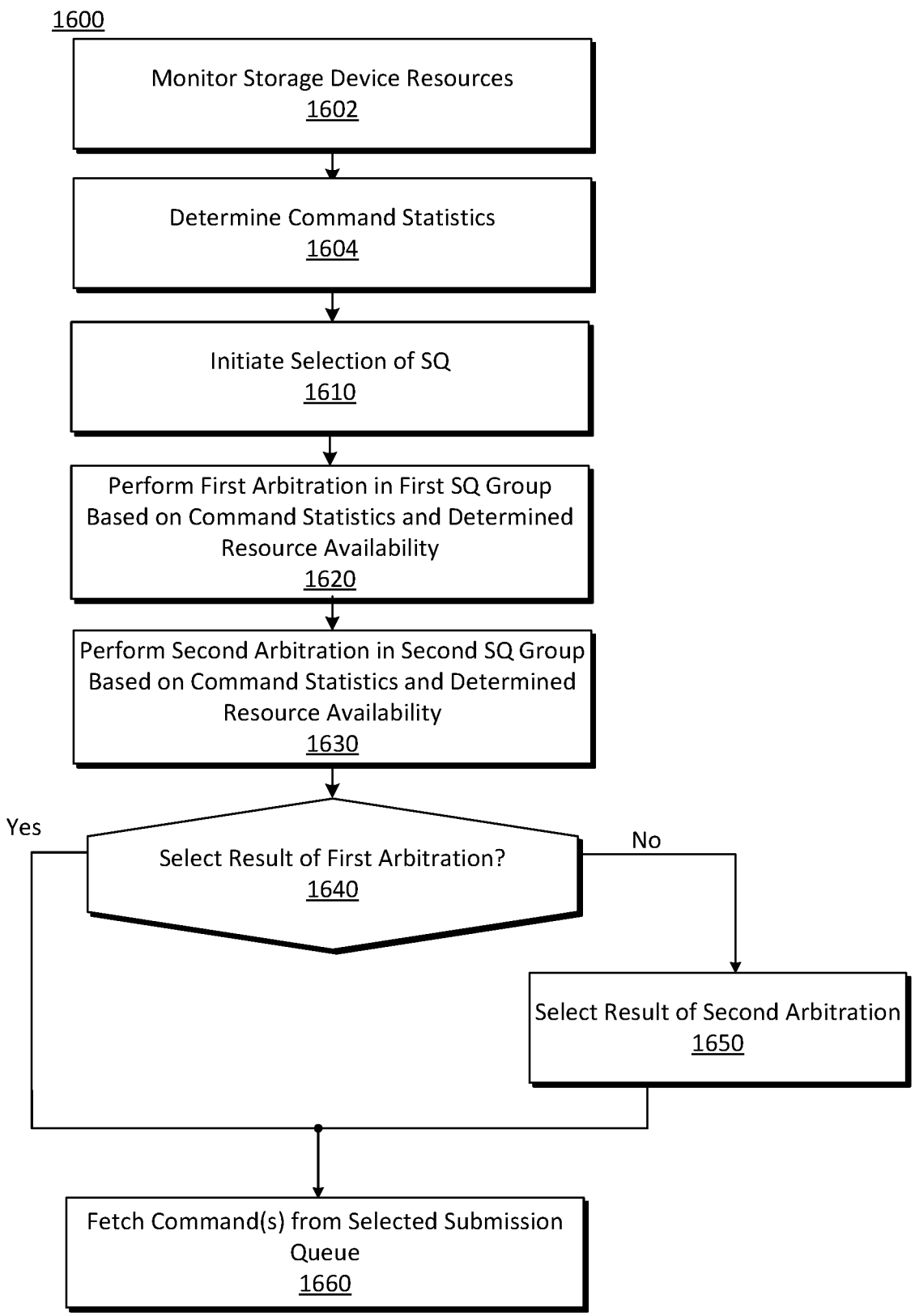
FIG. 16 is a flow diagram depicting one embodiment of a method for arbitrating between virtual functions in accordance with command statistics and/or current resource availability.

FIG. 16 is a flow diagram of one embodiment of a method 1600 for arbitrating between submission queues 112 of a plurality of IOV functions 830 in accordance with command statistics and/or current resource availability.

Step 1602 may comprise monitoring storage device resources 930 of the nonvolatile storage device 106, and recording state metadata 903, as disclosed herein. Step 1602 may comprise recording state information pertaining to the storage device resources 930 assigned to respective IOV functions 830A-N in respective resource state metadata 903A-N. Step 1604 may comprise determining command statistics pertaining to commands fetched from respective submission queues 112 (SQ command statistics) and/or commands fetched from submission queues 112 of respective IOV functions 830 (IOV command statistics). Step 1604 may further comprise maintaining command statistics metadata 950 comprising the determined command statistics. Step 1604 may comprise determining characteristics of commands likely to be fetched from respective submission queues 112 and/or IOV function(s) 830, which may indicate the resources likely to be required by next command(s) fetched therefrom.

Step 1610 may comprise initiating selection of a submission queue 112 by the arbitration logic 842. Step 1610 may be initiated and/or triggered by the arbitration manager 844, as disclosed herein.

Step 1620 may comprise performing a first arbitration within a first group of submission queues 112 (a first SQ group, such as a group 115 of FIGS. 8D and/or 9C). The first SQ group may comprise submission queues 112 that are within a particular priority range (e.g., are assigned a same first priority, such as an admin priority or urgent priority). Step 1620 may comprise selecting a submission queue 112 from a group of admin and/or urgent priority submission queues. Step 1620 may comprise queue-level arbitration, and may be implemented by an adaptive group arbiter 952, as disclosed herein (e.g., an adaptive group arbiter 952A or 952B).

Step 1620 may comprise arbitrating between the submission queues 112 of the first SQ group in accordance with command statistics pertaining to commands previously fetched from the respective submission queues 112 and/or current resource availability. Step 1620 may comprise determining an execution probability for each submission queue 112 of the first group by, inter alia, comparing SQ command statistics determined for the respective submission queues 112 to the resource state metadata 903 (and/or comparing the SQ command statistics 112 to the resource state metadata 903A-N corresponding to the storage device resources 930 assigned to the IOV function 830 associated with the submission queue 112), as disclosed herein. Step 1620 may comprise skipping submission queues 112 of the first SQ group that are determined to have an execution probability lower than a threshold. Alternatively, or in addition, step 1620 may comprise weighting and/or prioritizing the respective submission queues 112 in accordance with the determined execution probabilities.

Step 1630 may comprise performing a second arbitration within a second group of submission queues (a second SQ group). The second SQ group may comprise lower-priority submission queues 112. Each submission queue 112 included in the second SQ group may be assigned a respective priority lower than the first priority (lower than either the admin and/or urgent priority). The submission queues 112 included in the second SQ group may be assigned one or more of a high priority, medium priority, and low priority. Step 1630 may comprise selecting a submission queue 112 from the second SQ group. Step 1630 may comprise queue-level arbitration, and may be implemented by an adaptive group arbiter 952, as disclosed herein (e.g., group arbiter(s) 952C-E).

Step 1640 may comprise determining whether to select the submission queue 112 from the first arbitration of step 1620 (or the second arbitration of step 1630). If any one of the submission queues 112 of the first SQ group is non-empty (comprises one or more queued commands), the flow may continue to step 1660; otherwise, the flow may continue to step 1650. Alternatively, step 1640 may comprise determining whether each of the submission queues 112 in the first SQ group is non-empty and has an execution probability of at least a minimum threshold. If so, the flow may continue at step 1660; otherwise, the flow may continue at step 1650.

Step 1650 may comprise fetching command(s) from submission queue(s) 112 selected from the second SQ group (in accordance with the second arbitration of step 1630). Step 1650 may comprise continuing to fetch commands from submission queue(s) 112 of the second SQ group while each submission queue 112 of the first SQ group remains empty (and/or has an execution probability lower than the minimum threshold). Step 1650 may comprise interrupting command fetching in response to determining that any one of the submission queues of the first SQ group is non-empty (and/or has a determined execution probability that exceeds the minimum threshold).

Step 1660 may comprise fetching command(s) from submission queue(s) 112 selected from the first SQ group (in accordance with the first arbitration of step 1620). Step 1660 may comprise continuing to fetch commands from submission queue(s) 112 of the first SQ group until each submission queue 112 of the first SQ group is empty (and/or has an execution probability lower than the minimum threshold).

Figure 17:
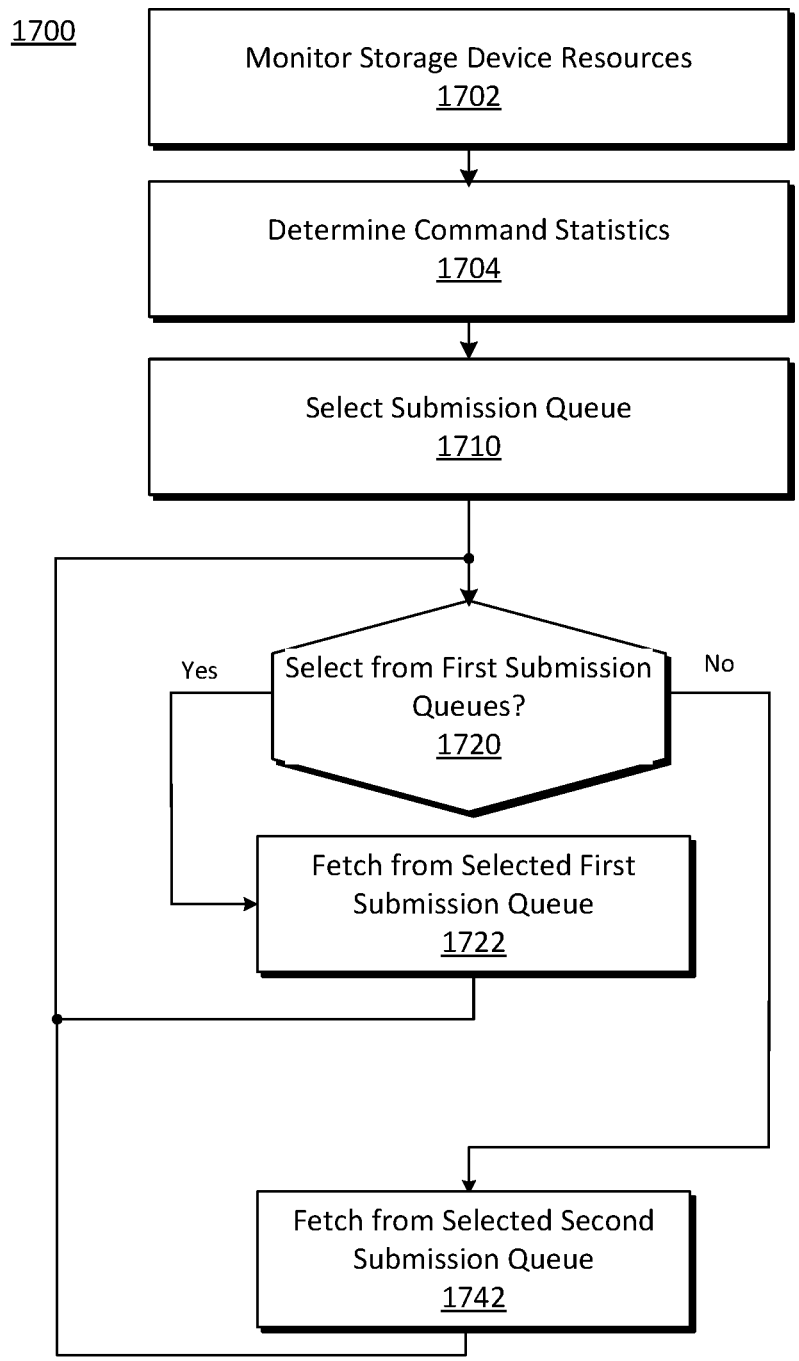
FIG. 17 is a flow diagram illustrating another embodiment of a method for arbitrating between virtual functions in accordance with command statistics and/or current resource availability.

FIG. 17 is a flow diagram illustrating another embodiment of a method 1700 for arbitrating between virtual functions in accordance with command statistics and/or current resource availability. Step 1702 may comprise monitoring storage device resources 930 of the nonvolatile storage device 106, as disclosed herein. Step 1704 may comprise determining command statistics pertaining to commands fetched from respective submission queues 112 (SQ command statistics) and/or submission queues 112 of respective IOV functions 830 (IOV command statistics), as disclosed herein.

Step 1710 may comprise selecting a submission queue 112 from which to fetch one or more commands. Step 1710 may comprise the arbitration logic 842 selecting one of a plurality of submission queues 112 from a plurality of submission queues 112, each submission queue 112 assigned a respective priority classification and being associated with a respective IOV function 830 of a plurality of IOV functions 830A-N. Step 1710 may comprise designating one of the plurality of submission queues 112 as the currently-selected submission queue 841 of the command fetch logic 840, as disclosed herein.

Step 1720 may comprise determining whether to select the submission queue 112 from a plurality of first submission queues 112. The first submission queues 112 may comprise submission queues 112 that are assigned a same first priority and/or are configured to queue commands of a same type and/or priority classification. The first submission queues 112 may comprise submission queues 112 of each of a plurality of different IOV functions 830A-N. The first submission queues may comprise one or more of admin priority submission queues 112, urgent priority submission queues 112, and/or the like. The first submission queues 112 may comprise a first group of submission queues 112 (e.g., the admin group 115A and/or urgent group 115B, as herein). If the determination of step 1720 is to select the submission queue 112 from the first submission queues 112, the flow may continue at step 1722; otherwise, the flow may continue at step 1742.

In some embodiments, the determination of step 1720 may comprise determining whether any of the first submission queues 112 are non-empty (e.g., comprises one or more queued commands). If any of the first submission queues 112 is non-empty, the flow may continue at step 1722; otherwise, the flow may continue at step 1742. In some embodiments, the determination of step 1720 may comprise determining whether any of the submission queues 112 are non-empty and/or whether currently available storage device resources 930 of the nonvolatile storage device 106 are likely to be capable of executing next command(s) fetched from the non-empty first submission queues 112. Step 1720 may comprise comparing command statistics of respective first submission queues 112 to the resource state metadata 903, as disclosed herein. Alternatively, or in addition, Step 1720 may comprise comparing command statistics of first submission queue(s) 112 of respective IOV functions 830A-N to the current availability of storage device resources 930 assigned to the respective IOV functions 830A-N (as indicated by resource state metadata 903A-N). In some embodiments, step 1720 comprises determining an execution probability for the respective first submission queues 112. The determination of step 1720 may comprise determining to select the submission queue 112 from the first submission queues 112 in response to determining that one or more of the first submission queues 112 are non-empty, and have an execution probability greater than a first minimum threshold.

Step 1722 may comprise fetching one or more command(s) from submission queue(s) 112 selected from the first submission queues 112 (in a first arbitration). Step 1722 may comprise implementing a first arbitration between the first submission queues 112, as disclosed herein. Step 1722 may comprise selecting one of the first submission queues 112 in accordance with a round robin arbitration scheme. Step 1722 may further comprise modifying the round robin arbitration scheme in accordance with command statistics of the respective first submission queues 112 and/or the current availability of resources at the nonvolatile storage device 106. Step 1722 may comprise skipping first submission queue(s) 112 having an execution probability that fails to satisfy the first minimum threshold. Step 1722 may comprise weighting and/or prioritizing selection of respective first submission queues 112 based on the determined execution probabilities of the respective first submission queues 112. Step 1722 may comprise fetching commands from the first submission queues 112 until each of the first submission queues 112 is empty (and/or an execution probability of each non-empty first submission queue 112 is lower than the first minimum threshold).

Step 1742 may comprise fetching a command from a submission queue 112 selected from a plurality of second submission queues 112 in a second arbitration. The second submission queues 112 may comprise submission queues 112 that are assigned respective priorities lower than the first priority. The second submission queues 112 may be assigned one or more of a high priority, medium priority, low priority, and/or the like. The second submission queues 112 may comprise submission queues 112 of each of a plurality of different IOV functions 830A-N. Step 1742 may comprise arbitrating between the second submission queues 112 in accordance with one or more of a round robin arbitration and a weighted round robin arbitration. Step 1742 may comprise implementing a group arbitration and a weighted arbitration. The group arbitration may comprise selecting a second submission queue 112 from each of a plurality of different submission queue groups 115 (e.g., selecting a winner from each of a high priority group 115C, medium priority group 115D, and low priority group 115E, as disclosed above). The weighted arbitration may comprise selecting between the winners of each group arbitration in accordance with a weighted round robin scheme. The second submission queues 112 selected from each group 115C-D may be assigned a respective weight (e.g., high, medium, or low, respectively).

Step 1742 may further comprise modifying one or more of the group arbitration and the weighted arbitration in accordance with command statistics and/or current resource availability, as disclosed herein. Step 1742 may comprise determining execution probabilities for respective second submission queues 112, skipping second submission queues 112 determined to have an execution probability below a second minimum threshold, and/or weighting and/or prioritizing the second submission queues 112 in accordance with the determined execution probabilities, as disclosed herein.

Step 1742 may further comprise fetching a command from the second submission queue 112 selected in the second arbitration. After fetching the command, the flow may continue back at step 1720, to determine whether to fetch commands from any of the first submission queues 112. Accordingly, the method 1700 may comprise fetching commands from second submission queues 112 while the first submission queues 112 remain empty (and/or any non-empty first submission queues have an execution probability lower than the first minimum threshold). When any of the first submission queues 112 are non-empty (and/or have a determined execution probability that satisfies the first minimum threshold), command fetching from the second submission queues 112 may be interrupted, and the commands may be fetched from the first submission queues 112 (the determination of step 1720 may be each time a command is fetched from a second submission queue 112, which may result in fetching commands from a first submission queue 112 instead of the second submission queue(s) 112). The device controller 108 may, therefore, ensure that commands issued to any of the first submission queue(s) 112 (admin and/or urgent priority commands of any of the plurality of IOV functions 830A-N) are fetched for execution before other, lower-priority commands (i.e., are fetched before commands queued within second submission queue(s) 112 of any of the plurality of IOV functions 830A-N). In some embodiments, the first minimum threshold may be set to be lower than other execution probability thresholds (e.g., the second minimum threshold) in order to, inter alia, ensure that commands submitted to the first submission queues 112 are fetched before other, lower-priority commands. In some embodiments, the first minimum threshold may be about 0. The first arbitration of step 1722 may be configured to ensure that the admin and/or urgent commands of respective IOV function(s) 830A-N do not monopolize the nonvolatile storage device 106. The first arbitration may, therefore, implement a static, round robin arbitration between the first submission queues 112, independent of command statistics and/or current resource availability.

The selection of a submission queue 112 at step 1710 may comprise arbitrating between the first and second submission queues 112 (e.g., arbitrating between admin submission queues 112, urgent submission queues 112, and lower-priority submission queues 112). Step 1710 may comprise designating the currently-selected submission queue 841 of the command fetch logic 840 from the first submission queues 112 as long as any of the first submission queues 112 is non-empty (and/or has an execution probability that satisfies the first minimum threshold). Step 1710 may further comprise selecting the currently-selected submission queue 841 from the second submission queues 112 while: a) each of the first submission queues 112 remains empty (and/or each non-empty first submission queue 112 has an execution probability below the first minimum threshold); and b) one or more of the second submission queues 112 is non-empty (and/or has an execution probability that satisfies the second minimum threshold). If none of the non-empty first and/or second submission queues 112 satisfies its respective minimum threshold, step 1710 may comprise selecting the currently-selected submission queue 841 in priority order: from non-empty first submission queues 112, and then non-empty second submission queues 112 (if each first submission queue 112 is empty).

Figure 18:
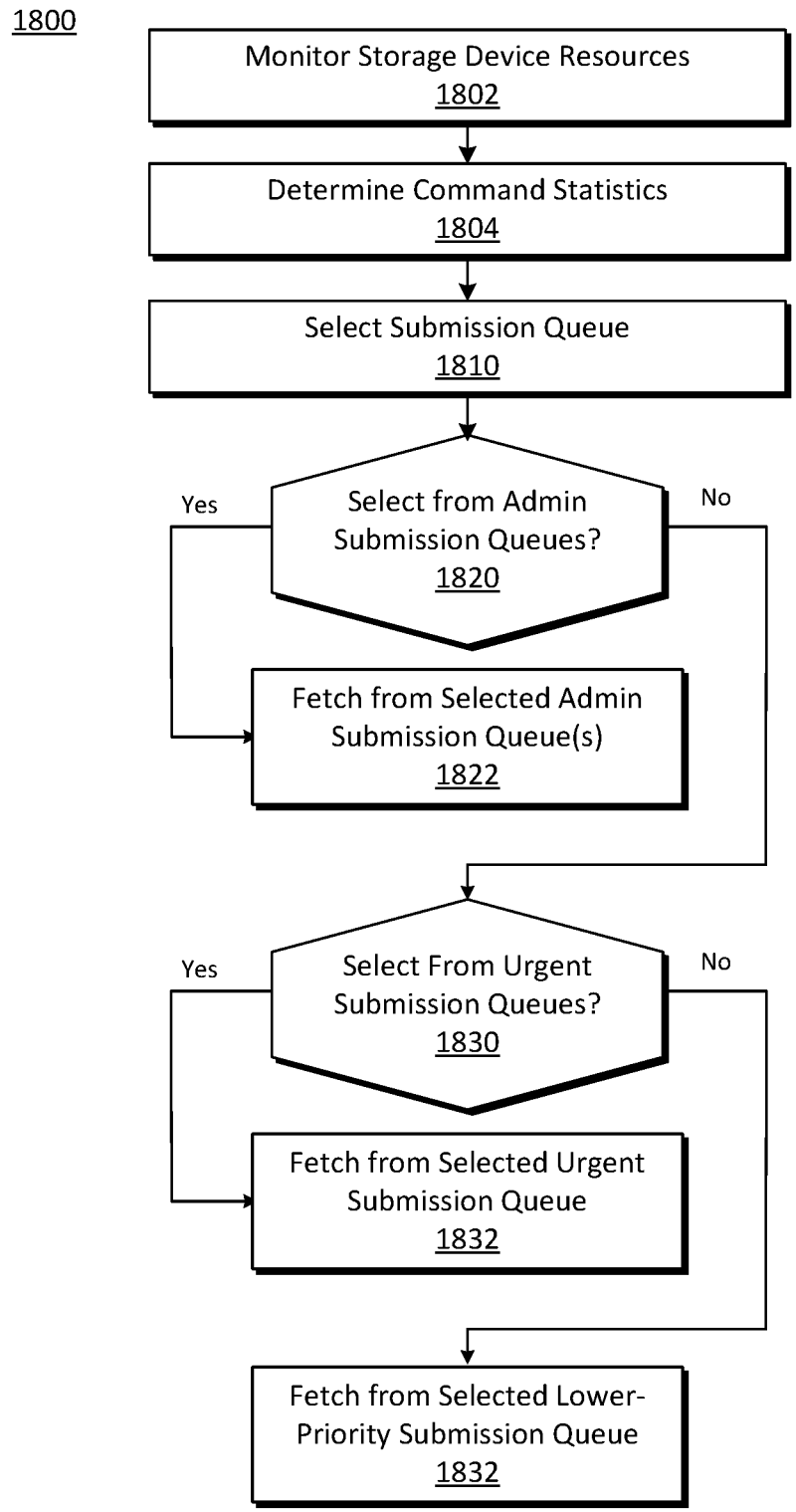
FIG. 18 is a flow diagram depicting another embodiment of a method for arbitrating between virtual functions in accordance with command statistics and/or current resource availability.

FIG. 18 is a flow diagram illustrating another embodiment of a method 1800 for arbitrating between virtual functions in accordance with command statistics and/or current resource availability. Step 1802 may comprise monitoring storage device resources 930 of the nonvolatile storage device 106, as disclosed herein. Step 1804 may comprise determining command statistics pertaining to commands fetched from respective submission queues 112 (SQ command statistics) and/or submission queues 112 of respective IOV functions 830 (IOV command statistics), as disclosed herein.

Step 1810 may comprise selecting a submission queue 112 from which to fetch one or more commands (designating the currently-selected submission queue 841 of the command fetch logic 840). Step 1810 may comprise the arbitration logic 842 selecting one of a plurality of submission queues 112 from a plurality of submission queues 112, each submission queue 112 assigned a respective priority classification and being associated with a respective IOV function 830 of a plurality of IOV functions 830A-N. Step 1810 may comprise designating one of the plurality of submission queues 112 as the currently-selected submission queue 841 of the command fetch logic 840, as disclosed herein.

Step 1820 may comprise determining whether to select the submission queue 112 from a plurality of admin submission queues 112 (submission queues 112 included in an admin group 115A). Each of the admin submission queues 112 may be configured to receive admin commands of a respective one of a plurality of different IOV functions 830A-N. Step 1820 may comprise determining whether any of the admin submission queues 112 is non-empty. If so, the flow may continue at step 1822; otherwise, the flow may continue at step 1820. Alternatively, or in addition, step 1820 may comprise determining whether commands queued within the non-empty admin submission queues 112 are likely to be capable of being executed using currently available resources, which may comprise determining an execution probability for the respective admin submission queues 112. The determination of step 1820 may comprise determining whether any of the admin submission queues 112 are non-empty and/or whether currently available resources are likely to be capable of executing next command(s) likely to be fetched from the non-empty admin submission queues 112 (e.g., by comparing execution probabilities of the non-empty admin submission queues 112 to an admin minimum threshold).

Step 1822 may comprise fetching command(s) from admin submission queues 112. Step 1822 may comprise arbitrating between the admin submission queues 112, as disclosed herein (using a round robin arbitration scheme). Step 1822 may comprise arbitrating between the admin submission queues 112 in accordance with respective command statistics and/or current resource availability, as disclosed herein. Step 1822 may comprise continuing to fetch commands from admin submission queues 112 until each of the admin submission queues 112 is empty (and/or each non-empty admin submission queue has an execution probability lower than the admin minimum threshold).

Step 1830 may comprise determining whether to select the submission queue 112 from a plurality of urgent submission queues 112 (submission queues 112 included in an urgent group 115B). Each of the urgent submission queues 112 may be configured to receive urgent priority commands of a respective one of a plurality of different IOV functions 830A-N. Step 1830 may comprise determining whether any of the urgent submission queues 112 is non-empty. If so, the flow may continue at step 1832; otherwise, the flow may continue at step 1842. Alternatively, or in addition, step 1830 may comprise determining whether commands queued within the non-empty urgent submission queues 112 are likely to be capable of being executed using currently available resources, which may comprise determining an execution probability for the respective urgent submission queues 112. The determination of step 1830 may comprise determining whether any of the urgent submission queues 112 are non-empty and/or whether currently available resources are likely to be capable of executing next command(s) likely to be fetched from the non-empty urgent submission queues 112 (e.g., by comparing execution probabilities of the non-empty urgent submission queues 112 to an urgent minimum threshold).

Step 1832 may comprise fetching a command from a submission queue 112 selected from the urgent submission queues 112 (from group 115B). Step 1832 may comprise arbitrating between the urgent submission queues 112, as disclosed herein (using a round robin arbitration scheme). Step 1832 may comprise arbitrating between the urgent submission queues 112 in accordance with respective command statistics and/or current resource availability, as disclosed herein. After fetching a command from an urgent submission queue 112 at step 1830, the flow may continue at step 1820, where the availability of commands within the admin submission queues 112 may be determined. Accordingly, steps 1820-1832 may comprise fetching commands from the urgent submission queue(s) 112 while each of the admin submission queues 112 remain empty (and/or non-empty admin submission queues 112 have an execution probability lower than the admin minimum threshold).

Step 1842 may comprise fetching a command from a lower-priority submission queue 112. Step 1842 may comprise selecting a submission queue 112 from one or more groups 115C-D, as disclosed above. Step 1842 may comprise arbitrating between the lower-priority submission queues 112 in accordance with command statistics and/or current resource availability, as disclosed herein (e.g., execution probabilities of respective lower-priority submission queues 112). Step 1842 may comprise skipping lower-priority submission queues 112 determined to have an execution probability below a lower-priority minimum threshold (and/or weighting respective lower-priority submission queues 112 in accordance with execution probabilities determined for the respective lower-priority submission queues 112).

In response to fetching a command from a lower-priority submission queue 112 at step 1842, the flow may continue at steps 1820-1830 where the availability of commands in each of the admin submission queues 112 and urgent submission queues 112 may be determined. Accordingly, steps 1820-1842 may comprise fetching commands from lower-priority submission queue(s) 112, while each of the admin submission queues 112 and urgent submission queues 112 are empty (and/or non-empty admin and/or urgent submission queues 112 have an execution probability lower than the admin and/or urgent minimum thresholds, respectively).

In some embodiments, the admin minimum threshold may be set to be lower than other execution probability thresholds (e.g., lower than the urgent minimum threshold and/or lower-priority minimum threshold) in order to, inter alia, ensure that admin commands of each IOV function 830A-N are fetched before other types of commands. In some embodiments, the admin minimum threshold may be substantially 0 (and/or the arbitration scheme implemented at step 1822 may comprise a static, round robin arbitration scheme). The urgent threshold may be configured to be higher than the admin threshold and lower than the lower-priority minimum threshold. Alternatively, the urgent threshold may be substantially 0 (and/or the arbitration scheme implemented at step 1832 may comprise a static, round robin arbitration scheme).

The selection of a submission queue 112 at step 1810 may comprise arbitrating between respective groups of submission queues 112 (e.g., arbitrating between admin submission queues 112, urgent submission queues 112, and lower-priority submission queues 112). Step 1810 may comprise designating the currently-selected submission queue 841 of the command fetch logic 840 from the admin submission queues 112 as long as any of the admin submission queues 112 is non-empty (and/or has an execution probability that satisfies the admin minimum threshold). Step 1810 may further comprise selecting the currently-selected submission queue 841 from the urgent submission queues 112 while: a) each of the admin submission queues 112 remains empty (and/or each non-empty admin submission queue 112 has an execution probability below the admin minimum threshold); and b) any of the urgent submission queues 112 is non-empty (and/or execution probabilities of the non-empty urgent submission queues 112 satisfy the urgent minimum threshold). Step 1810 may further comprise selecting the currently-selected submission queue 841 from the lower-priority submission queues 112 while: a) each of the admin submission queues 112 remains empty (and/or each non-empty admin submission queue 112 has an execution probability below the admin minimum threshold); b) each of the urgent submission queues 112 remains empty (and/or each non-empty urgent submission queue 112 has an execution probability below the urgent minimum threshold); and c) one or more of the lower-priority submission queues 112 is non-empty (and/or has an execution probability that satisfies the lower-priority minimum threshold). If none of the non-empty submission queues 112 satisfies its respective minimum threshold, step 1810 may comprise selecting the currently-selected submission queue 841 in priority order: from non-empty admin submission queues 112, non-empty urgent submission queues 112 (if each admin submission queue 112 is empty), and finally, non-empty lower-priority submission queues 112 (if each admin and urgent submission queue 112 is empty).

Figure 19:
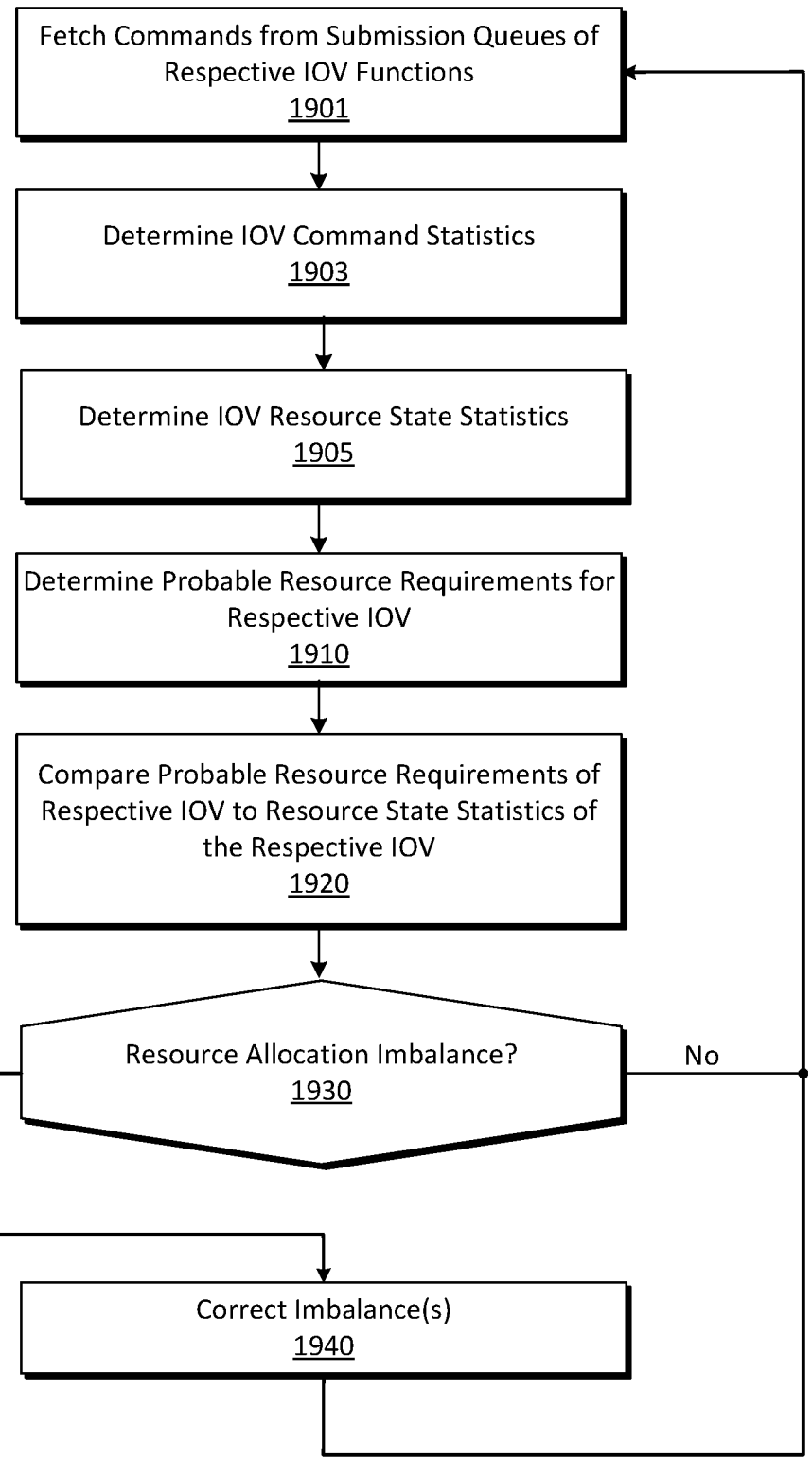
FIG. 19 is a flow diagram illustrating one embodiment of a method for identifying and/or correcting resource allocation imbalances.

FIG. 19 is a flow diagram of one embodiment of a method 1900 for identifying and/or correcting resource imbalances. Step 1901 may comprise fetching commands from submission queues 112 of a plurality of different IOV functions 830A-N implemented by a nonvolatile storage device 106. Step 1901 may comprise arbitrating between IOV functions 830A-N and/or the submission queue(s) 112 thereof, as disclosed herein. Step 1903 may comprise determining IOV command statistics pertaining to commands fetched from submission queue(s) 112 of the respective IOV functions 830A-N. Step 1901 may further comprise executing the fetched commands by use of the command processing logic 410 and/or memory 109, monitoring the fetched commands (e.g., determining IOV command statistics at step 1903), and/or monitoring the state of respective resources of the nonvolatile storage device 106 (e.g., determining IOV resource state statistics at step 1905).

Step 1903 may comprise deriving IOV command statistics pertaining to commands fetched from submission queues 112 of each IOV function 830A-N. Step 1903 may comprise monitoring the fetched commands, as disclosed herein. Step 1903 may comprise determining SQ command statistics pertaining to commands fetched from respective submission queues 112. Step 1903 may further comprise deriving the IOV command statistics for respective IOV functions 830A-N by aggregating and/or combining the SQ command statistics of the SQ submission queues 112 of each of the respective IOV functions 830A-N.

Step 1905 may comprise determining IOV resource state statistics pertaining to respective IOV functions 830A-N. The IOV resource state statistics of an IOV function 830 may indicate, inter alia, the resources assigned to the IOV function 830, type(s) of resources assigned to the IOV function 830, current availability of the assigned resources, statistics pertaining to the assigned resources, and/or the like.

Step 1905 may comprise determining current resource assignments of each IOV function 830A-N. The current resource assignments of an IOV function 830 may indicate the resources of the nonvolatile storage device 106 that are currently assigned to the IOV function 830, which may include, but are not limited to: private resources that are permanently assigned to the IOV function 830, flexible resources that are currently assigned to the IOV function 830 (and could be reassigned to another IOV function 830), and/or the like. The primary IOV function 830A may be configured to provision resources to respective IOV functions 830A-N, and step 1905 may comprise obtaining resource assignments for each IOV function 830A-N from the primary IOV function 830A (e.g., by issuing one or more commands and/or queries to the primary IOV function 830A).

The resource assignments of an IOV function 830 may pertain to each of a plurality of different resource types, which may include, but are not limited to: admin resources (storage device resources 930 configured to execute admin commands), read resources (e.g., storage device resources 930 configured to execute read commands, such as logical-to-physical translation resources, read pipelines, ECC decoders, read circuitry, and/or the like), write resources (e.g., storage device resources 930 configured for execution of write commands, such as write pipelines, ECC encoders, write circuitry, and/or the like), data transfer resources (e.g., resources pertaining to data transfers, such as resources pertaining to the interconnect 806, the memory interconnect 906, and/or the like), and so on.

Step 1905 may further comprise determining a state of the resources currently assigned to each IOV function 830A-N. Step 1905 may comprise monitoring the state of the storage device resources 930 assigned to respective IOV functions 830A-N and/or maintaining corresponding resource state metadata 903A-N. Step 1905 may further comprise maintaining information pertaining to unassigned resources in resource metadata 903X. Step 1905 may comprise monitoring current resource availability (e.g., the current availability of admin, read, write, and/or other resources assigned to respective IOV functions 830A-N). Step 1905 may comprise monitoring a utilization of respective resources, such as an amount, proportion, and/or percentage of resource utilization over time (periodically, such as during arbitration operations, or the like). Step 1905 may comprise monitoring the utilization of respective resource types (e.g., utilization of admin, read, write, data transfer, and/or the like).

Step 1905 may further comprise determining statistics pertaining to resource availability. Step 1905 may comprise monitoring arbitration scarcity events pertaining to respective IOV functions 830A-N (and/or submission queue(s) 112 thereof). As used herein, an "arbitration scarcity event" refers to an event in which an IOV function 830A-N (and/or submission queue 112 thereof) was skipped, de-weighted, and/or de-prioritized during arbitration due to lack of availability of assigned resources (e.g., being assigned a low execution probability, as disclosed herein). An arbitration scarcity event may, for example, comprise determining that the execution probability of an IOV function 830 (and/or submission queue 112 thereof) fails to satisfy one or more thresholds and/or results in adjusting the weight and/or priority assigned thereto. Step 1905 may comprise monitoring the arbitration logic 842 to detect arbitration scarcity events pertaining to respective IOV functions 830A-N, and/or recording information pertaining to the detected events within, inter alia, the resource state metadata 903A-N. The recorded information may indicate the type(s) of resources that caused the detected arbitration scarcity event(s) (e.g., lack of available admin, read, write, and/or other resources), the number, frequency, and/or duration of such events, and/or the like.

Step 1910 may comprise determining probable resource requirements for respective IOV functions 830A-N based on, inter alia, the IOV command statistics determined at step 1903. Step 1910 may comprise mapping IOV command statistics of each IOV function 830A-N to resource(s) of the nonvolatile storage device 106 (by use of pre-determined resource mapping(s), as disclosed herein). Step 1910 may comprise determining a probability that a next command fetched from a submission queue 112 of an IOV function 830 will require particular type(s) of storage device resources 930 (e.g., admin, read, write, data transfer, and/or the like). Step 1910 may be performed during arbitration operations of the arbitration logic 842, as disclosed herein.

Step 1910 may further comprise scaling and/or normalizing the probable resource requirements of the respective IOV functions 830A-N. The probable resource requirements of each IOV function 830A-N may be scaled and/or normalized in accordance with a command count and/or frequency of each IOV function 830A-N (e.g., by the number and/or frequency of commands fetched from submission queues 112 of respective IOV functions 830A-N as compared to the number and/or frequency of commands fetched from submission queues 112 of other IOV functions 830A-N). Alternatively, the probable resource requirements of each IOV function 830A-N may be adjusted according to weights and/or priorities assigned to each IOV function 830A-N (e.g., in accordance with a QoS of the IOV functions 830A-N). Adjusting the resource requirements of an IOV function 830A-N may result in allocation of additional resources to the IOV function 830A-N which may result in fewer arbitration scarcity events and/or stall conditions.

Step 1920 may comprise comparing the probable resource requirements determined for each IOV function 830A-N to the IOV resource state statistics of the respective IOV functions 830A-N. Step 1920 may comprise comparing probable resource requirements of respective IOV function 830A-N to the resources currently assigned to the respective IOV functions 830A-N, type(s) of resources assigned to the respective IOV functions 830A-N, current availability of the assigned resources, statistics pertaining to the assigned resources, and/or the like.

Step 1930 may comprise determining whether a resource allocation imbalance exists between the IOV functions 830A-N based on the comparing of step 1920. Step 1930 may comprise determining whether the probable resource requirements determined for the IOV function 830A-N correspond to (e.g., are balanced with) the IOV resource state statistics pertaining to the resources assigned to the respective IOV functions 830A-N. Step 1930 may comprise determining that an IOV function 830 has a resource allocation deficiency in response to determining that the IOV function 830 has a high probability of requiring a particular type of resource, but is currently assigned an insufficient amount of resources of the particular type (e.g., has a high probability of requiring read resources, but is not currently assigned a commiserate amount of read resources).

Step 1930 may further comprise detecting resource imbalances based on, inter alia, information pertaining to the utilization of assigned resources by respective IOV functions 830A-N. Step 1930 may comprise determining that a particular IOV function 830 has a deficiency in allocated write resources in response to the comparing indicating that write resources assigned to the particular IOV function 830 have high utilization rates (and/or the particular IOV function 830 has a high probability of requiring write resources), whereas write resources assigned to other IOV functions 830A-N have lower utilization rates (and/or have lower probabilities of requiring such resources).

Step 1930 may further comprise detecting resource allocation deficiencies based on IOV resource state statistics, such as arbitration scarcity events. Step 1930 may comprise determining that a particular IOV function 830 has deficiency of a particular type of resource based on a number, frequency, and/or duration of arbitration scarcity events caused by lack of availability of the particular type of resource. Step 1930 may comprise detecting the resource allocation deficiency in response to the comparing of step 1910 indicating that the number, frequency, and/or duration of the arbitration scarcity events of the particular IOV function 830 vary from those of other IOV functions 830A-N by more than a threshold (e.g., larger by more than a standard deviation).

Step 1930 may further comprise determining whether one or more IOV functions 830A-N have a resource allocation surplus based on the comparing of step 1920. Step 1930 may comprise determining that a particular IOV function 830 has a resource allocation surplus in response to the comparing indicating that the particular IOV function 830 has a low probability of requiring the particular type of resource, and is currently assigned surplus resources of the particular type (e.g., has a low probability of requiring read resources, but is currently assigned more than a commiserate amount of read resources). Step 1930 may further comprise detecting resource allocation surpluses based on, inter alia, information pertaining to the utilization of assigned resources by respective IOV functions 830A-N. Step 1930 may comprise detecting a resource allocation surplus in response to determining that write resources assigned to a particular IOV function 830 have low utilization rates (and/or the particular IOV function 830 has a low probability of requiring write resources), whereas write resources assigned to other IOV functions 830A-N have higher utilization rates (and/or have higher probabilities of requiring write resources).

Step 1930 may further comprise detecting resource allocation surpluses based on the IOV resource state statistics compared at step 1920, such as arbitration scarcity events. Step 1930 may comprise determining that a particular IOV function 830 has a surplus of a particular type of resource based on a number, frequency, and/or duration of arbitration scarcity events caused by lack of availability of the particular type of resource. Step 1930 may comprise detecting the resource allocation surplus in response to determining that the number, frequency, and/or duration of the arbitration scarcity events are lower than those of other IOV functions 830A-N by more than a threshold amount (e.g., lower by more than a standard deviation).

If one or more resource allocation imbalances are detected at step 1930, the flow may continue at step 1940; otherwise, the flow may continue back at step 1901 (e.g., the device controller 108 may continue fetching command(s) in accordance with current IOV resource allocations).

Step 1940 may comprise correcting the resource allocation imbalance(s) detected at step 1930. Step 1940 may comprise correcting one or more resource allocation deficiencies and/or resource allocation surpluses. Correcting a resource allocation surplus indicating that a particular IOV function 830 is currently assigned surplus resources of a particular type may comprise deallocating the surplus resources. Deallocating the surplus resources may comprise returning the surplus resources to a pool of free resources. Deallocating the surplus resources may comprise notifying the primary IOV function 830A of the resource allocation surplus, which may cause the primary IOV function 830A to deallocate the surplus resources (e.g., return the surplus resources to the pool of free resources) and/or assign the surplus resources to one or more other IOV functions 830A-N. Deallocating the surplus resources may, therefore, comprise issuing one or more commands to the primary IOV function 830A.

Step 1940 may further comprise correcting one or more resource allocation deficiencies. Correcting a resource allocation deficiency indicating that a particular IOV function 830 lacks currently assigned resources of a particular type may comprise, inter alia, assigning additional resources of the particular type to the particular IOV function 830. Correcting the resource allocation deficiency may comprise notifying the primary IOV function 830A of the resource allocation deficiency, which may cause the primary IOV function 830A to assign additional resources to the particular IOV function 830 (e.g., by issuing one or more commands to the primary IOV function 830A). The additional resources may be assigned from the pool of free resources (e.g., unassigned flexible resources). Alternatively, the additional resources may be reassigned from other IOV functions 830A-N (functions determined to have resource allocation surpluses(s), as disclosed herein). Following step 1940, the flow may continue at step 1901, which may comprise fetching command(s) from submission queues 112, as disclosed herein.

The subject matter described herein may be implemented in any suitable storage device comprising any suitable memory 109. The memory 109 may comprise any suitable NAND flash memory, including two-dimensional or three-dimensional NAND flash memory. Semiconductor memory devices include volatile memory devices, such as DRAM or SRAM devices, nonvolatile memory devices, such as resistive random access memory (ReRAM), EEPROM, flash memory (which can also be considered a subset of EEPROM), ferroelectric random access memory (FRAM), and magnetoresistive random access memory (MRAM), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layers of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

It will be understood that various details of the presently disclosed subject matter may be changed without departing from the scope of the presently disclosed subject matter. Furthermore, the foregoing description is for the purpose of illustration only, and not for the purpose of limitation.

We claim:

1. A method for command arbitration, comprising:
assigning a same weight to each virtual function of a plurality of virtual functions, each virtual function corresponding to respective submission queues of a plurality of submission queues maintained within memory resources of a host of a nonvolatile storage device;
selecting a submission queue from the plurality of submission queues wherein selecting the submission queue comprises:
performing a first arbitration within a first group of the submission queues, the first group comprising a submission queue of each virtual function, each submission queue of the first group assigned a first priority;
performing a second arbitration within a second group of the submission queues, the second group comprising a submission queue of each virtual function, each submission queue of the second group assigned a respective priority lower than the first priority;
selecting the submission queue from a result of the first arbitration responsive to one or more of the submission queues of the first group comprising one or more queued commands; and
selecting the submission queue from a result of the second arbitration responsive to each submission queue of the first group being empty; and
fetching one or more commands from the selected submission queue to the nonvolatile storage device.

2. The method of claim 1, wherein one or more of the first arbitration and the second arbitration is in accordance with one of a round robin arbitration scheme and a weighted round robin arbitration scheme.

3. The method of claim 1, wherein:
the first priority comprises an admin priority;
each submission queue included in the second group is assigned one of a high priority, a medium priority, and a low priority; and
the selecting further comprises:
performing a third arbitration within a third group of the submission queues, wherein each submission queue of the third group is assigned an urgent priority classification; and selecting the submission queue from a result of the third arbitration responsive to each submission queue of the first group being empty.

4. The method of claim 3, wherein the submission queue is selected from the result of the second arbitration responsive to each submission queue of the first group being empty and each submission queue of the third group being empty.

5. The method of claim 1, further comprising:
monitoring the commands fetched from the selected submission queue; and
determining whether to interrupt the fetching based on the monitoring, wherein interrupting the fetching comprises selecting a next submission queue from the plurality of submission queues.

6. The method of claim 5, further comprising:
interrupting the fetching in response to determining that more than a threshold number of commands have been fetched from the selected submission queue based on the monitoring.

7. The method of claim 5, further comprising:
determining an estimate of an amount of data to be transferred during execution of the commands fetched from the selected submission queue in response to the monitoring; and
interrupting the fetching in response to the determined estimate exceeding a threshold.

8. The method of claim 1, further comprising:
interrupting the fetching in response to fetching commands from the selected submission queue for a threshold amount of time.

9. A nonvolatile storage device comprising:
nonvolatile memory; and
a device controller configured to:
assign a same weight to each virtual function of a plurality of virtual functions, each virtual function corresponding to respective submission queues of a plurality of submission queues maintained within memory resources of a host of the nonvolatile storage device;
select a submission queue from the plurality of submission queues, by arbitrating between a group of the submission queues, the group comprising submission queues of each of the plurality of virtual functions;
fetch one or more commands from the selected submission queue to the nonvolatile storage device;
monitor the commands fetched from the selected submission queue; and
determine whether to interrupt the fetching based on the monitoring, wherein interrupting the fetching comprises selecting a next submission queue from the plurality of submission queues.

10. The nonvolatile storage device of claim 9, wherein arbitrating between the group of the submission queues is in accordance with one of a round robin arbitration scheme and a weighted round robin arbitration scheme.

11. The nonvolatile storage device of claim 9, wherein the device controller is further configured to:
perform a first arbitration within a first group of the submission queues, the first group comprising a submission queue of each virtual function, each submission queue of the first group assigned a first priority;
perform a second arbitration within a second group of the submission queues, the second group comprising a submission queue of each virtual function, each submission queue of the second group assigned a respective priority lower than the first priority;
select the submission queue from a result of the first arbitration responsive to one or more of the submission queues of the first group comprising one or more queued commands; and
select the submission queue from a result of the second arbitration responsive to each submission queue of the first group being empty.

12. The nonvolatile storage device of claim 11, wherein:
the first priority comprises an admin priority;
each submission queue included in the second group is assigned one of a high priority, a medium priority, and a low priority; and
the device controller is further configured to:
perform a third arbitration within a third group of the submission queues, wherein each submission queue of the third group is assigned an urgent priority classification; and
select the submission queue from a result of the third arbitration responsive to each submission queue of the first group being empty.

13. The nonvolatile storage device of claim 12, wherein the device controller is further configured to select the submission queue from the result of the second arbitration responsive to each submission queue of the first group being empty and each submission queue of the third group being empty.

14. The nonvolatile storage device of claim 9, wherein the device controller is further configured to:
interrupt the fetching in response to determining that more than a threshold number of commands have been fetched from the selected submission queue based on the monitoring.

15. The nonvolatile storage device of claim 9, wherein the device controller is further configured to:
determine an estimate of an amount of data to be transferred during execution of the commands fetched from the selected submission queue in response to the monitoring; and
interrupt the fetching in response to the determined estimate exceeding a threshold.

16. The nonvolatile storage device of claim 9, wherein the device controller is further configured to:
interrupt the fetching in response to fetching commands from the selected submission queue for a threshold amount of time.

17. An apparatus comprising:
means for assigning a same weight to each virtual function of a plurality of virtual functions, each virtual function corresponding to respective submission queues of a plurality of submission queues maintained within memory resources of a host of a nonvolatile storage device;
means for selecting a submission queue from the plurality of submission queues by arbitrating between a group of the submission queues, the group comprising submission queues of each of the plurality of virtual functions;
means for fetching one or more commands from the selected submission queue to the nonvolatile storage device;
means for monitoring the commands fetched from the selected submission queue; and
means for determining whether to interrupt the fetching based on the monitoring, wherein interrupting the fetching comprises selecting a next submission queue from the plurality of submission queues.

18. The apparatus of claim 17, wherein the means for selecting the submission queue comprises means for arbitrating between the group of the submission queues in accordance with one of a round robin arbitration scheme and a weighted round robin arbitration scheme.

* * * * *